Oct. 15, 1963 J. T. GONDEK 3,106,905
TORPEDO TUBE AND METHOD FOR MAKING SAME
Original Filed March 22, 1956 45 Sheets-Sheet 3
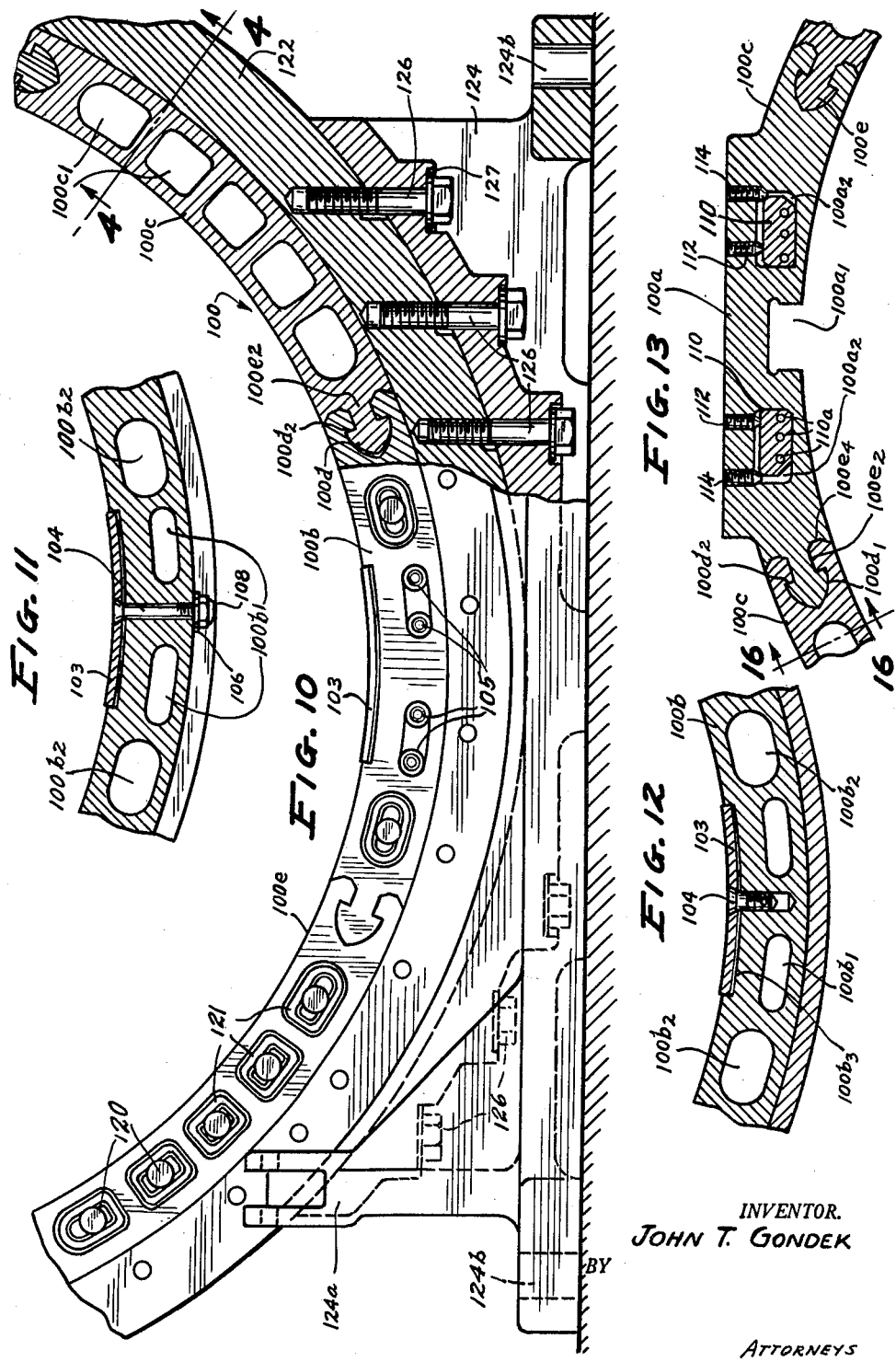
INVENTOR.
JOHN T. GONDEK
BY
ATTORNEYS Oct. 15, 1963     J. T. GONDEK     3,106,905
TORPEDO TUBE AND METHOD FOR MAKING SAME
Original Filed March 22, 1956     45 Sheets-Sheet 4
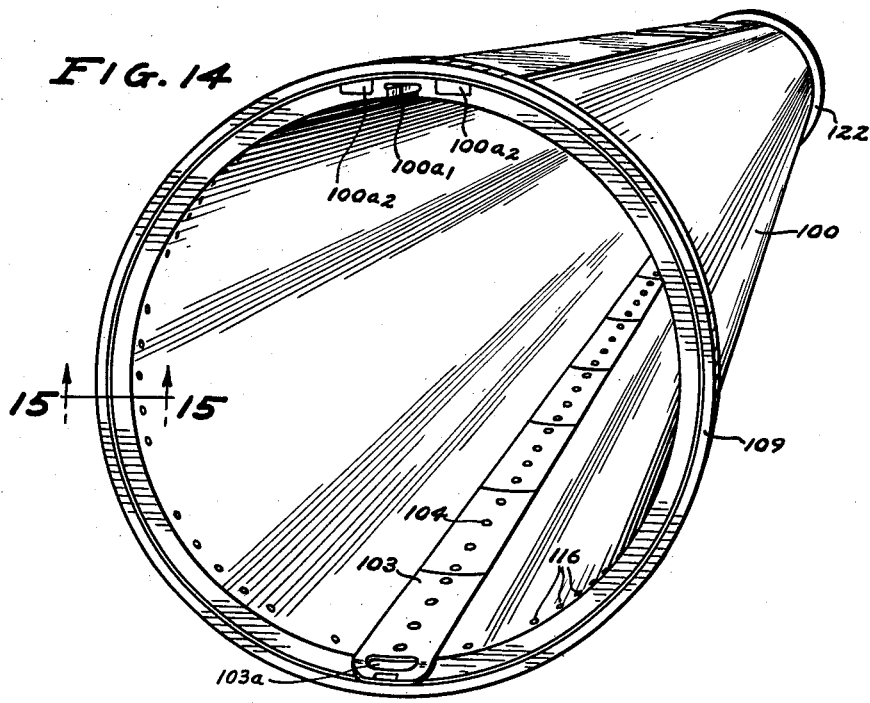
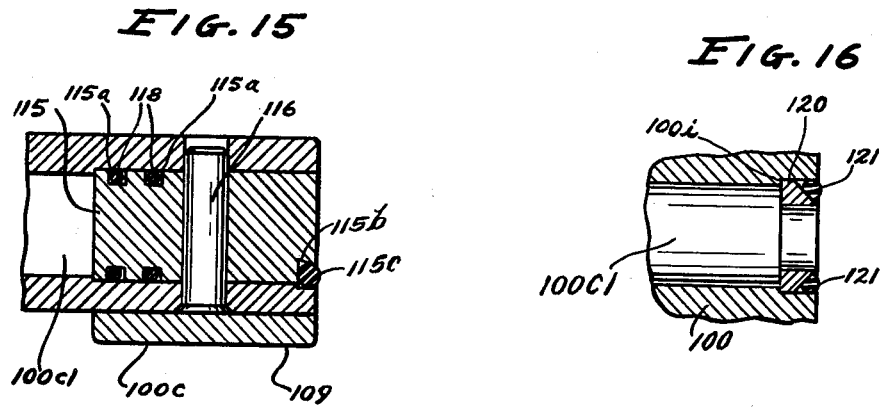
INVENTOR.
JOHN T. GONDEK
BY
ATTORNEYS Oct. 15, 1963  J. T. GONDEK  3,106,905
TORPEDO TUBE AND METHOD FOR MAKING SAME
Original Filed March 22, 1956  45 Sheets-Sheet 5
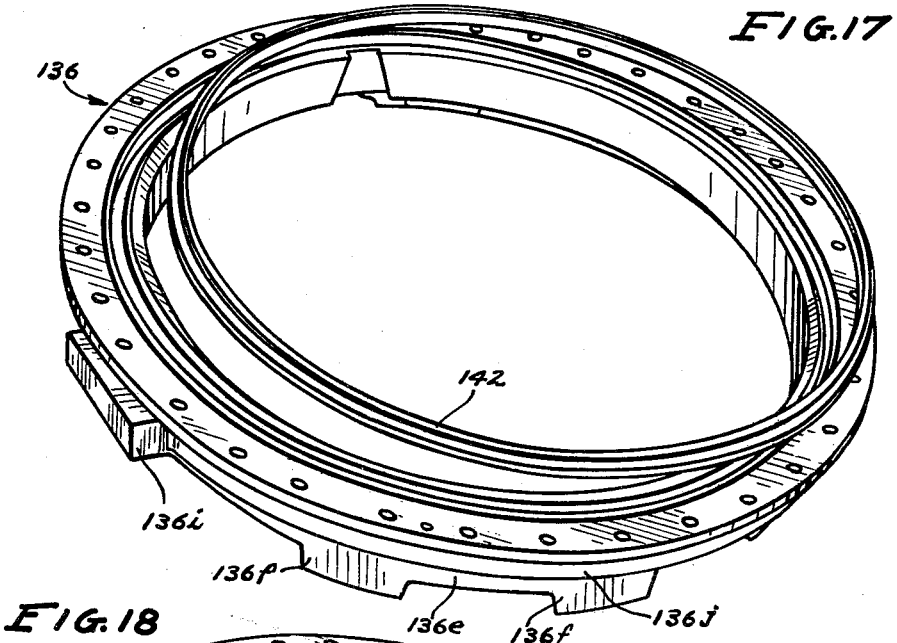
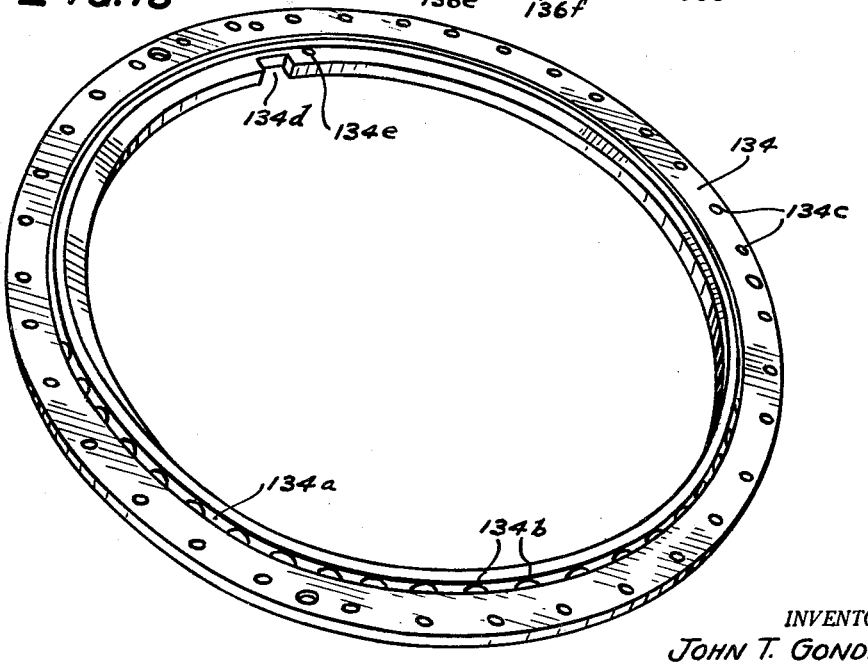
INVENTOR.
JOHN T. GONDEK
BY
ATTORNEYS Oct. 15, 1963   J. T. GONDEK   3,106,905
TORPEDO TUBE AND METHOD FOR MAKING SAME
Original Filed March 22, 1956   45 Sheets-Sheet 7
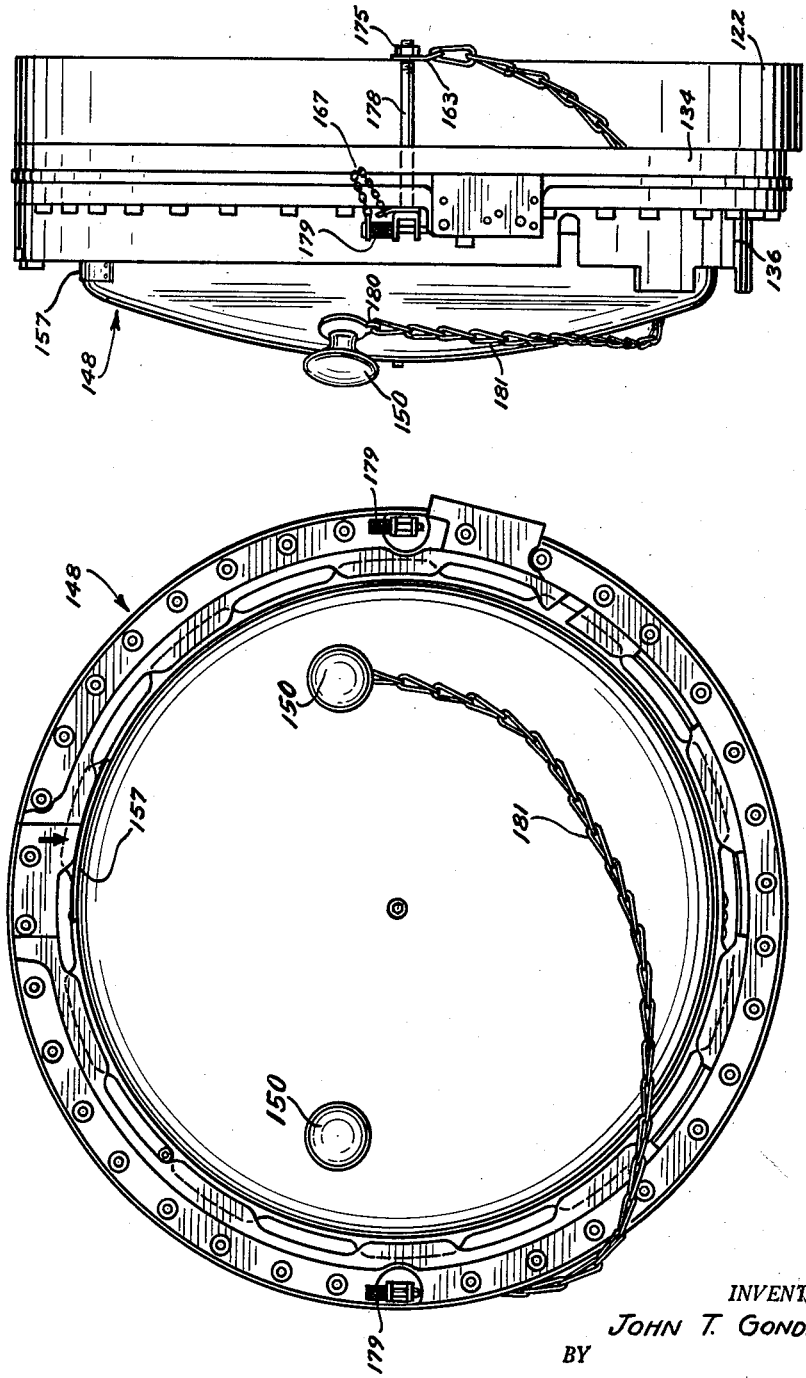
INVENTOR.
JOHN T. GONDEK
BY
ATTORNEYS Oct. 15, 1963     J. T. GONDEK     3,106,905
TORPEDO TUBE AND METHOD FOR MAKING SAME
Original Filed March 22, 1956     45 Sheets-Sheet 8
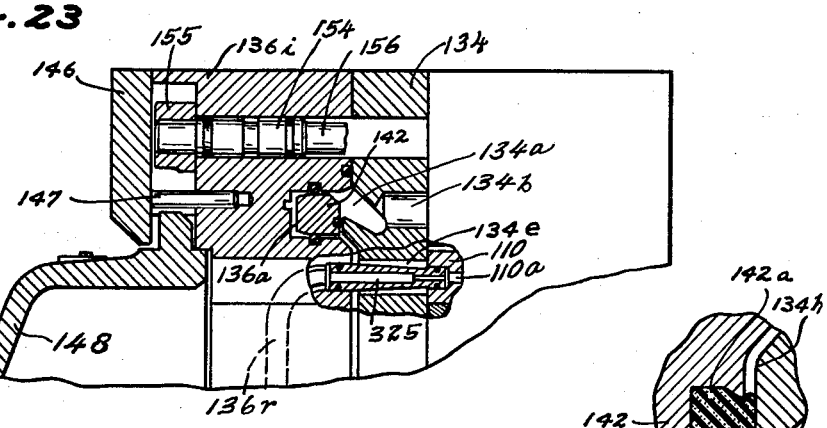
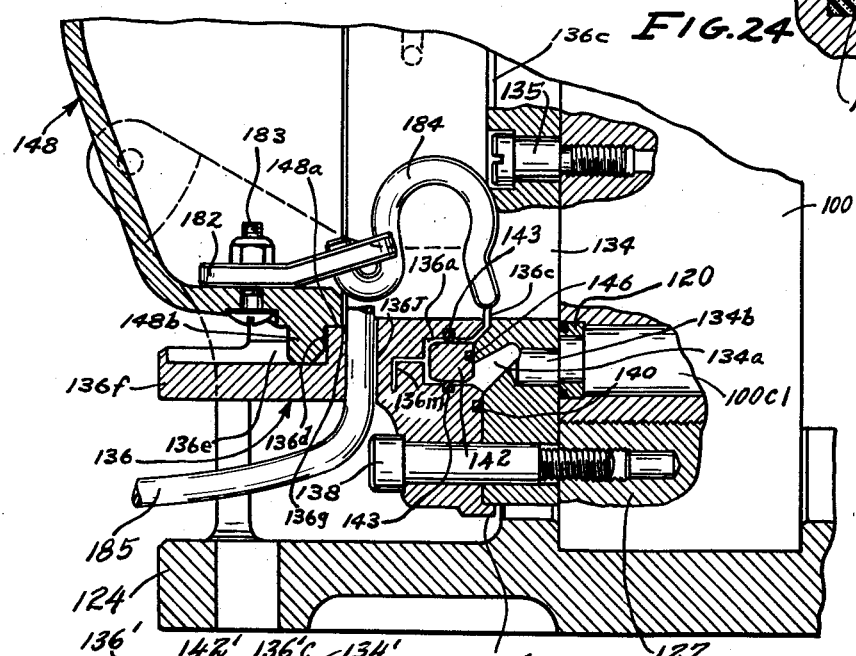
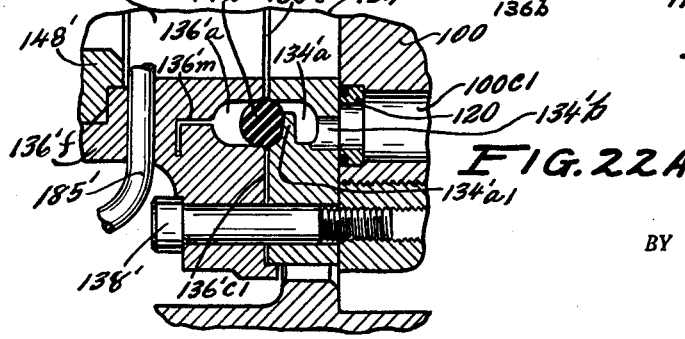
INVENTOR.
JOHN T. GONDEK
BY
ATTORNEYS

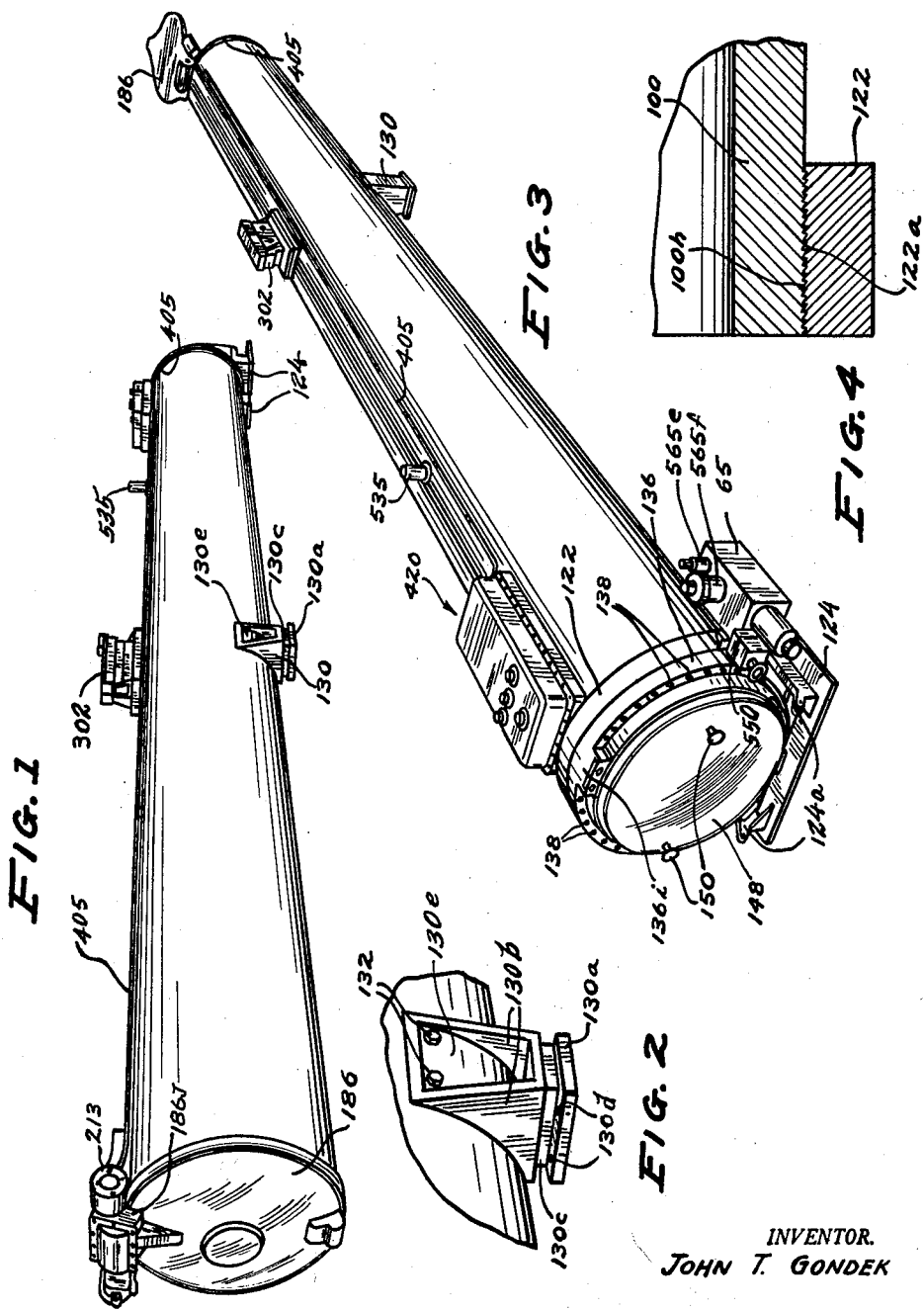

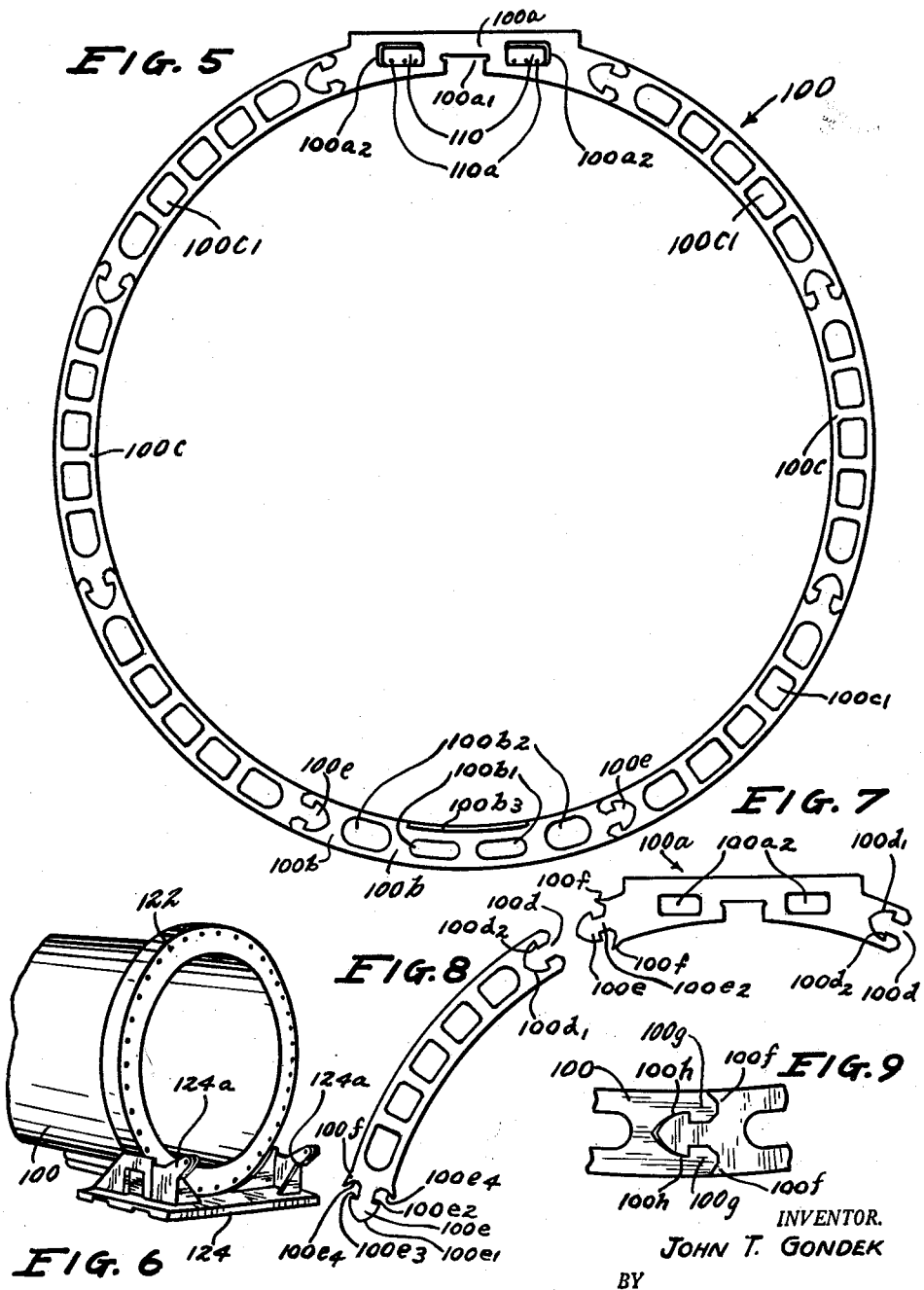

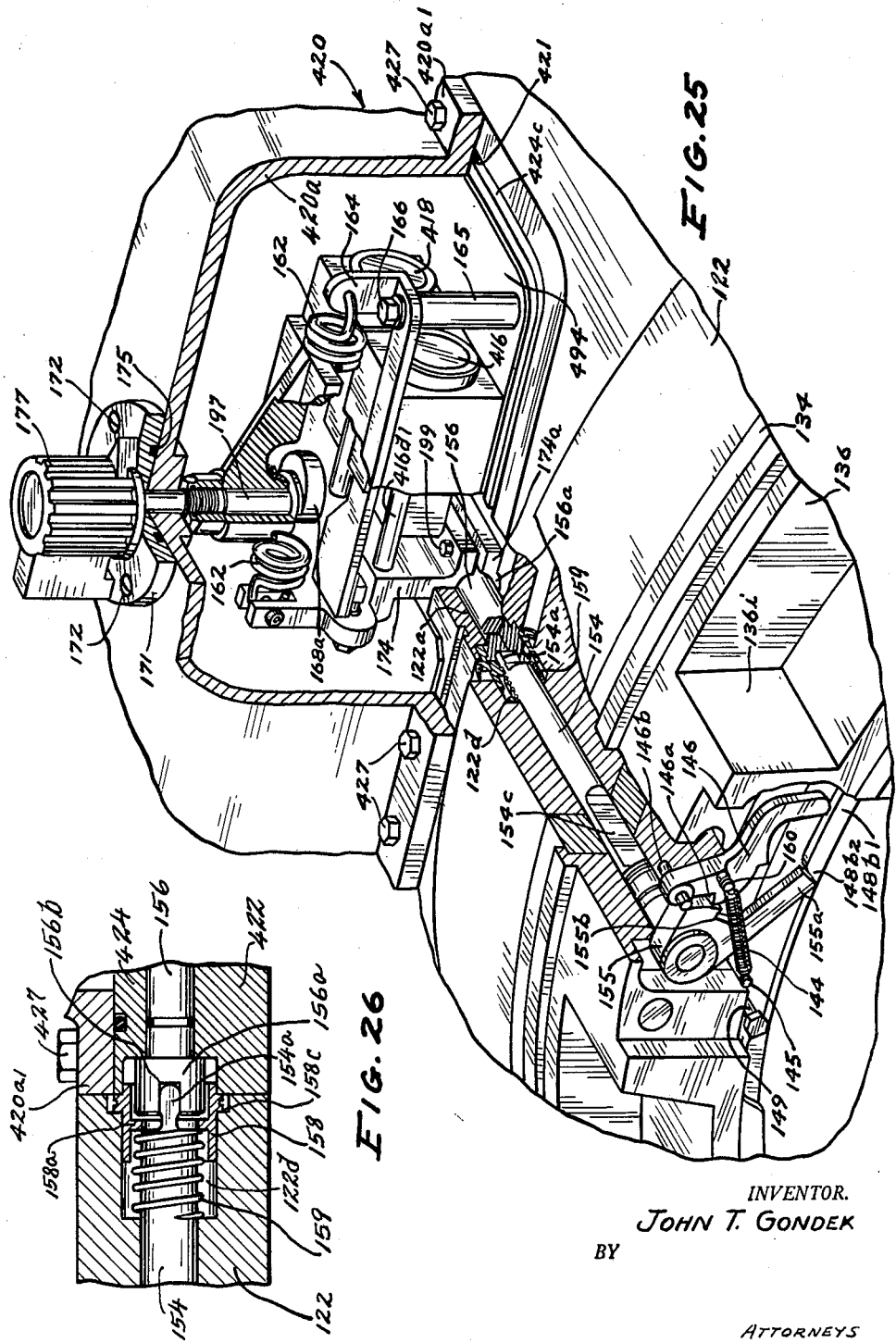

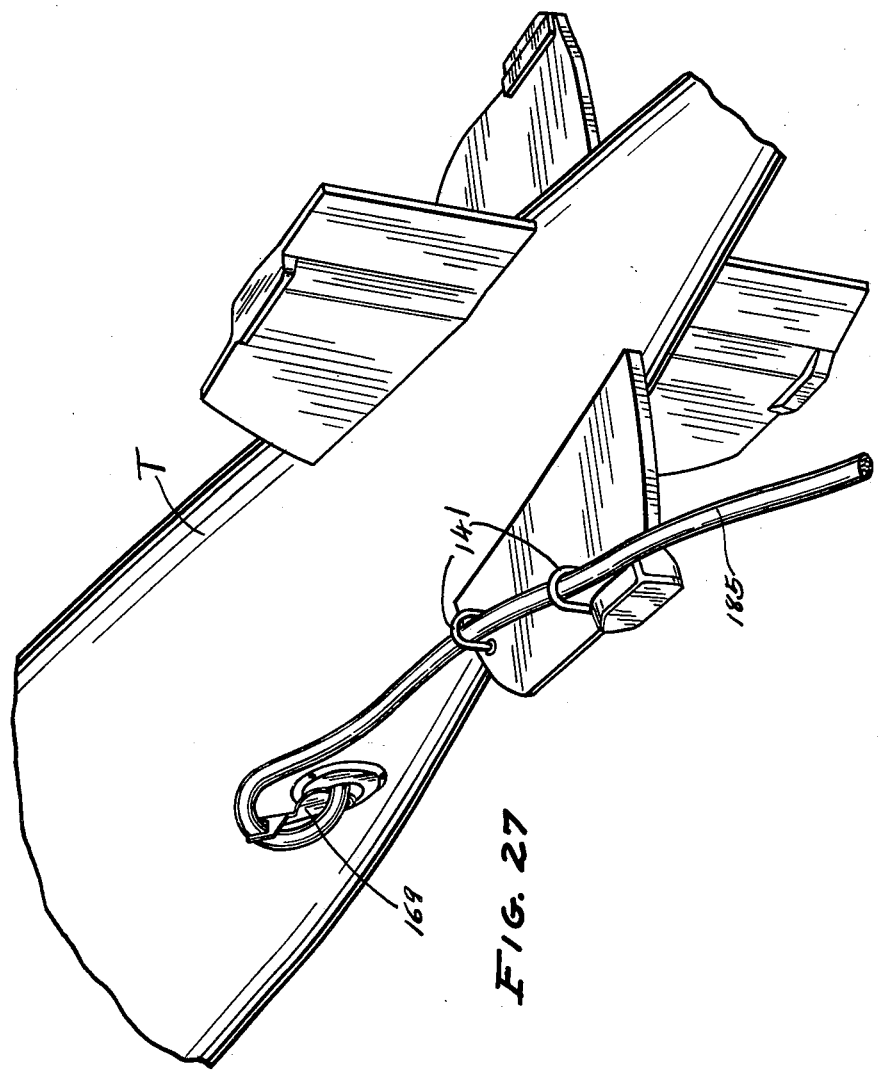

Oct. 15, 1963   J. T. GONDEK   3,106,905
TORPEDO TUBE AND METHOD FOR MAKING SAME
Original Filed March 22, 1956   45 Sheets-Sheet 11
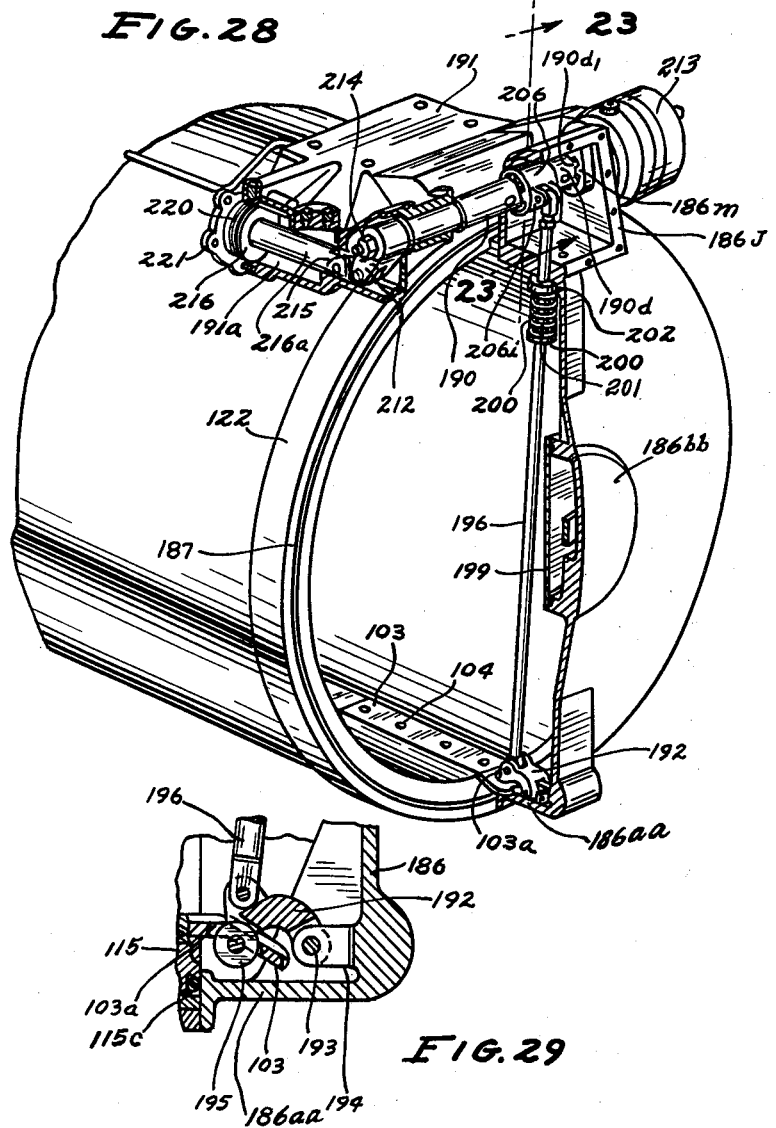
INVENTOR.
JOHN T. GONDEK
BY
ATTORNEYS

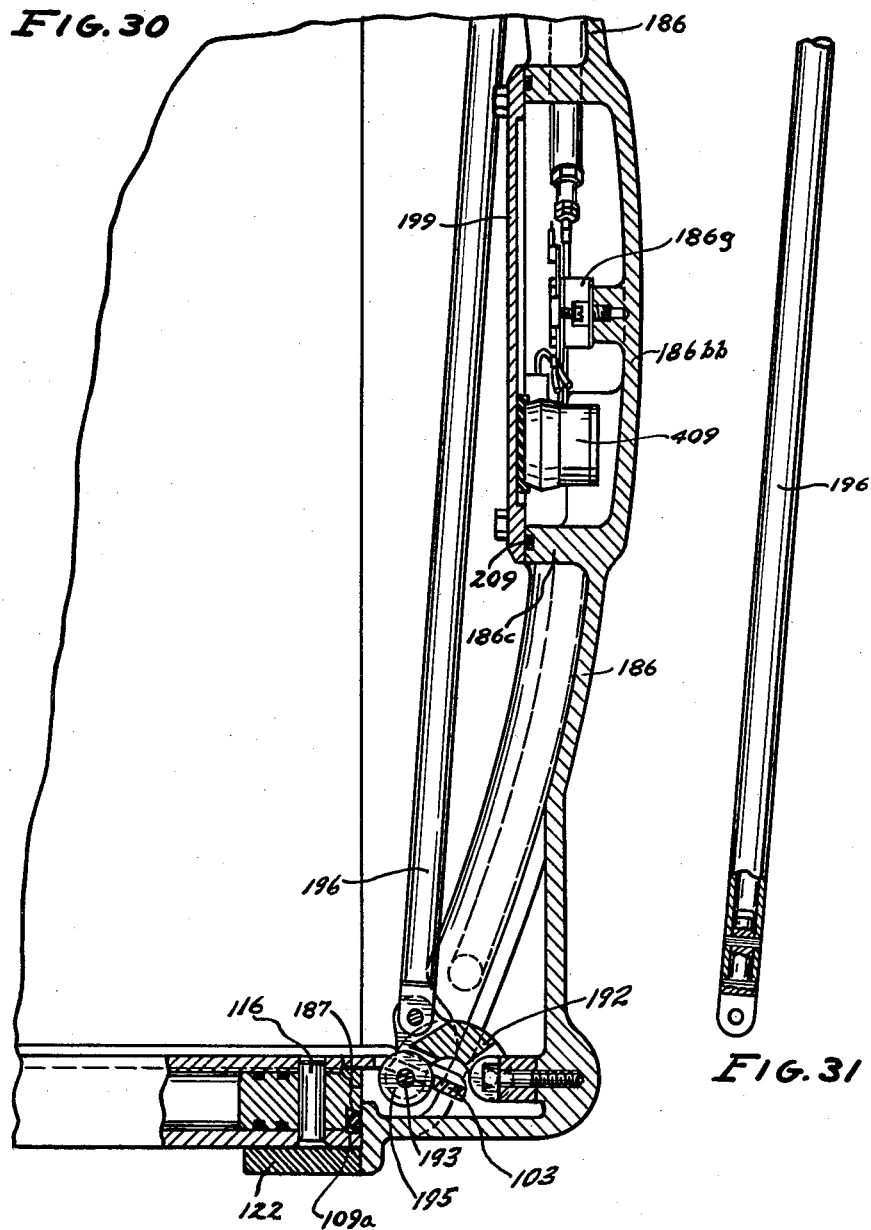

Oct. 15, 1963 J. T. GONDEK 3,106,905
TORPEDO TUBE AND METHOD FOR MAKING SAME
Original Filed March 22, 1956 45 Sheets-Sheet 13

INVENTOR.
JOHN T. GONDEK
BY

ATTORNEYS

Oct. 15, 1963  J. T. GONDEK  3,106,905
TORPEDO TUBE AND METHOD FOR MAKING SAME
Original Filed March 22, 1956  45 Sheets-Sheet 14
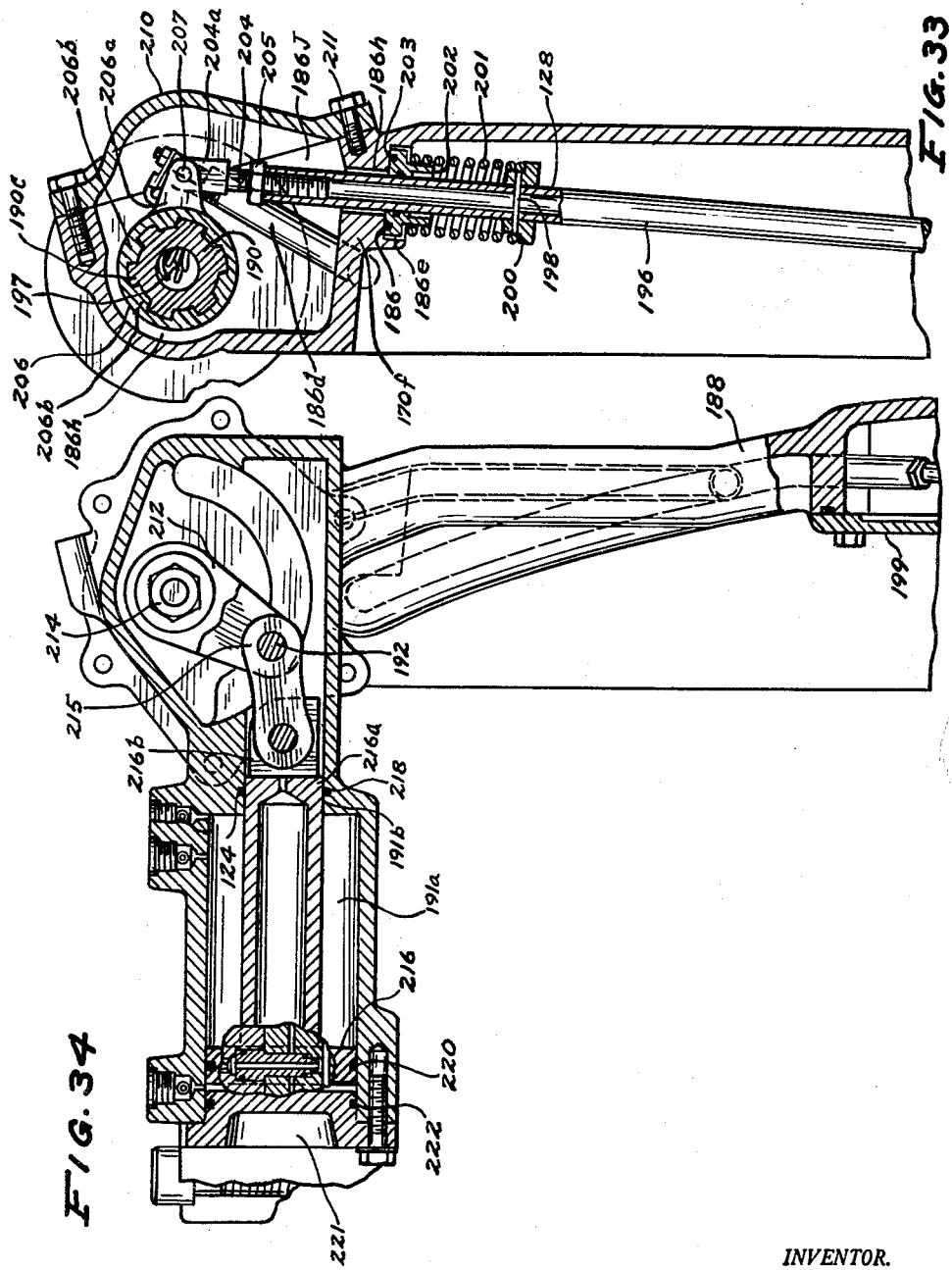
INVENTOR.
JOHN T. GONDEK
BY
ATTORNEYS Oct. 15, 1963  J. T. GONDEK  3,106,905
TORPEDO TUBE AND METHOD FOR MAKING SAME
Original Filed March 22, 1956  45 Sheets—Sheet 15
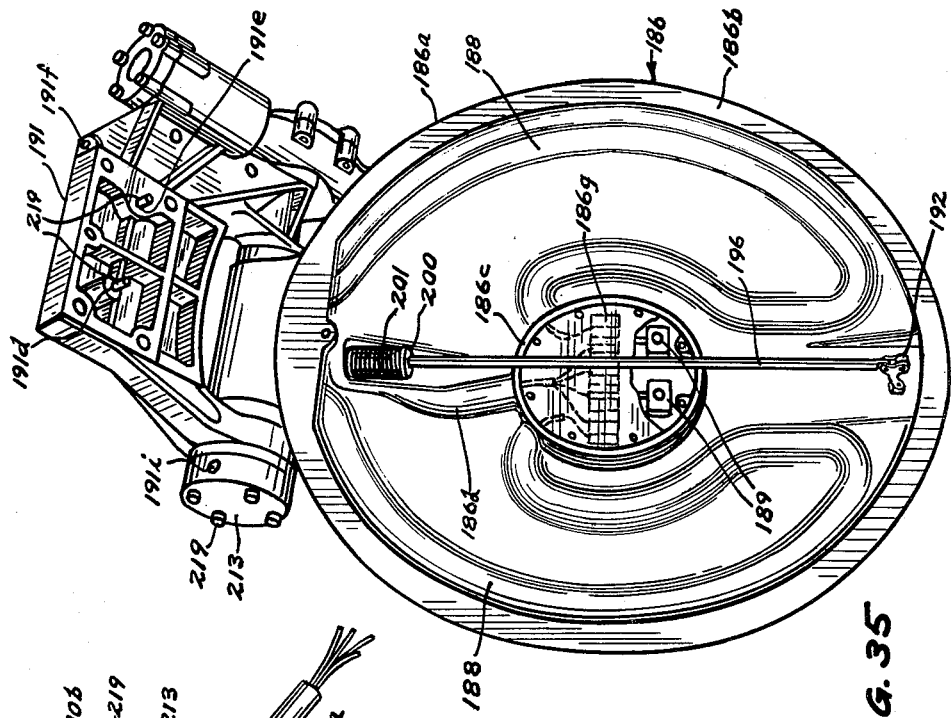
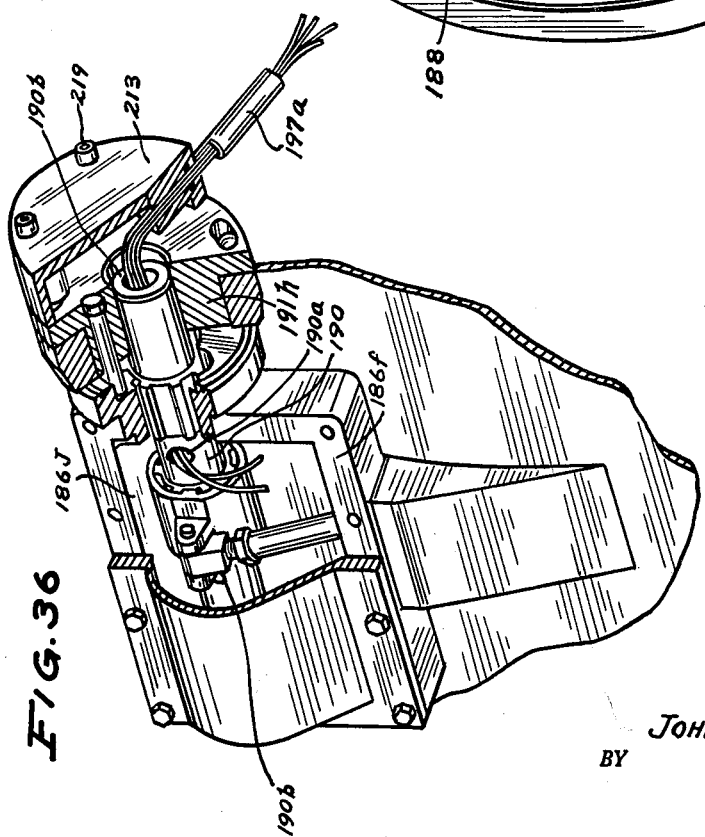
INVENTOR.
JOHN T. GONDEK
BY
ATTORNEYS

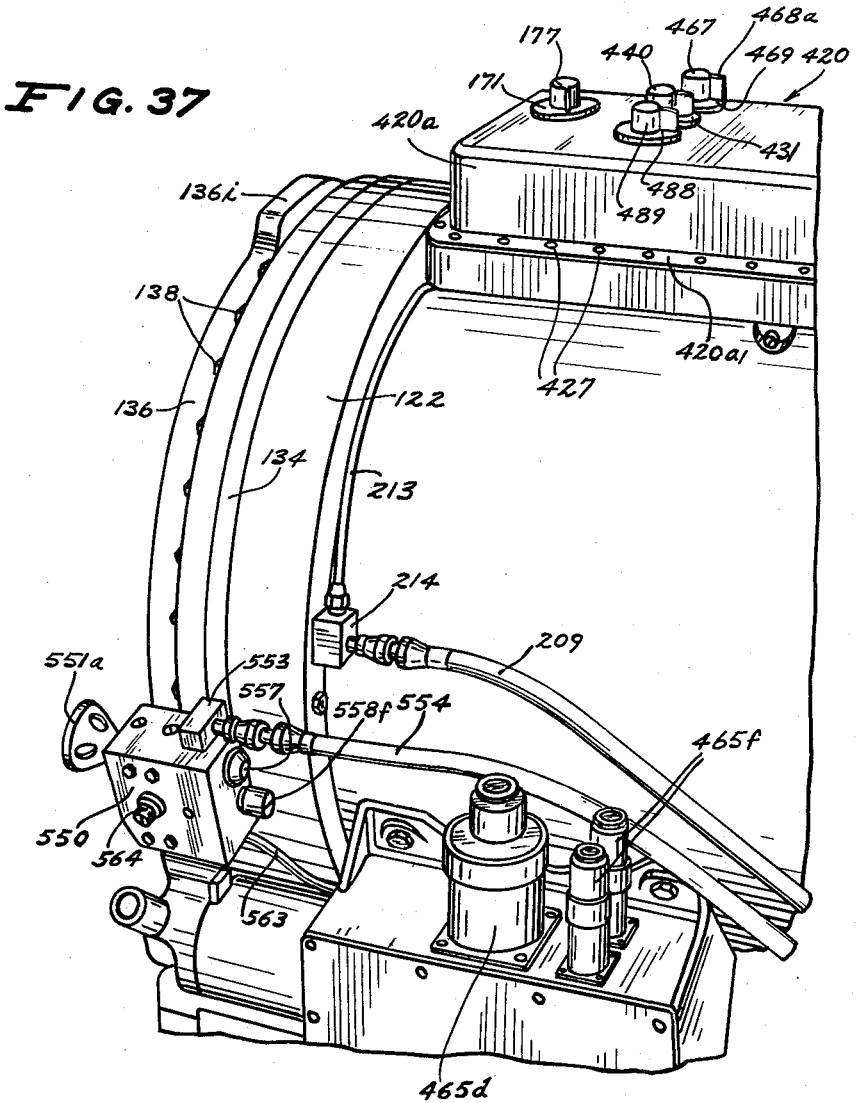

Oct. 15, 1963 J. T. GONDEK 3,106,905
TORPEDO TUBE AND METHOD FOR MAKING SAME
Original Filed March 22, 1956 45 Sheets-Sheet 17
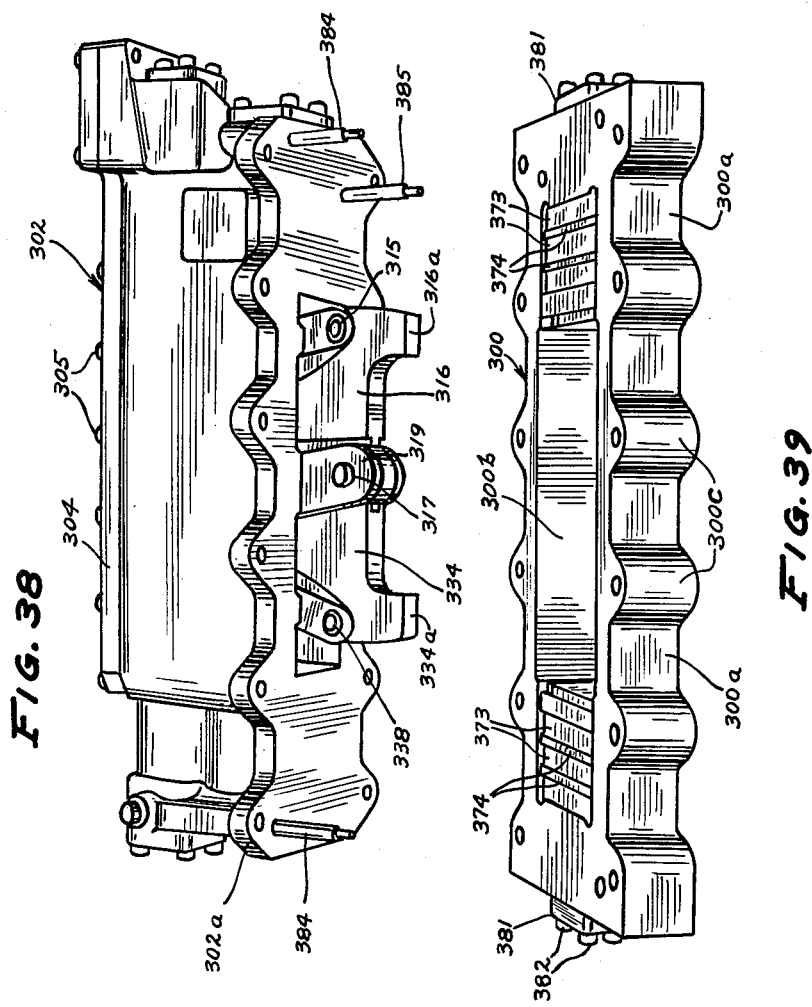
INVENTOR.
JOHN T. GONDEK
BY
ATTORNEYS Oct. 15, 1963    J. T. GONDEK    3,106,905
TORPEDO TUBE AND METHOD FOR MAKING SAME
Original Filed March 22, 1956    45 Sheets-Sheet 18

INVENTOR.
JOHN T. GONDEK
BY

ATTORNEYS

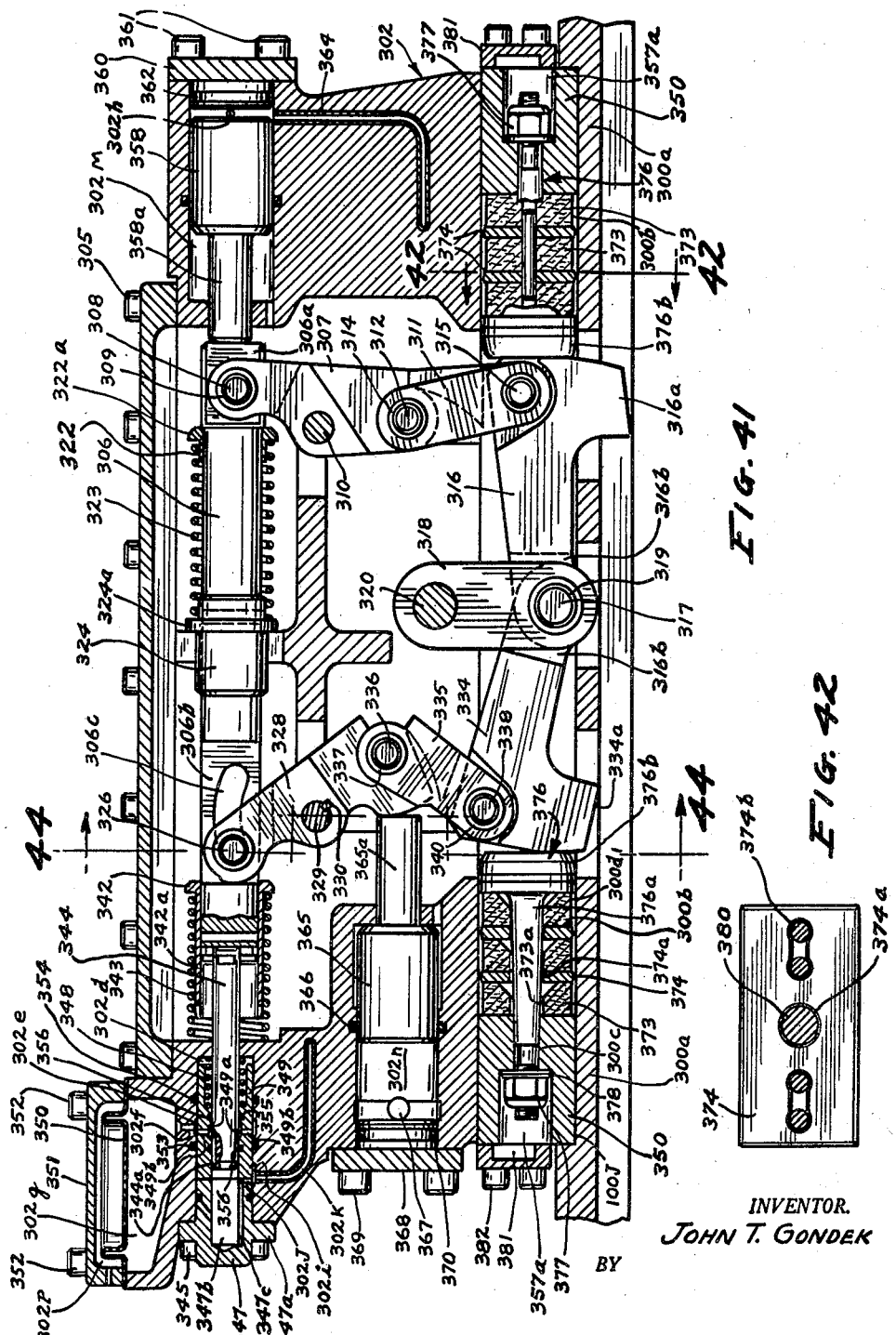

INVENTOR.
JOHN T. GONDEK
BY

ATTORNEYS

INVENTOR.
JOHN T. GONDEK
BY
ATTORNEYS

INVENTOR.
JOHN T. GONDEK
BY

ATTORNEYS

Oct. 15, 1963 J. T. GONDEK 3,106,905
TORPEDO TUBE AND METHOD FOR MAKING SAME
Original Filed March 22, 1956 45 Sheets-Sheet 23

INVENTOR.
JOHN T. GONDEK
BY

ATTORNEYS

Oct. 15, 1963  J. T. GONDEK  3,106,905
TORPEDO TUBE AND METHOD FOR MAKING SAME
Original Filed March 22, 1956  45 Sheets-Sheet 24

INVENTOR.
JOHN T. GONDEK
BY

ATTORNEYS

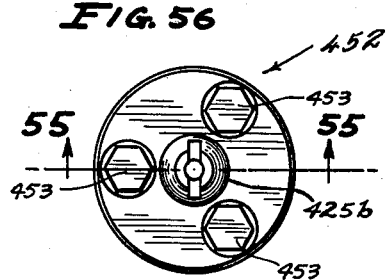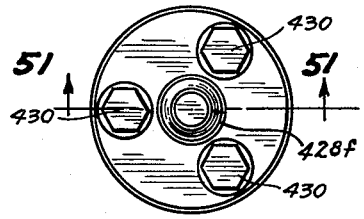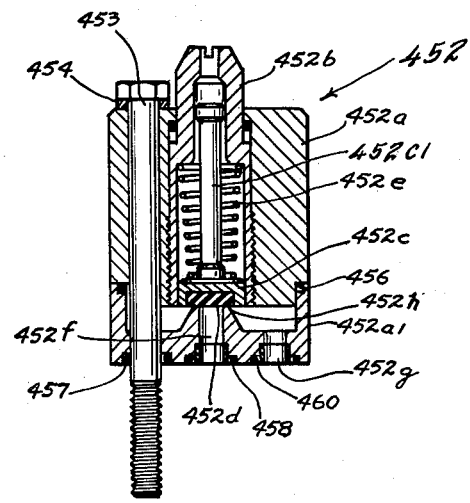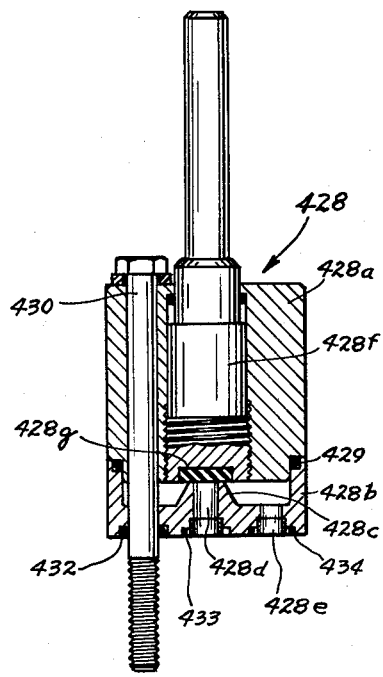

Oct. 15, 1963   J. T. GONDEK   3,106,905
TORPEDO TUBE AND METHOD FOR MAKING SAME
Original Filed March 22, 1956   45 Sheets—Sheet 26
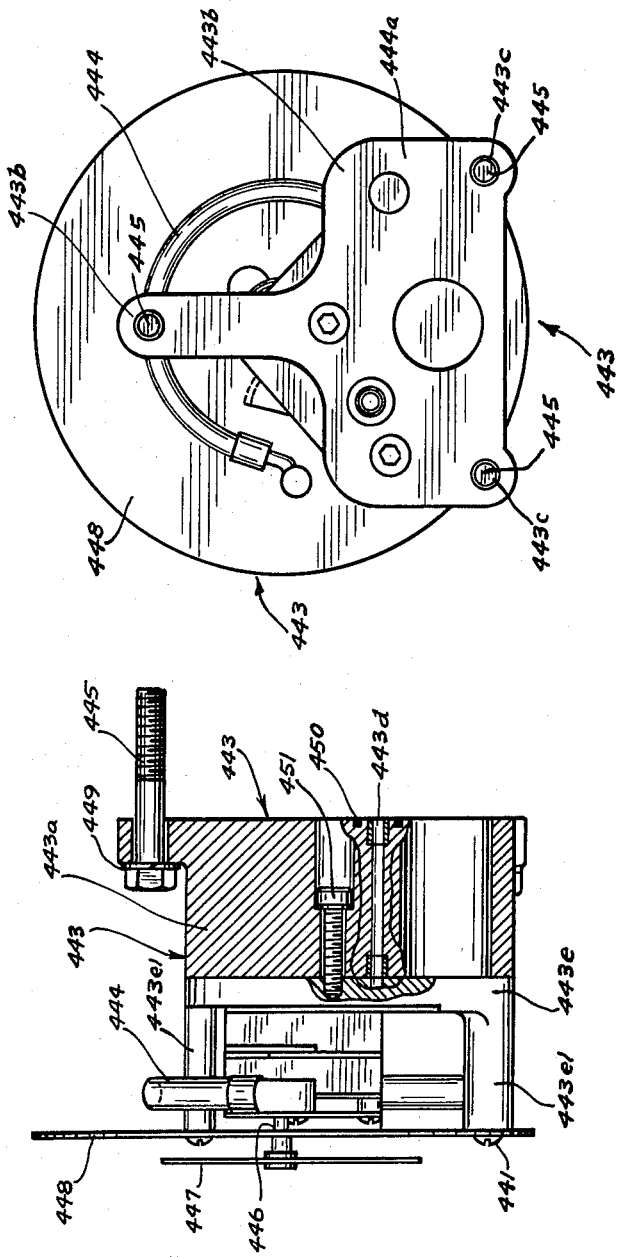
INVENTOR.
JOHN T. GONDEK
BY
ATTORNEYS

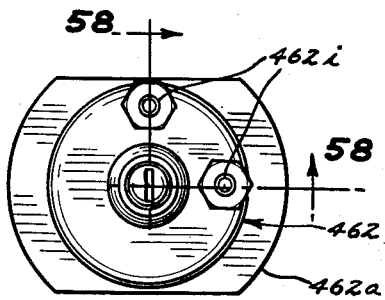
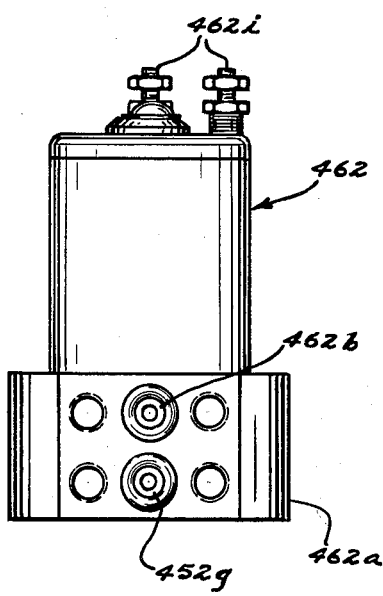
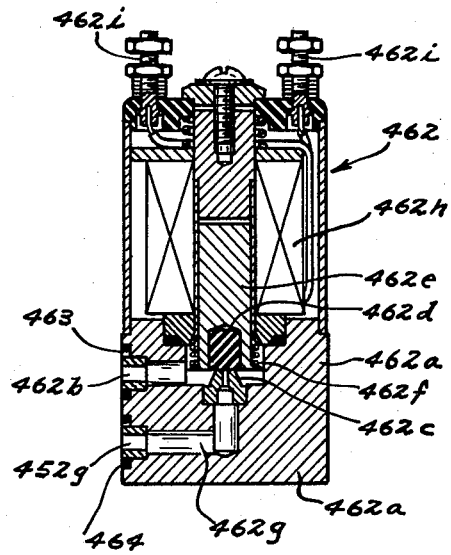

Oct. 15, 1963  J. T. GONDEK  3,106,905
TORPEDO TUBE AND METHOD FOR MAKING SAME
Original Filed March 22, 1956  45 Sheets-Sheet 28
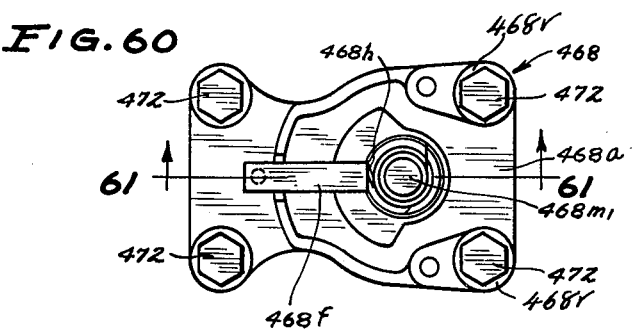
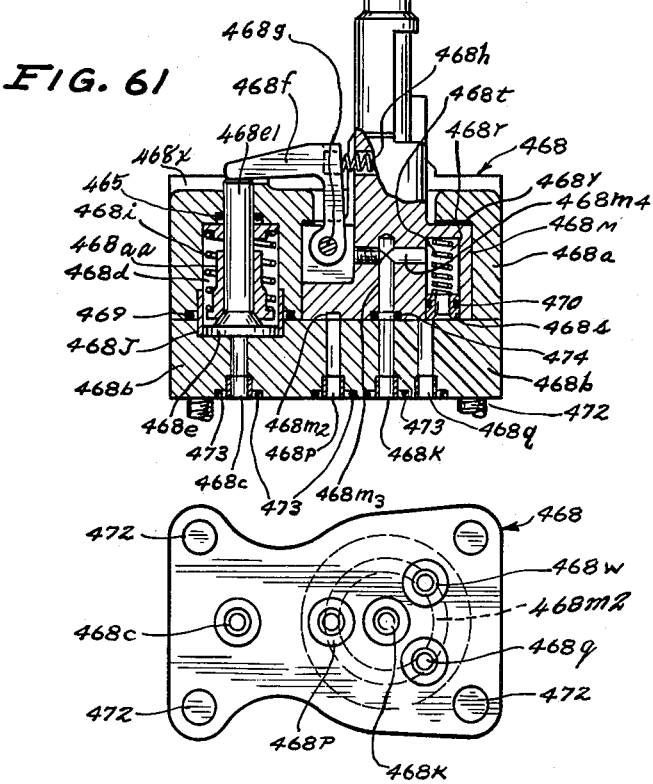
INVENTOR.
JOHN T. GONDEK
BY
ATTORNEYS Oct. 15, 1963  J. T. GONDEK  3,106,905
TORPEDO TUBE AND METHOD FOR MAKING SAME
Original Filed March 22, 1956  45 Sheets-Sheet 29
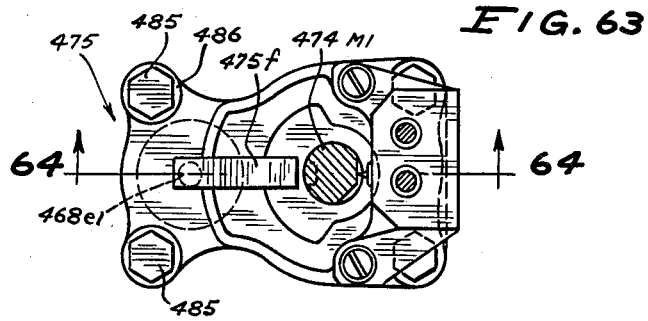
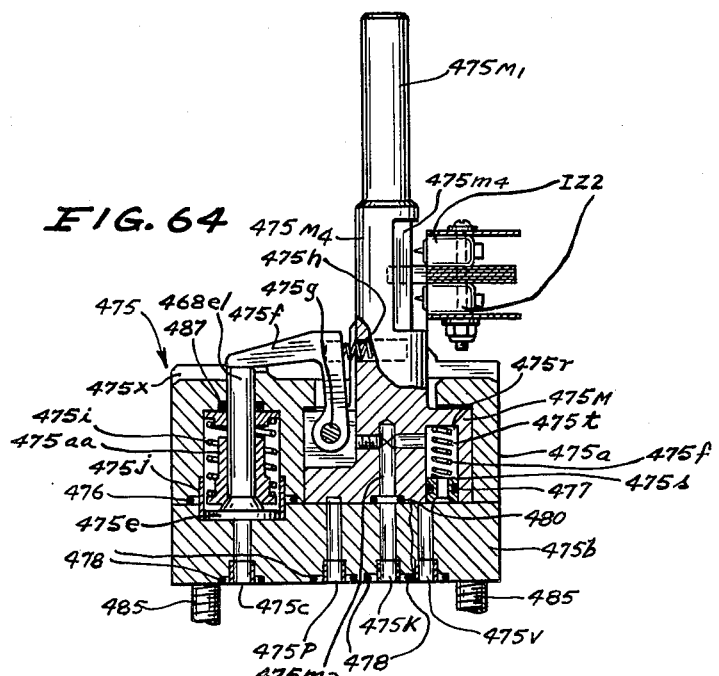
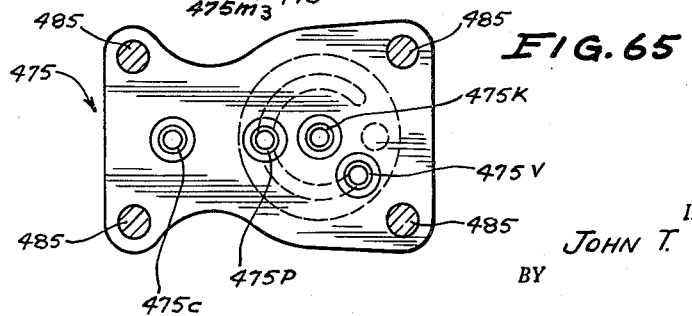
INVENTOR.
JOHN T. GONDEK
BY
ATTORNEYS

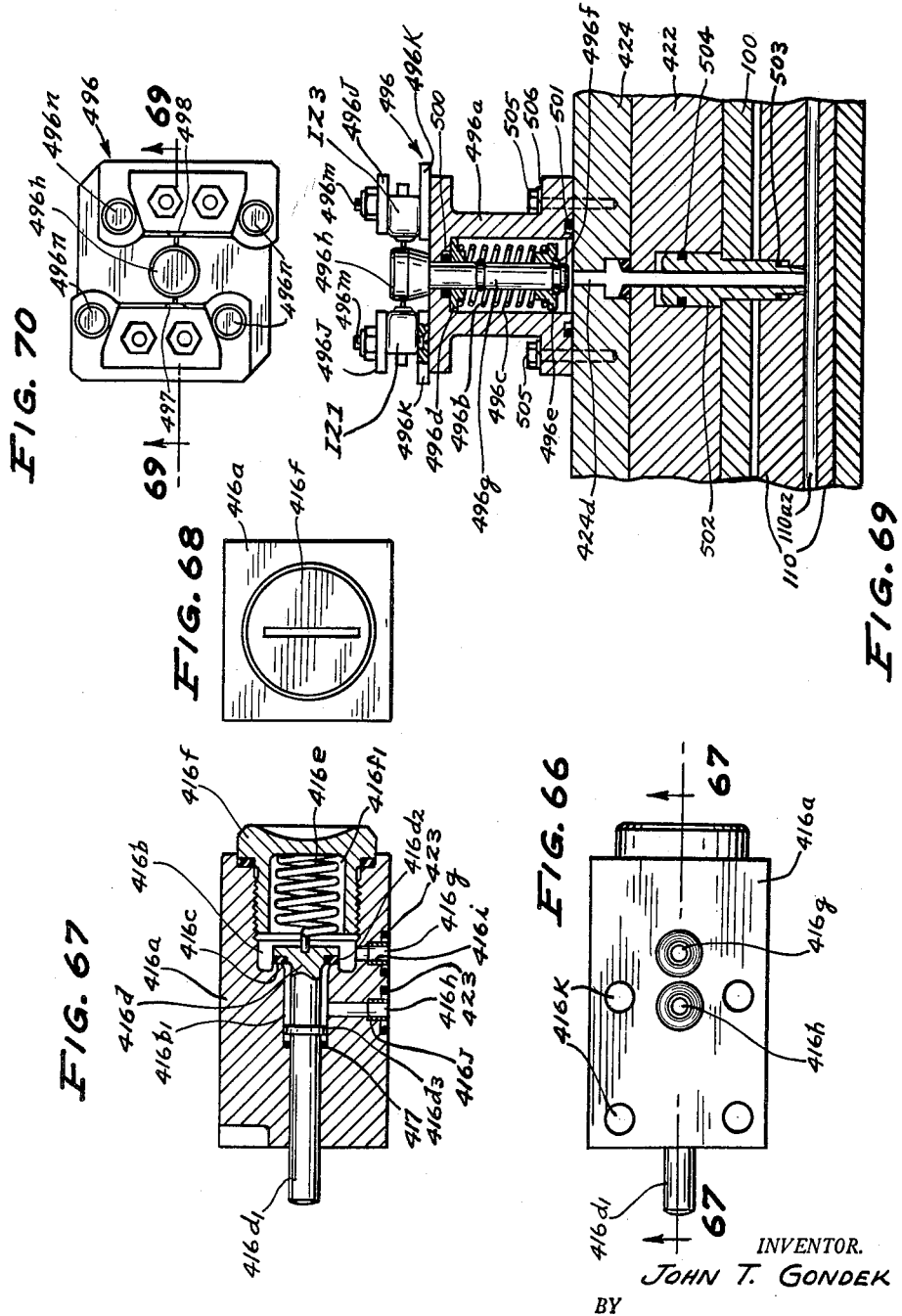

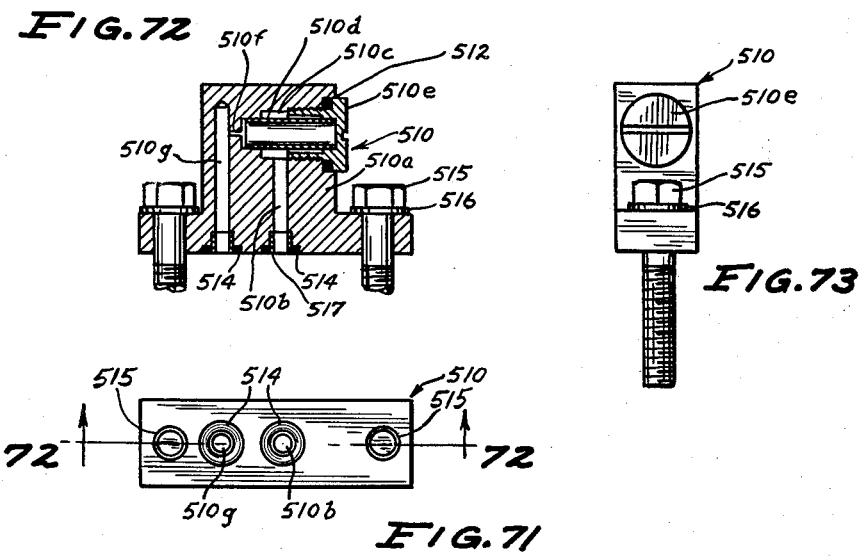
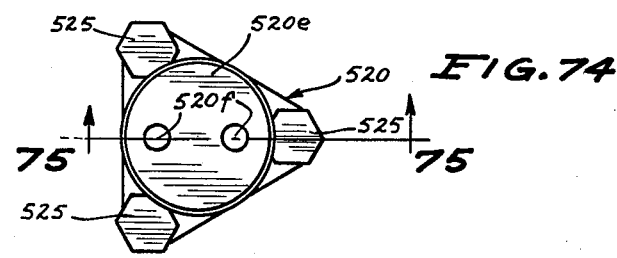
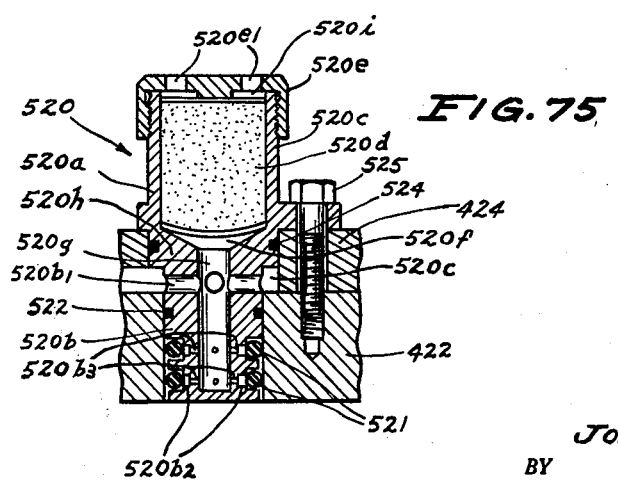
INVENTOR.
JOHN T. GONDEK

Oct. 15, 1963 J. T. GONDEK 3,106,905
TORPEDO TUBE AND METHOD FOR MAKING SAME
Original Filed March 22, 1956 45 Sheets-Sheet 32

INVENTOR.
JOHN T. GONDEK
BY

ATTORNEYS

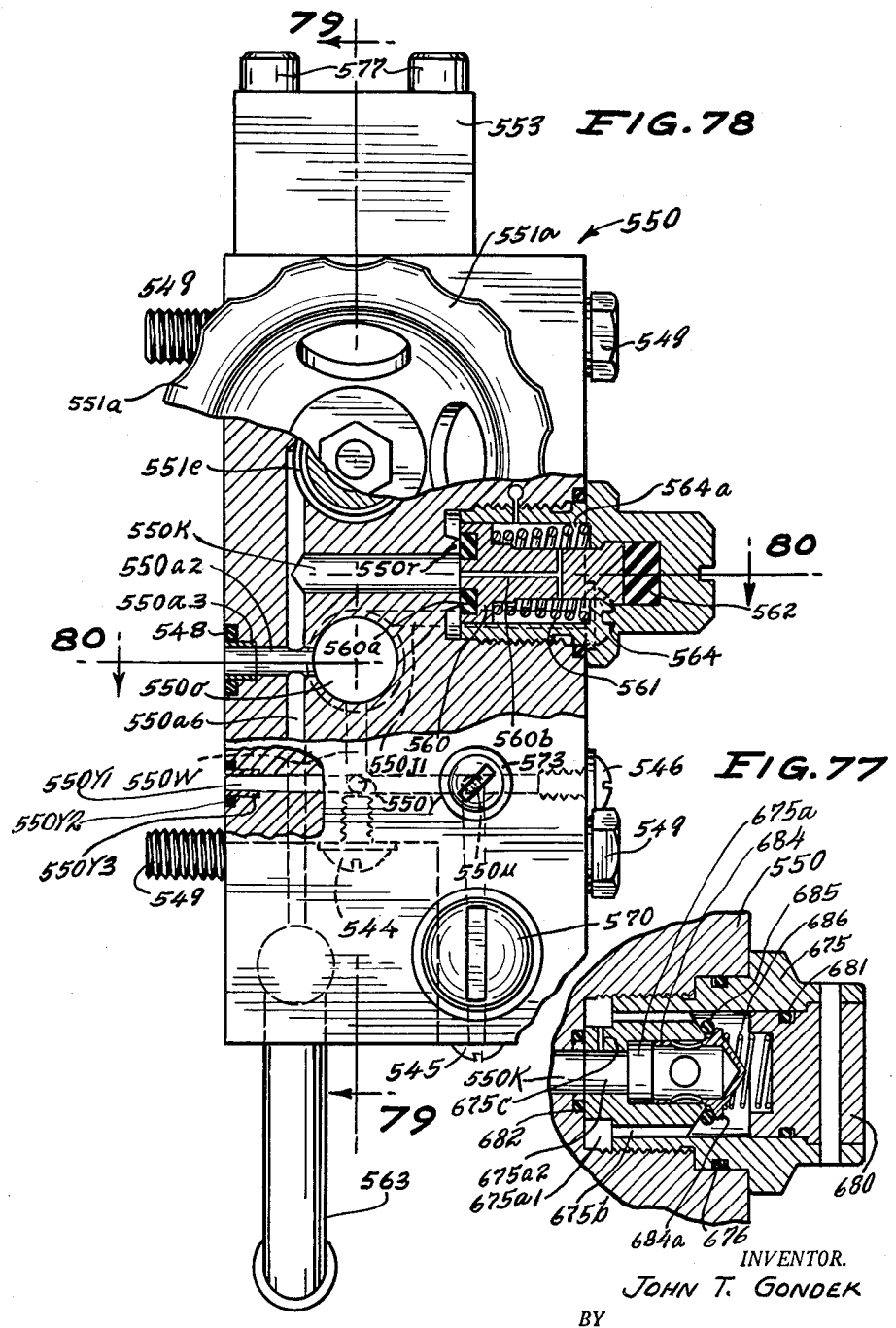

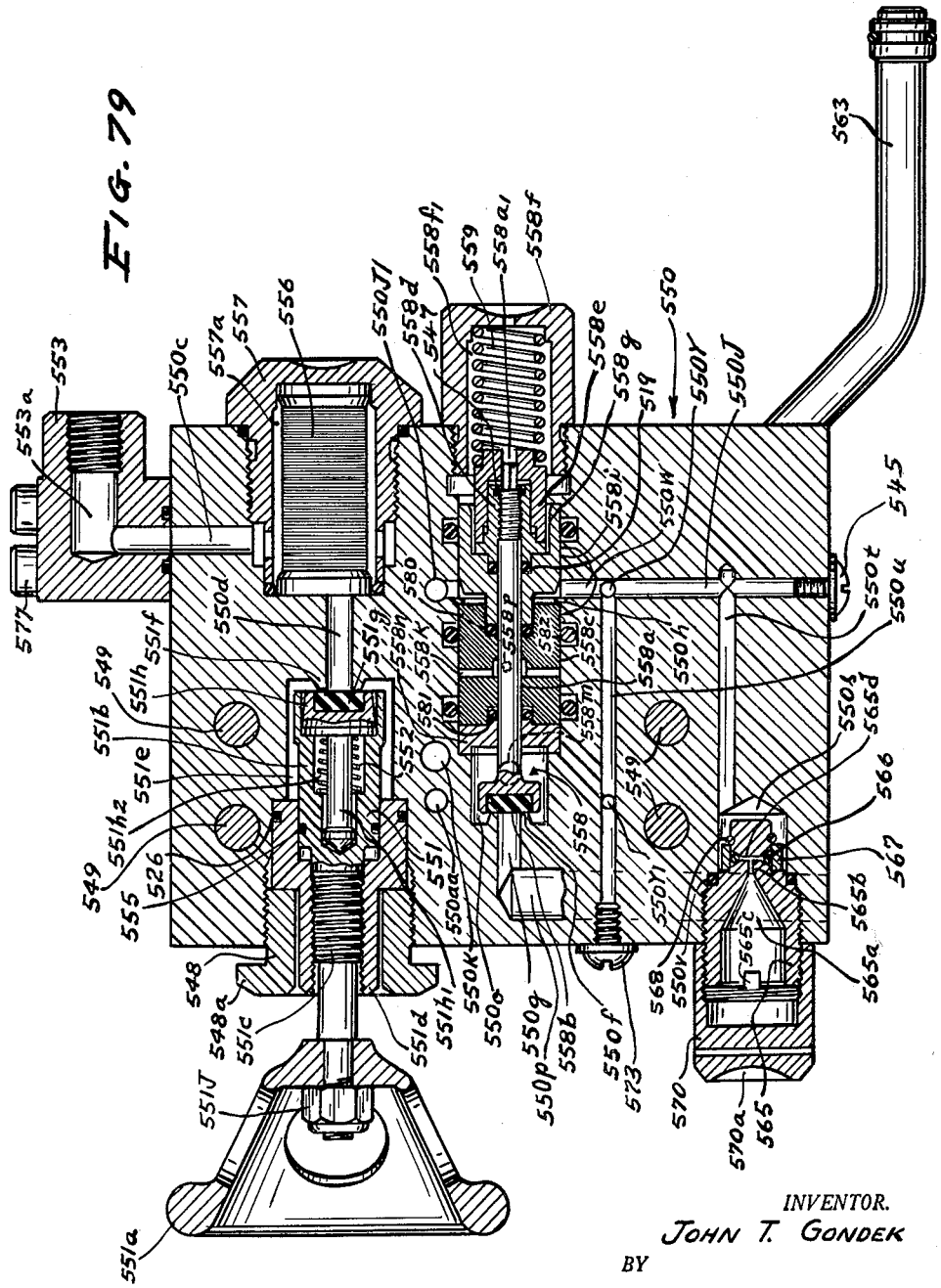

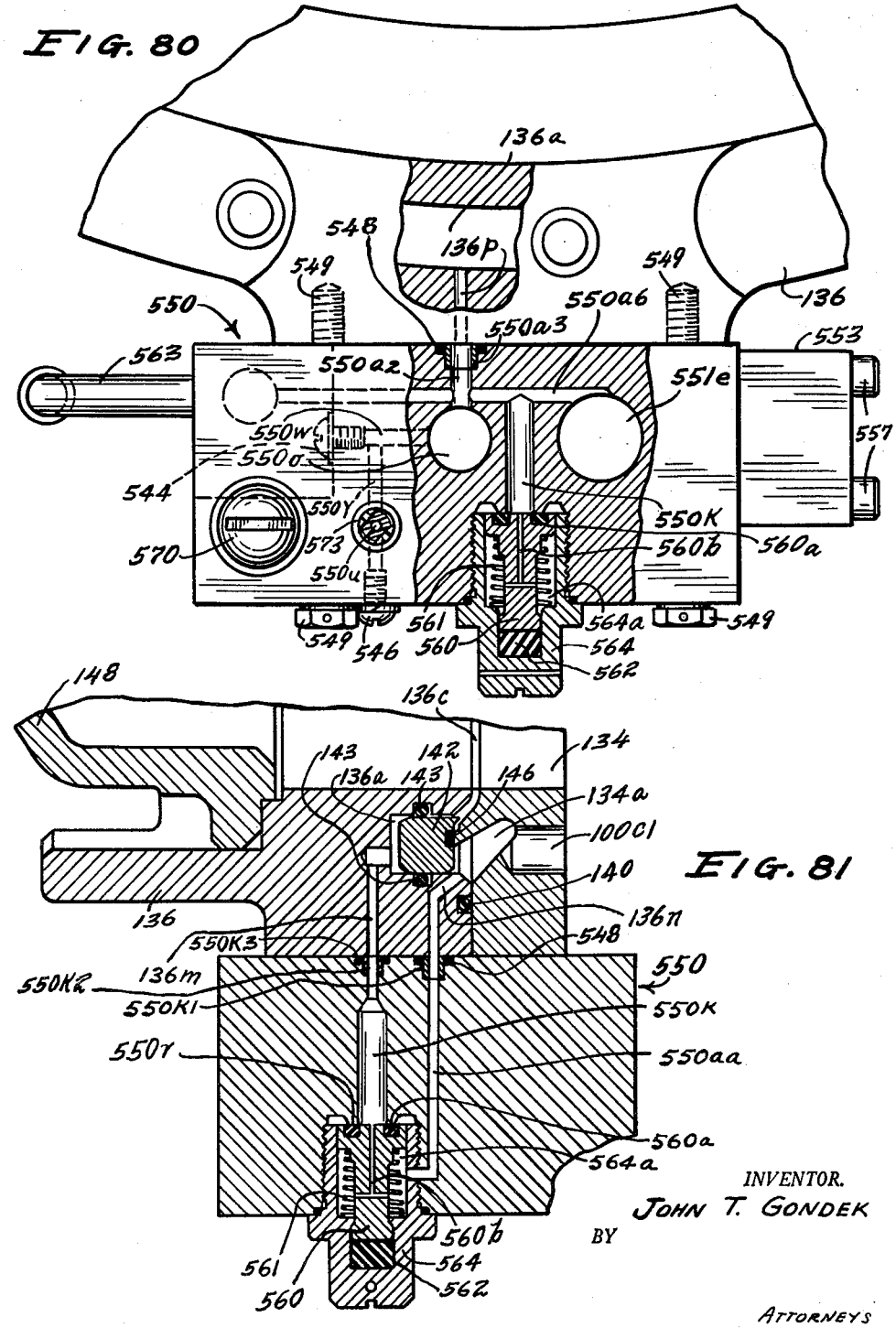

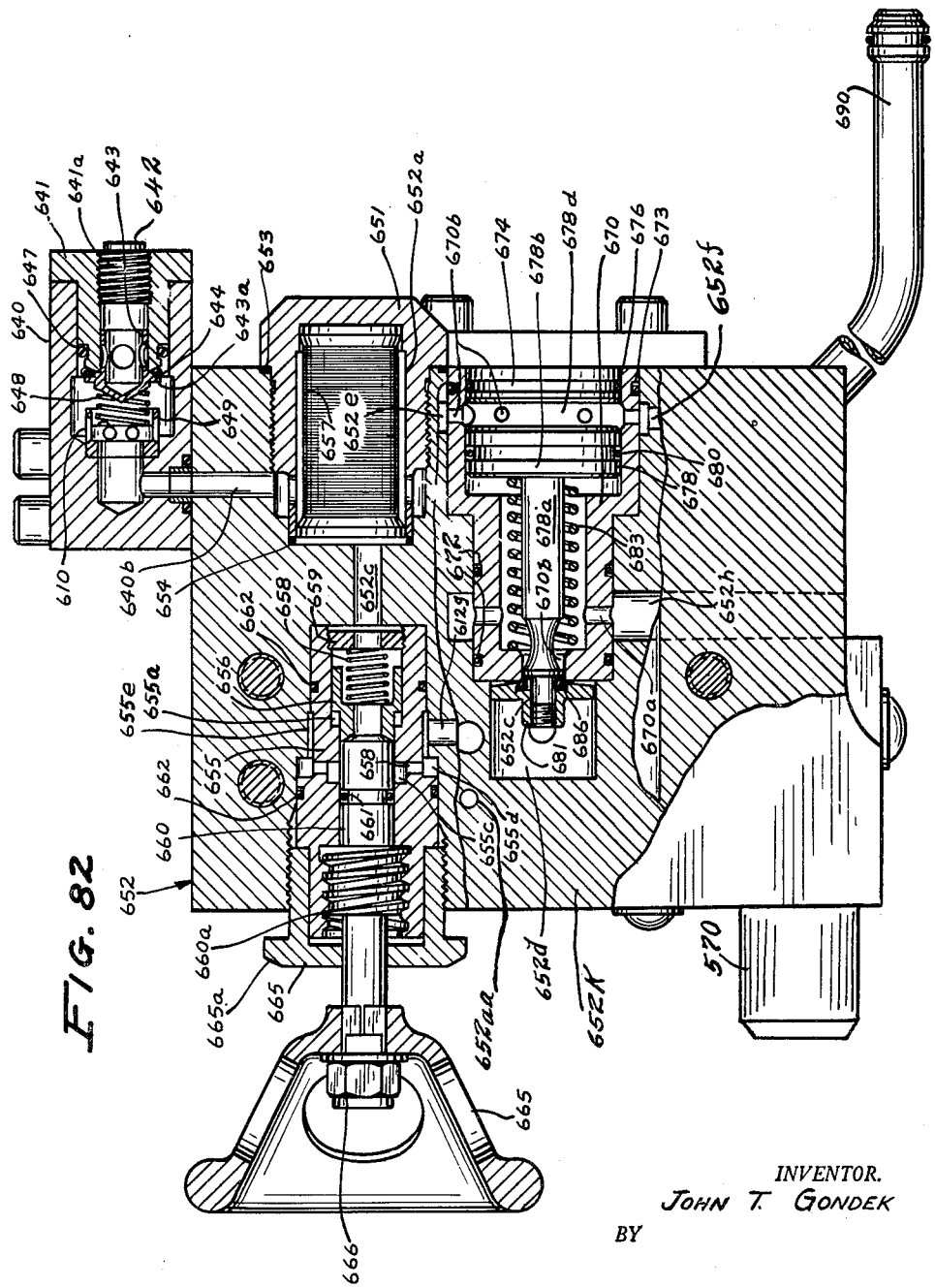

Oct. 15, 1963 J. T. GONDEK 3,106,905
TORPEDO TUBE AND METHOD FOR MAKING SAME
Original Filed March 22, 1956 45 Sheets-Sheet 37
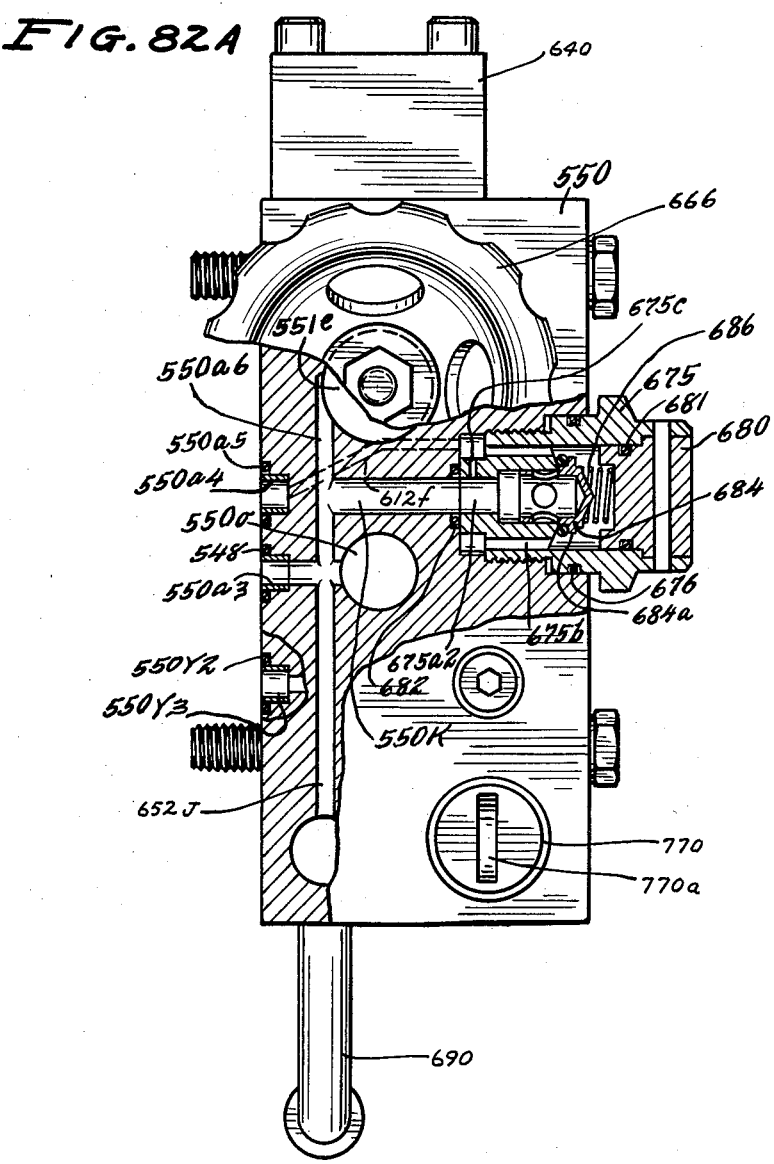
INVENTOR.
JOHN T. GONDEK
BY
ATTORNEYS

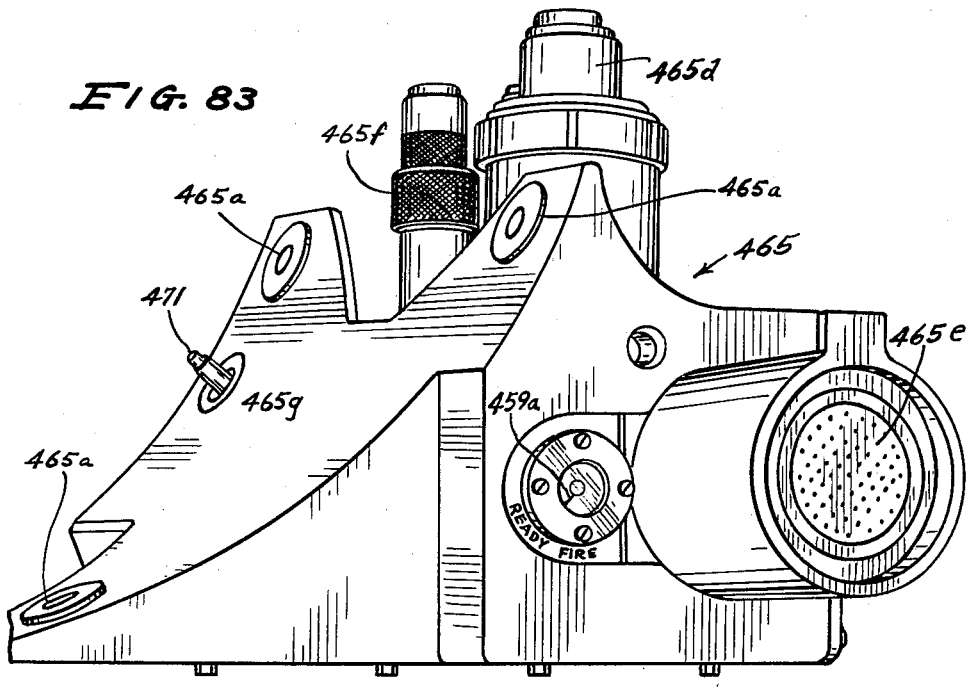
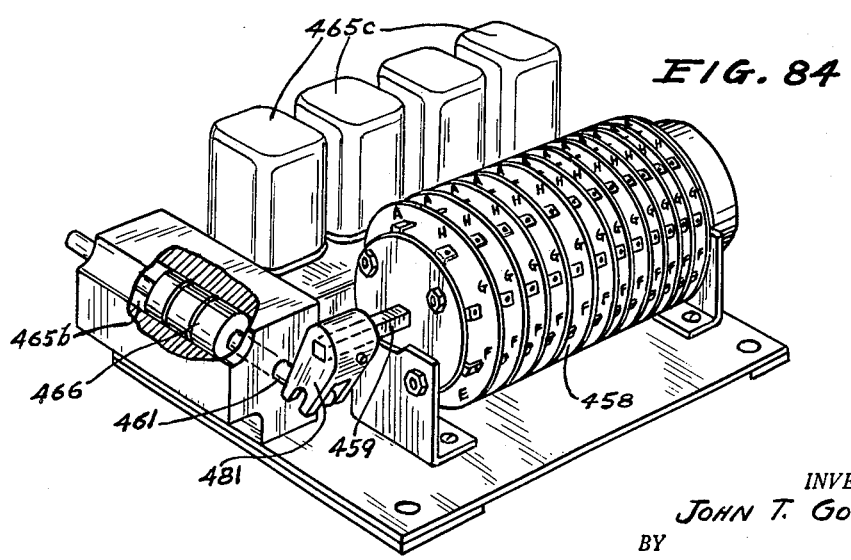
INVENTOR.
JOHN T. GONDEK
BY
ATTORNEYS

Oct. 15, 1963   J. T. GONDEK   3,106,905
TORPEDO TUBE AND METHOD FOR MAKING SAME
Original Filed March 22, 1956   45 Sheets-Sheet 39

INVENTOR.
JOHN T. GONDEK
BY

ATTORNEYS

Oct. 15, 1963   J. T. GONDEK   3,106,905
TORPEDO TUBE AND METHOD FOR MAKING SAME
Original Filed March 22, 1956   45 Sheets-Sheet 40

INVENTOR.
JOHN T. GONDEK
BY

ATTORNEYS

Oct. 15, 1963   J. T. GONDEK   3,106,905
TORPEDO TUBE AND METHOD FOR MAKING SAME
Original Filed March 22, 1956   45 Sheets-Sheet 45

INVENTOR.
JOHN T. GONDEK
BY

ATTORNEYS

3,106,905
TORPEDO TUBE AND METHOD FOR MAKING SAME
John T. Gondek, Minneapolis, Minn., assignor, by mesne assignments, to the United States of America as represented by the Secretary of the Navy
Original application Mar. 22, 1956, Ser. No. 573,306. Divided and this application Mar. 29, 1957, Ser. No. 652,642
35 Claims. (Cl. 114—238)

This invention relates to a torpedo tube. The invention contemplates an elongated cylindrical tube of novel construction adapted to receive a torpedo, together with novel means for operating and firing said torpedo.

This application is a division of copending U.S. patent application Serial No. 573,306, filed March 22, 1956, by the present applicant.

While said torpedo tubes have been made for some time, said tubes usually comprise tanks or storage vessels for fluid under pressure which were disposed at the outside of said tube. These tanks necessitated operating and control members, such as valves, etc, located outside of the tube. It has been the common practice to construct the tube of one casting or of a very small number of pieces, which casting and said pieces assembled to form a cylinder had to be finished on the inside. It is very desirable to have a torpedo tube with a minimum number of operating parts at the outer side thereof and to provide a tube which comprises easily assembled parts and which does not require a finished bore. It is also desirable to have a torpedo tube with the operating parts efficiently located, thus facilitating the operation of the tube. It is also desirable to have a torpedo tube which is light in weight.

It is therefore an object of this invention to provide a torpedo tube of novel and simple construction adapted for very convenient use on the deck of a ship.

It is another object of this invention to provide a torpedo tube which is light in weight and has very few accessory parts at the exterior of said tube.

It is a further object of this invention to provide a novel structure of torpedo tube, which tube may be used singly or in a multiple installation and said tube being adapted for use in either a fixed installation or a movable installation, such as on shipboard.

It is also an object of this invention to provide a torpedo tube using a medium under pressure for propelling a torpedo, said medium being carried or stored in the wall of said tube.

It is another object of this invention to provide a torpedo tube having a plurality of chambers in the wall thereof extending longitudinally of the tube for containing a fluid such as air under pressure used for propelling a torpedo.

It is a further object of this invention to provide a torpedo tube constructed of a plurality of segmental portions suitably connected at their adjacent sides.

It is also an object of this invention to provide a torpedo tube formed of a plurality of semi-cylindrical portions having a tongue and groove connection at their adjacent sides, said tongues and grooves being tightly joined together to form a rigid tube.

It is another object of this invention to provide a torpedo tube formed of a plurality of semi-cylindrical sections, said sections having at their adjacent edges respectively male and female interfitting parts which are tightly pressed together to form a rigid cylindrical tube.

It is still another object of this invention to provide a torpedo tube constructed of a plurality of extruded segmental portions of metal, such as aluminum, having connecting means at their adjacent edges respectively.

It is also an object of this invention to provide a torpedo tube having thereon a control panel with a plurality of movable control elements therein for controlling the various operating parts of said tube.

It is still further an object of this invention to provide a torpedo tube having a chamber in the wall thereof containing fluid under pressure, a firing member chamber arranged to communicate with said chamber and with the bore of said tube, a firing member movable in said second mentioned chamber cutting off communication between said bore and said first mentioned chamber, and means for moving said firing member to permit communication between said bore and first mentioned chamber to fire said torpedo.

It is a further object of this invention to provide such a torpedo tube as set forth in the preceding paragraph, said second mentioned chamber being of annular form and said firing member constituting a ring, said ring being held in position to prevent communication between said first mentioned chamber and said bore by fluid under pressure, and means for exhausting said fluid under pressure from said firing ring chamber at one side of said ring to permit said fluid under pressure to enter said bore and fire said torpedo.

It is also an object of this invention to provide an elongated tube adapted to receive a torpedo, said tube having a chamber in the wall thereof adapted to contain fluid under pressure, a panel plate on said tube having openings therethrough, means connecting said chamber with certain of said openings, a valve plate overlying said panel plate and having a plurality of grooves at the side thereof opposite said panel plate, openings extending from said grooves respectively to the opposite side of said valve plate and communicating with certain of said first mentioned openings and connections between said grooves and certain of the components on said tube adapted to be operated whereby said grooves form channels for conveying fluid under pressure to said components.

It is also an object of this invention to provide a torpedo tube having an open breech end, a removable door for closing said end, said door having spaced peripheral flanges thereon, said tube having spaced flanges behind which said first mentioned flanges may be disposed by rotation of said door.

It is a further object of this invention to provide such a structure as set forth in the preceding paragraph, a locking means for said door, a control panel, and means on said control panel for moving said locking means to locked and unlocked position.

It is another object of this invention to provide a torpedo tube, a door for closing the muzzle end of said tube, a latching means for said door when in closed position, and means such as fluid under pressure for moving said door to open position.

It is also an object of this invention to provide such a structure as set forth in the preceding paragraph, a movable member for opening said door, means for moving said latching means to unlatched position by a certain movement of said movable member, and means for opening said door in a later movement of said movable member.

It is a further object of this invention to provide an elongated tube adapted to receive a torpedo, a door for closing the muzzle end of said tube, means comprising fluid under pressure for opening said door, and means comprising fluid under a lesser pressure for closing said door.

It is also an object of this invention to provide a torpedo tube having stops spaced longitudinally therein arranged to engage a member on the torpedo, means for moving said stops into and out of operating position, a firing means, and means for actuating said firing means when said stops have been moved to inoperative position.

It is also an object of this invention to provide an elongated tube of novel construction adapted to receive a torpedo and heating means for various parts of said tube respectively for maintaining said parts at a certain temperature.

It is a further object of this invention to provide an elongated tube adapted to receive a torpedo, a member carried by a torpedo, spaced stop members in said tube arranged to be engaged by said member to prevent longitudinal movement of said torpedo, means for moving said stop members into and out of the path of said member, a pilot valve movable to open position for causing firing of said torpedo, means for moving said stops out of the path of said member and for causing opening of said pilot valve to fire said torpedo.

It is a further object of this invention to provide an elongated tube adapted to receive a torpedo, said tube having a plurality of channels extending longitudinally therein for containing fluid under pressure, together with novel and efficient means for closing the ends of said channels.

It is also an object of this invention to provide an elongated tube adapted to receive a torpedo, a source of fluid under pressure, a member preventing communication between said source and the bore of said tube, a pilot valve, and means for opening said pilot valve when said tube is ready to be fired to cause movement of said member and permit said air under pressure to enter said bore and fire a torpedo.

It is also an object of this invention to provide a structure such as set forth in the preceding paragraph, said member being held in position preventing said communication by air under pressure at each side thereof, said air being exhausted from one side thereof when said pilot valve is opened to cause said movement of said member to permit air under pressure to enter said bore.

It is a further object of this invention to provide an elongated tube adapted to receive a torpedo, a tripping latch extending into said tube into position to be engaged by the starting lever of a torpedo moving toward the muzzle of said tube so that said lever is moved to start the mechanism in said torpedo.

It is also an object of this invention to provide a torpedo tube, said tube comprising a chamber for containing air under pressure, an air valve movable to different positions for controlling the supply of air from said chamber, a selector valve receiving air from said air valve for directing air to certain of said components and a firing valve movable to different positions so that said tube can be fired by an operator adjacent said torpedo or by an operator in a position remote from said torpedo.

It is still further an object of this invention to provide a novel method of making a cylindrical torpedo tube which consists in forming a plurality of semi-cylindrical sections forming mating coupling members at the adjacent sides of said sections respectively, arranging said sections into a rigid tube with said coupling members respectively engaged to form a complete tube.

It is also an object of this invention to provide a novel method of making a cylindrical torpedo tube which consists in forming a plurality of semi-cylindrical sections forming male and female coupling members at the opposite sides of said sections respectively, arranging said sections into a tube with said coupling members at the adjacent sides of said sections interengaged and pressing said female coupling members into tight rigid contact with said male couplings to hold said sections in rigid cylindrical form.

It is a further object of this invention to provide a novel method of making a torpedo tube which consists in extruding a plurality of semi-cylindrical sections with means at the sides thereof respectively for connecting said sections, arranging said sections to form a cylindrical tube with said means at the sides of said sections interengaged and formingn said means into rigid connected condition fo rholding said tube in rigid cylindrical form.

It is another object of this invention to provide a novel method of forming a section of a torpedo tube which consists in forming a semi-cylindrical plate-like member, forming a channel in said member extending longitudinally therethrough, forming a bar adapted to be received in said chamber, forming one or more passages in said bar extending longitudinally thereof and placing said bar in said first mentioned channel.

It is further an object of this invention to provide an elongated cylindrical tube adapted to receive a torpedo, the same having an outer deicing casing of flexible material overlying a cushion layer whereby ice can be removed therefrom by repeated blows delivered thereto.

It is also an object of this invention to provide such a structure as set forth in the preceding paragraph, said flexible material preferably being treated so that ice will not adhere tightly thereto and said cushion layer also being made of insulating material.

These and other objects and advantages of the invention will be fully set forth in the following description made in connection with the accompanying drawings in which like reference characters refer to similar parts throughout the several views and in which:

FIG. 1 is a perspective view of the torpedo tube looking at the muzzle end thereof;

FIG. 2 is a partial perspective view showing the front support for the tube;

FIG. 3 is a perspective view of the tube looking at the breech end, the muzzle door being open;

FIG. 4 is a partial view in radial section of the rear end of tube 100 with ring 122 thereon;

FIG. 5 is a view in end elevation of the tube proper;

FIG. 6 is a partial perspective view looking at the open breech end of the tube and showing the rear support;

FIG. 7 is a view in end elevation of one of the segments of the tube;

FIG. 8 is a view in end elevation of another segment of the tube;

FIG. 9 is a view in end elevation showing the coupling between two segments of the tube;

FIG. 10 is a partial view in end elevation of the tube, a portion thereof being shown in vertical section;

FIG. 11 is a vertical section through the lower portion of the tube showing the supporting plate 103;

FIG. 12 is a view similar to FIG. 11 taken at a different point;

FIG. 13 is a partial vertical section of the upper portion of the tube;

FIG. 14 is a perspective view looking into the front end of the tube;

FIG. 15 is a partial radial section of the tube taken on line 15—15 as indicated by the arrows;

FIG. 16 is a partial view in radial section of the rear end of the tube showing the closing member for an air chamber;

FIG. 17 is a perspective view of the firing ring housing also showing the firing ring;

FIG. 18 is a perspective view of the manifold plate;

FIG. 20 is a view in front elevation of the breech door looking at the rear side thereof;

FIG. 21 is a view in side elevation of the rear portion of the tube including the breech door;

FIG. 22 is a partial view in vertical section through the lower portion of the tube showing the manifold plate, the firing ring housing and the breech door;

FIG. 22a is a partial view similar to FIG. 22 showing a modification of the firing ring;

FIG. 23 is a view in vertical section through the upper portion of the tube and showing the parts seen in FIG. 22;

FIG. 24 is a vertical radial section taken through adjacent parts of the firing ring and manifold plate shown on an enlarged scale;

FIG. 25 is a perspective view illustrating the locking mechanism for the breech door;

FIG. 26 is a partial view illustrating a sleeve and adjacent structure used in the mechanism shown in FIG. 25;

FIG. 27 is a perspective view of the rear portion of a torpedo showing the control cable and the severing means therefor;

FIG. 28 is a perspective view of the muzzle end of the tube, some parts being broken away and others shown in vertical section;

FIG. 29 is a partial view in vertical longitudinal central section through the lower portion of the muzzle end of the tube showing the latching mechanism for the muzzle door;

FIG. 30 is a partial vertical section through the front end of the tube and muzzle door;

FIG. 31 is a view in side elevation partly in vertical section of a rod used in the latching mechanism for the muzzle.

FIG. 33 is a partial vertical section through the upper portion of the muzzle end of the tube showing the opening mechanism for the muzzle door, said section being taken substantially on line 33—33 of FIG. 28;

FIG. 34 is a view of the muzzle end of the door partly in side elevation and partly in vertical section, the upper sectional part being taken on a vertical plane through the axis of the operating cylinder 191a;

FIG. 35 is a perspective view of the inside of the muzzle door and a portion of the operating mechanism therefor;

FIG. 36 is a partial perspective view showing some of the opening mechanism for the muzzle door, some parts being broken away and others shown in radial section;

FIG. 37 is a partial perspective view looking at the side of the rear portion of the tube;

FIG. 38 is a perspective view looking at the bottom of the support and housing of the stop mechanism and showing some of the parts of said mechanism;

FIG. 39 is a perspective view looking at the top of the lower support for the stop mechanism with some of the parts therein;

FIG. 41 is a view in vertical section of the stop mechanism taken substantially on line 41—41 of FIG. 40, as indicated by the arrows;

FIG. 42 is a vertical section taken on line 42—42 of FIG. 41;

FIG. 51 is a central vertical section through an air control valve used taken on line 51—51 of FIG. 52;

FIG. 52 is a top plan view of the valve shown in FIG. 51;

FIG. 53 is a view in rear elevation of a pressure gage used;

FIG. 54 is a view in side elevation as seen from the right of FIG. 53, a portion being shown in central vertical section;

FIG. 55 is a view in central vertical section of a relief valve used, taken on line 55—55 of FIG. 56;

FIG. 56 is a top plan view of a valve shown in FIG. 55;

FIG. 57 is a view in side elevation of a firing solenoid used;

FIG. 58 is a vertical section taken substantially on line 58—58 of FIG. 59, as indicated by the arrows;

FIG. 59 is a top plan view of the device shown in FIG. 57;

FIG. 60 is a top plan view of a selector valve used;

FIG. 61 is a vertical section taken on line 61—61 of FIG. 60, as indicated by the arrows;

FIG. 62 is a bottom plan view of the device shown in FIG. 61;

FIG. 63 is a top plan view of a firing valve used, one part being shown in horizontal section;

FIG. 64 is a vertical section taken on line 64—64 of FIG. 63, as indicated by the arrows;

FIG. 65 is a bottom plan view of the device shown in FIG. 64, certain bolts being shown in horizontal section;

FIG. 66 is a bottom plan view of a ready valve and also of a load valve used;

FIG. 67 is a vertical section taken on line 67—67 of FIG. 66, as indicated by the arrows;

FIG. 68 is a view in end elevation looking at the right-hand end of FIG. 67;

FIG. 69 is a vertical section taken through a pressure switch used and taken on line 69—69 of FIG. 70, as indicated by the arrows, said section also including the valve plate, panel plate and tube 100;

FIG. 70 is a top plan view of the pressure switch shown in FIG. 69;

FIG. 71 is a bottom plan view of an orifice unit used;

FIG. 72 is a vertical section taken on line 72—72 of FIG. 71, as indicated by the arrows;

FIG. 73 is a view in side elevation of FIG. 72, as seen from the right-hand side thereof;

FIG. 74 is a top plan view of a separator and bleeding unit used;

FIG. 75 is a vertical section taken on line 75—75 of FIG. 74, as indicated by the arrows, said section extending through the valve plate and panel plate;

FIG. 77 is a vertical section taken substantially on line 77—77 of FIG. 78, as indicated by the arrows;

FIG. 78 is a view in side elevation as seen from the left-hand side of FIG. 76, some parts broken away and others shown in vertical section, said section being taken substantially through the center of member 564 shown in FIG. 76;

FIG. 79 is a central vertical section through a check valve used and showing a modified form thereof;

FIG. 80 is a partially schematic view partly in top plan and partly in horizontal section, said section being taken through the axis of member 564 shown in FIGS. 76 and 78, other parts being broken away and still others shown in vertical section;

FIG. 81 is a partially schematic view in vertical section through the valve block 550, the manifold plate, firing ring housing, firing ring and breech door, said section being taken substantially through the axis of member 564;

FIG. 82 is a vertical section similar to FIG. 77 showing a modified structure;

FIG. 82a is a view similar to FIG. 78 and showing a modified structure;

FIG. 83 is a perspective view of a switch box used;

FIG. 84 is a perspective view of a switch carried in the switch box shown in FIG. 83;

The Tube Proper

Figure 19:
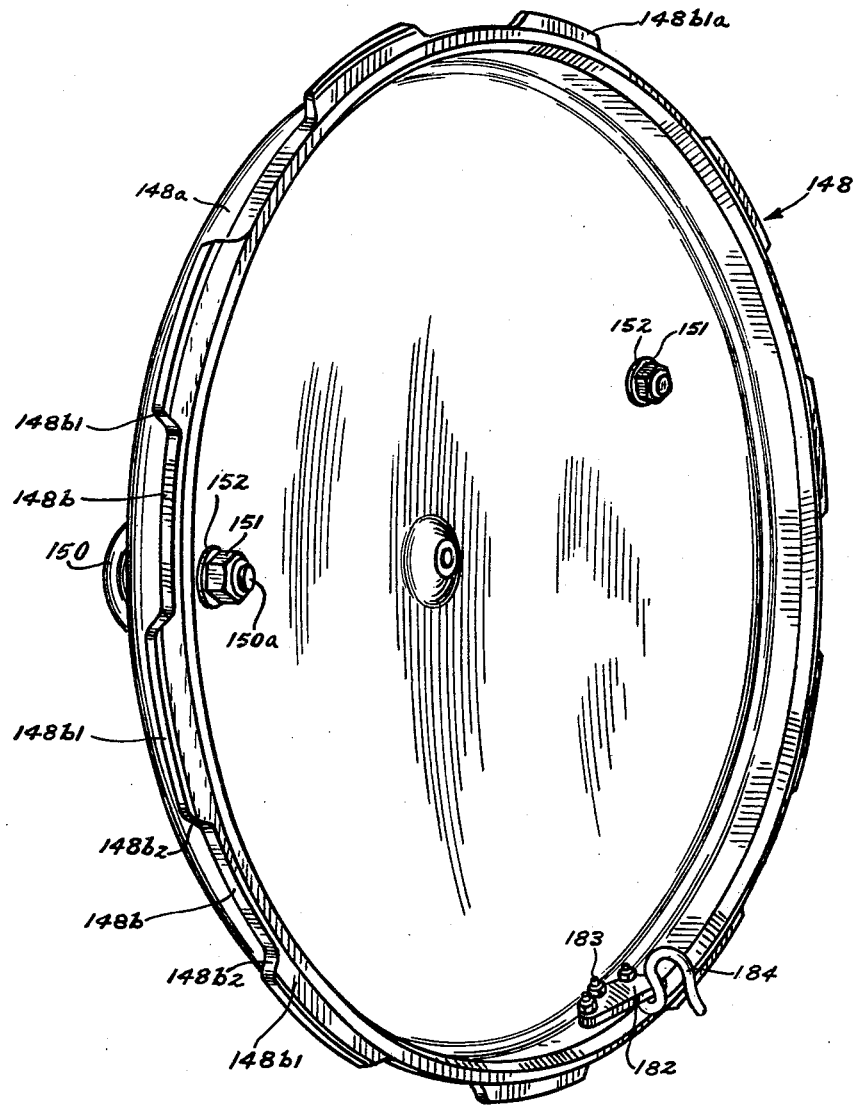
FIG. 19 is a perspective view of the breech door looking at the inner side thereof.
Figure 32:
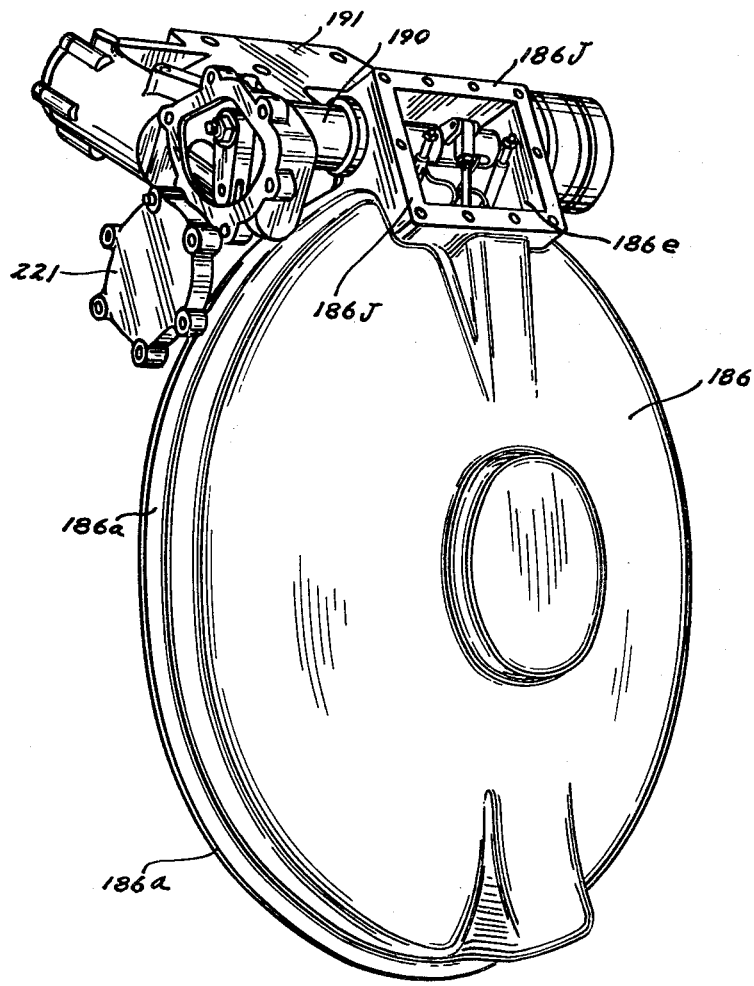
FIG. 32 is a perspective view of the muzzle door and the operating parts therefor, some parts being omitted.
Figure 40:
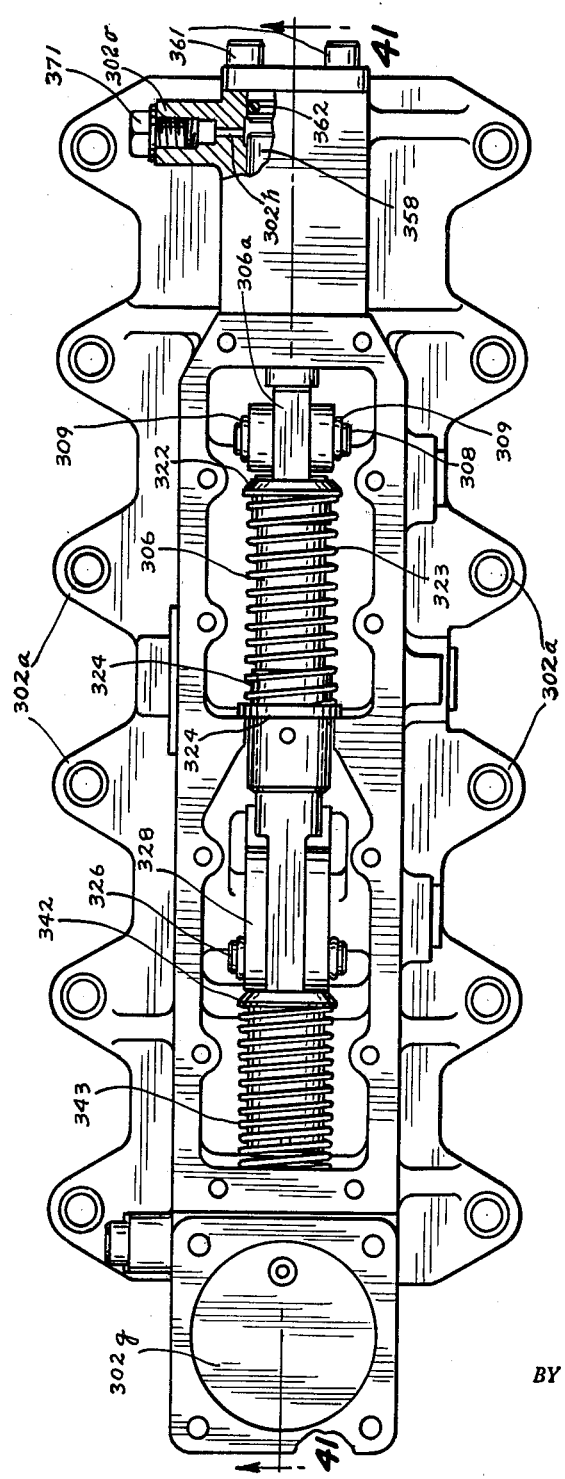
FIG. 40 is a top plan view of the stop mechanism with the top cover removed.

Referring to the drawings, the tube or barrel 100 used from which the torpedo is fired comprises eight segments. There is a top segment 100a, a bottom segment 100b and six similar side segments 100c. (FIGS. 5 to 13.) There are three of the side sigments at each side of the top and bottom segments. While said segments migh tbe variously formed, in practice aluminum extrusions have been used. Each segment has at one side a recess 100d and at its other side a coupling head 100e. The recess 100d has an opening with parallel sides and an enlarged inner portion of cup shape having curved sides 100d1 which meet substantially in a line at the center of the recess and at their other ends form shoulders 100d2 at the sides of said opening. The portion 100e is shaped similarly to the recess 100d, the same having curved outer surfaces 100e1 which meet in a central line. Said portion also has a neck 100e2 with parallel sides forming with said curved surfaces the shoulders 100e3. Rearwardly of the neck portion 100e2 are outwardly curved surfaces 100e4 which extend to the inner and outer sides of the tube respectively and form with said sides pointed portions 100f which diverge outwardly. As shown in FIG. 9, the coupling heads 100e substantially fit into the recesses 100d. When the segments are assembled, the coupling heads 100e are inserted into the recesses 100d and the portions 100f are then pressed inwardly. While this latter operation could be done in various ways, in practice the tube has been moved longitudinally between rollers under great pressure so that the portions 100f are pressed inwardly and form a very close contact at points or surfaces 100g. The side portions at each side of the recess 100d are also pressed inwardly in the same manner and a very close contact is secured at the points or surface 100h. The segments are thus assembled into a rigid cylindrical tube. The extrusions are so accurate and the inside of the tube thus formed so nearly a perfect cylinder that the bore of the tube requires no machining.

The top segment 100a is provided with a slot or groove 100a1 centrally of its inner side, which slot extends longitudinally throughout the segment. The torpedo has a guide stud or projection at its top which moves in slot 100a1 and guides the torpedo and prevents rotation thereof. Said top segment also has therein at each side of the center thereof voids or channels 100a2 of general rectangular form in vertical cross section, the same having rounded corners. The bottom segment 100b has equally spaced from the center thereof voids or channels 100b1. These channels extend throughout the length of the segment, and as shown, are of oblong form in cross section with substantially semi-cylindrical sides. Said bottom segment also has equally spaced from the center thereof other channels 100b2 which extend throughout the length of the segment. Channel 100b2 are also of oblong shape in cross section, the same being somewhat wider than the channels 100b1, and also have their sides substantially semicylindrical. Segment 100b has extending centrally thereof at its inner side a rather wide shallow groove 100b3. Both the slot 100a1 and the slot 100b3 are extruded of a finished size so that only the ends of the tubes require machining. Quite a number of wear plates 103 are disposed in the groove 100b3, the ends thereof being in engagement, and the same are held in place by a multiplicity of headed countersunk screws 104. Some of the screws 104 holding the wear plates 103 extend through the tube and are provided with washers 106 and nuts 108. The inner surfaces of the plates 103 are semi-cylindrical and the radius thereof is slightly less than the radius of the tube proper. The section of the wear strip 103 at the muzzle end of the tube is bent downwardly somewhat and provided with a slot 103a forming part of the latch for the muzzle door of the tube. See FIGS. 14, 28, 29 and 30.)

The side segments 100c have a plurality of voids or channels 100c1 extending longitudinally therethrough, the number being shown as five in each segment. As shown, the three intermediate channels are substantially rectangular in cross section with rounded corners, while the end channels are rectangular at their inner ends with rounded corners and having substantially semicylindrical outer ends. The five channels in each of the side segments and the two channels 100b2 in the bottom segment are used for the storage of high pressure air which is used to actuate all of the operative tube components, and also provides the force necessary to properly eject a torpedo from the tube or barrel. The two smaller channels 100b1 in the bottom segment are arranged to contain thermostatically controlled Calrod heating elements 105 which are controlled to maintain the barrel temperature within predetermined limits. The two channels 100a2 in the top segment 100a have therein small extrusions 110 which are the same length as the tube. Each member 110 is provided with three spaced holes or passages 110a shown as cylindrical in form and which extend throughout members 110. Said latter holes contain air and fluid respectively used in operating the tube components. Members 110 are held in placed by spaced screws 112 which bear upon the tops of said members adjacent their inner ends. Said members 110 are also held in place by screws 114 having inner beveled ends which contact the upper beveled corners of said members respectively and thus tend to hold the same against the adjacent sides of the channels 100a2.

In order to properly seal the ends of the channels 100b2 and 100c1 at the muzzle end of the tube, the same are provided with solid plugs 115 held in place by a suitable adhesive and also held in place by pins 116 extending therethrough each having a countersunk head. Said plugs 115 are each provided with a pair of spaced annular grooves 115a in which are disposed O-rings 118. (See FIG. 15.) Although there is no air pressure in the channels 100a2 and 100b1, these channels are also sealed at the muzzle end in the same manner as channels 100c1 and 100b2. A ring 109 which in practice has been made of aluminum is shrunk onto the muzzle end of the tube and acts to retain the pins 116. An annular groove 115b is formed in members 115 and 109 and an O-ring 115c is disposed therein arranged to be engaged by the muzzle door. The channels 100b2, 100c1, 100a2 and 100b1 are so sealed as to make the same water-tight.

The ends of the channels 100b1, 100b2, 100c1 and 100a2 are also sealed at the breech end of the tube but by a somewhat different plug. At the breech end said channels are broached for a short distance and a plug 120 is inserted against the shoulder 100i formed by said broaching. Plug 120 is beveled at its outer end and an O-ring 121 is placed in the groove formed by said bevel. This O-ring 121 will be engaged by a manifold plate which is bolted against the end of the tube and a ring thereon to be later described. (See FIGS. 15 and 30).

A ring 122 is shrunk onto the breech end of the tube 100. A series of annular grooves 109h similar to a buttress thread, but having no lead, having one side in a plane at right angles to the tube axis and another side at a decided angle thereto are formed on the outer side of the tube. Similar grooves 122a are formed on the inner side of ring 122. The depth of said grooves diminishes from the rear side of the ring to the front side thereof. In assembling the tube and the ring, the ring is heated and is thus expanded so that the same can be moved over the tube. The ring 122 is positioned so that the grooves therein are in transverse alignment with the projection between the grooves on the tube. Ring 122 is then cooled and shrunk and the portions between said grooves in both the tube and ring enter the grooves aligned therewith. The ring 122 is thus buttressed by the vertical surfaces of the grooves and the ribs therebetween. Ring 122 acts as a reinforcement and as a mounting for other parts.

There is a tube support 124 at the breech end of the tube, the same having an upper surface fitting about the ring 122. A plurality of vertically extending bolts 126 extend through a flange of support 124 into ring 122 so that the support and tube are securely connected. Washers 127 underlie the heads of the screws 126. The support 124 has a pair of spaced upwardly and rearwardly extending bifurcated brackets 124a. Brackets 124a support the front end of a loading tray used with the loading apparatus for the tube. Support 124 has a base flange having therein drilled holes 124b to receive bolts attaching the support to the deck. As stated, member 124 forms the rear support for the tube and the same transmits the firing reaction force to the ship's deck structure.

There are a pair of front supports 130 for the forward end of the tube. Supports 130 are spaced quite a distance from the front end of the tube to permit the muzzle end to flex slightly during firing of the torpedo. Supports 130 have base flanges 130a and upper portions 130b, the latter having curved surfaces fitting about the tube. Each of said base portions 130a is bonded to the upper portion 130b above the same by a rubber-like element 130c which is flexible and resilient. Said upper supports have flanges 130e through which a plurality of bolts 132 pass to secure the tube to the support 130. Flanges 130a have spaced holes 130d extending therethrough to receive bolts for securing supports 130 to the deck.

*Manifold Plate*

A manifold plate 134 is bolted to the rear end of the tube and secured thereto by a plurality of circumferentially spaced headed and countersunk studs 135 disposed in holes 134c. (See FIGS. 18 and 22). The plate 134 engages the O-rings 121 which engage the plugs 120 disposed in the channels 100a2, 100b2 and 100c1 in tube 100. A tight seal is thus made between the plate 134 and the ends of the said channels. An annular groove or channel 134a is formed in plate 134 and a plurality of passages 134b connect groove 134a to the channels 100b2 and 100c1. Plate 134 has a slot 134d at its top alined with groove 100a1, which slot permits the passage of the torpedo guide member. Plate 134 has a passage 134e extending therethrough to receive a transfer sleeve, which sleeve conducts air under pressure from a tube channel to one of the components.

*Firing Ring Housing*

A firing ring housing 136 is bolted to ring 122, the manifold plate 134 and tube 100 by a plurality of circumferentially spaced headed bolts 138. (See FIGS. 17 and 22). Housing 136 has a narrow flange 136b extending about the periphery of plate 134 and has an annular groove 136a therein shown as of general rectangular form in cross section and open at the side adjacent plate 134, said groove communicating with groove 134a.

A firing ring 142 is disposed in groove 136a. Ring 142 is provided with an annular groove 142a in which is disposed a resilient sealing member 140, which member engages a rear annular surface 134h of plate 134. (See FIGS. 22 to 24). Housing 136 has grooves extending about the upper and lower sides of groove 136a in which are respectively disposed O-rings 143 engaging ring 142. An annular discharge orifice 136c extends from the upper front side of groove 136a to the rear of manifold plate 134. Orifice 136c is formed between plate 134 and housing 136 and as above stated communicates with the interior of tube 100. Housing 136 also has an annular vertical surface 136d from which extends rearwardly a semi-annular portion 136e having an inner cylindrical surface and from which portion also extend spaced semi-cylindrical flange-like portions 136f having inner cylindrical surfaces. Said housing 136 has an annular surface 136h extending forwardly from surface 136g. Housing 136 has a block-like portion 136i at its rear top portion recessed to receive a latch cover plate 146 secured to housing 136 by circumferentially spaced bolts 147.

In FIG. 22 the firing ring 142 is shown, together with the adjacent and related parts. In FIG. 22A a modification of the firing ring and adjacent structure is shown. In the latter figure a firing ring 142' is shown which is disposed in a chamber 136'a of the firing ring housing 136'. The usual passage 136'm leads from the rear of chamber 136'a which corresponds to passage 136m in FIG. 24. A portion of a cable 185' is shown which corresponds to cable 185 in FIG. 22. A portion of tube 100 is shown, together with one of the chambers 100c1 and a closing structure 120 thereof. A portion of breech door 148 is shown. Manifold ring 134' is shown, corresponding to manifold ring 134 in FIG. 22. An annular passage 136'c is shown between housing 136 and ring 134 which corresponds to passage 136c in FIG. 22. In the modified construction a small space 136'c1 is shown between the manifold ring 134' and the firing ring housing 136'. Space 136'c1 communicates with the atmosphere. A chamber 134'a is shown in the manifold ring corresponding with annular passage 134a in FIG. 22, and the same is connected to flask chamber 100c1 by a passage 134'b corresponding to passage 134b in FIG. 22. One of the bolts 138' securing the firing ring housing and manifold ring to tube 100 is shown. It will be seen that there is a rib 134'a1 which has a rear curved surface engaged by firing ring 142'. It may be stated that in the making of the described structure the rib 134'a1 when machined extended to the left in FIG. 22A. In the subsequent operation said rib was bent or swaged to the position shown. It will be noted that firing ring 142' is made entirely of rubber or rubber-like material instead of being of metal, as is the firing ring 142 in FIG. 22.

In operation, as above stated, there is 600 pound pressure on each side of firing ring 142' and there is thus said pressure in chambers 134'a and 136'a. The exposed surface at the rear of ring 142' is much greater than that at its front side so that said ring is held firmly in the position shown. Due to the pressure a portion at the bottom of ring 142' is forced ino the crack 136'c1 between the manifold ring and the firing ring housing. Said portion seals space or crack 136'c. The ring is also forced against the annular passage 136'c and the upper portion of chamber 134'a so that said passage and chamber are sealed. When the pressure is exhausted from the rear of the ring through passage 136'm as above described, ring 142' swings to the left, as seen in FIG. 22A, the same swinging about the lower portion in the space or crack 136'c1. The ring swings away from annular passage 136'c and chamber 134'a so that the 600 pound pressure from flask chamber 100c1 will flow through passage 134'b into chamber 134'a and into the annular passage 136'c and into the tube 100, as above described. The modified structure described makes it possible to use a non-metallic firing ring and eliminates the necessity for the sealing portion 142a and the O-rings 143 shown in FIG. 22.

*Breech Door*

A breech door 148 is provided for closing the rear end of tube 100. Said door is of flattened dome-like form having an annular portion with a cylindrical surface 148a which fits in surface 136g on housing 136. Door 148 has an annular peripheral flange 148b which is adapted to engage the surface 136d of housing 136. Flange 148b has spaced portions 148b1 with intervening openings therebetween. (See FIGS 19 to 22.) The ends of portions 148b1 are curved inwardly, as shown at 148b2, so that there is a concave surface at the ends of the portions 148b1 adjacent portion 148b. One of the portions 148b1 designated 148b1a is made shorter than the others so as to accommodate a stop which is in the form of a cap screw 149 threaded into housing 136. The housing 136 has the rearwardly projecting flange 136e from which project circumferentially spaced flanges 136f disposed in vertical planes. The door 148 is placed in position as shown, with the portions 148b1 disposed between the flanges 136f of housing 136 and is then rotated in a clockwise direction so that portions 148b1 are disposed back of portions 136f. The door is rotated until the advancing end of one portion 148b1 engages stop 149. (See FIG. 25.) In this position the door cannot be pulled rearwardly.

The breech door 148 has a plate 157 therein with the word "Ready" indicating the closed and locked position of door 148, and the word "Unlocked" indicating the unlocked position of said door. Arrows indicate the direction of rotation of the door to reach said positions respectively. The legend "Door Interlock Zones" also appears on plate 157, and an arrow 161 cooperating with a line 153 indicating the position of the breech door when its flange 148b1 engages stop 149. Door 148 is provided with a pair of knob-like handles 150 spaced horizontally from the center thereof which can be grasped to position and rotate the door. Handles 150 have portions 150a extending through the door and secured by nuts 151 having washers 152 underlying them.

*Breech Door Locking Mechanism*

A latching or locking device is provided for door 148. (See FIGS. 25 and 26.) A shaft 154 extends rearwardly and is journaled in portion 136h of the firing ring housing 136. Shaft 154 has secured to its rear end a pawl 155 having a downwardly and laterally extending arm 155a at the upper side of which is an angular recess or notch 155b. A lever 146 is fulcrumed on a pivot 146b journaled in block 136i. Lever 146 has a projecting tooth 146a adapted to enter notch 155b and hold arm 155a from clockwise rotation, as seen in FIG. 25. Lever 146 is urged to swing clockwise to move tooth 146a toward recess 155b by a tension spring 144 having one end secured to a pin 145 secured in block 136i and its other end secured to a pin 160 secured in lever 146. Lever 146 is curved downwardly and rounded at its free end and is positioned to ride up on the curved surface 148b2 of the door flange 148b1 when the door is rotated clockwise to closed position. Lever 146 is thus rotated in a counter-clockwise direction and tooth 146a moves out of notch 155b. Pawl 155 may now turn in a clockwise direction and move downwardly and engage the surface 148b2 so that the door 148 cannot now be rotated in a counter-clockwise direction to open position. Door 148 can thus be locked in closed position and its spaced portions 148b1 are held behind the spaced portions 136e on the firing ring housing.

Shaft 154 has a flat tongue 154a at its end remote from pawl 155. A shaft 156 is journaled in a portion of the control panel plate 422 and valve plate 494 to be later described. Shaft 156 has an enlarged end portion 156a provided with a transverse slot 156b at its end. A head 154a of shaft 154 is disposed in the slot 156b so that said shafts are coupled together for rotation but may have some relative lateral movement. A cylindrical recess 122d is formed in ring 122 and extends into the control panel plate. The enlarged portion 156a of shaft 156 is disposed in one end of this recess. A sleeve 158 fits in recess 122d. Said sleeve 158 has an annular rib 158a extending about its inner side and projecting inwardly. Sleeve 158 also has an annular flange 158c extending about its outer side closely adjacent one end thereof, which flange engages one end of panel plate 422 and valve plate 424. One end of member 158 fits in the portion of recess 122d which is in the panel plate 422. A compression coiled spring 159 surrounds shaft 154 and is disposed in recess 122d and one end thereof engages rib 158a. The other end of spring 159 engages the end of recess 122d. Sleeve 158 is thus held in the position shown in FIG. 26 by said spring. Shaft 154 has a reduced flattened portion 154c intermediate its ends. Shaft 156 has a flattened end portion which has clamped thereto by a bolt 199 one end of an arm 174 and a holding plate 174a. Arm 174 extends upwardly and has secured to its upper end portion one end of a coiled tension spring 162. (See FIG. 25.) The other end portion of said spring hooks into a bracket 164. Bracket 164 has a plate-like portion supported by a sleeve 165 in turn supported upon valve plate 494. Bracket 164 and sleeve 165 are secured to valve plate 494 by a headed bolt 166 threaded into said valve plate and control panel plate 422. Valve plate 494 will be later described. Arm 174 is swung in one direction by spring 162. Arm 174 has its upper end disposed so as to be engaged by a cam 168a carried on a shaft 197 which extends upwardly through the control panel cover 425 and through a circular plate 171 secured to said cover by spaced screws 172. Plate 171 has an annular groove in its bottom in which is disposed an O-ring 175 engaging the top of cover 420a. Shaft 197 has secured thereto at its upper end a knob handle 177 which rests on plate 171. Knob 177 carries a pointer and plate 171 has thereon designations "Locked" and "Unlocked." Plate 171 has stop pins 178 for said pointer and knob. It will be seen that by turning knob 177 to its "Unlocked" position shaft 197 will be rotated and cam 168a will engage arm 174 and oscillate the same. Oscillation of arm 174 will rotate shaft 156 so that shaft 154 will be rotated and pawl 155 will be moved counter-clockwise away from surface 148b2, thus unlocking the breech door 148 so that it can be turned counterclockwise and be removed.

A bracket 180 is secured beneath one of the handles 150 and has secured thereto one end of a chain 181, the other end of which is secured to one of a pair of brackets 163 held under a washer and a nut 175 threaded on a member 178 extending through the firing ring housing, manifold plate and ring 122 and having a bifurcated end at the front of the firing ring housing. The bifurcation of member 178 is apertured to receive a pin 179. A chain 167 is secured to pin 179 and to the firing ring housing 136 to guard against loss of pin 179. Chains used in loading a torpedo into tube 100 are secured to pins 179. The chain 181 is provided to keep the door 148 from being blown away or being washed away by a wave. A bracket 182 is secured to the inner side of the door 148 at the lower portion thereof by headed and nutted bolts 183. Bracket 182 has secured beneath the same a hook-shaped member 184 which forms a support or holder for a torpedo control cable 185. Said cable carries conductors of circuits used for delivering information to said torpedo. Said cable is attached as shown in FIG. 27. An oscillatable knife 169 is positioned to be oscillated by tension on said cable and sever said cable when the torpedo starts out of the tube. Cable 185 passes out of the tube through a passage in the firing ring housing 136. Said cable passes through a pair of staples 141 in a fin on the torpedo T. (See FIGS. 22 and 27.)

*Muzzle Door*

A front or muzzle door 186 is provided. Door 186 as shown is of flat circular cup-shaped form and has a flange 186a extending substantially thereabout, said flange having a flat continuous finished inner surface 186b. Surface 186b engages an O-ring 187 held in a groove 109a formed in the end of tube 100. Door 186 has a projecting portion 186aa disposed centrally at its bottom forming a chamber to accommodate a latch mechanism. A central projection 186bb forms a chamber containing several electrical elements to be later described.

Door 186 has therein two tubular electric heaters 188 integrally cast in the door, the ends of the same extending about the door adjacent flange 186a to adjacent and partially around a central cylindrical flange 186c and terminating in chamber 186bb. An eight point terminal board 186g and two snap type thermoswitches 189 for controlling heaters 188 are located in the chamber formed by flange 186c. Switches 189 control relay 410 in the control panel. Said switches are in series for operational safety. The wiring 197 for the heaters extends from board 186g through tube 186d to the chamber 186j and then through holes 190a into a hollow shaft 190, out through the opening 190b in one end of said shaft and through a conduit 197a extending along tube 100 along the bottom of panel plate 422, into the control panel and to a relay 410. Said control panel, parts thereof and contents will be later described. A cover plate 199 is provided for flange 186c and the chamber therein, which cover is bolted to said flange. An O-ring 209 in flange 186c underlies cover 199. Door 186 is swingable outwardly to open position about a shaft 190 journaled in a casting 191 secured to tube 100. Door 186 is held in closed position by a latch comprising an arm 192 swingable about a pivot 193 carried in a bracket 194 secured to the inner side of the door. Arm 192 has journalled therein a roller 195. Roller 195 is movable into and out of slot 103a in the front wear strip 103. Arm 192 has pivoted thereto the lower end of a tubular rod 196. Rod 196 has pinned thereto by a pin 198 a flanged collar 200. Collar 200 is engaged by the lower end of a compression coiled spring 201, the upper end of which engages the bottom of a cup-shaped member 202 having an annular groove in its upper end in which is disposed an O-ring 203 engaging the flat surface forming the bottom of a recess 186e formed in the portion 186j of door 186. Tubular rod 196 extends through an opening 186h above recess 186e and has threaded into its upper end a member 204. A nut 205 on member 204 engages the top of rod 196. Member 204 has a head 204a at its upper end disposed between the sides of a pair of lugs 206a which extend from a rotatable sleeve 206 which is rotatable about shaft 190. A pivot 207 connects said last mentioned head and said last mentioned lugs. It will be seen that spring 201 tends to force rod 196 downwardly or in a direction to move arm 192 and roller 195 into latching position.

Member 206 has a spline grooved bore which provides circumferentially spaced splines or teeth 206b. Shaft 190 has circumferentially spaced radially projecting spline teeth 190c which are disposed to mate with shaft 190 at said teeth 206b. Teeth 206b extend circumferentially substantially the distance between teeth 190c. It will be seen that when shaft 190 is rotated that teeth 190c will engage the teeth 206b and rotate member 206 so that arm 206a will lift member 204 and thus rod 196 so that arm 192 will be swung upward or clockwise and roller 195 will move out of slot 103a to unlatch the muzzle door.

Door 186 has an integral portion 186j having an open front. A cover member 210 is secured to door 186 by bolts 211. Portion 186j has therein a portion 186n having a cylindrical wall from which project inwardly equally and circumferentially spaced teeth 186m. Shaft 190 has a portion 190d having equally and circumferentially spaced teeth 190d1 transversely alined with teeth 186m. There is a space between teeth 186m and teeth 190d1 respectively in a circumferential direction of about 12 degrees in extent. It will be seen that rotation of shaft 190 will rotate portion 186j and thus door 186 about the axis of shaft 190 so that said door 186 will be lifted and opened. Shaft 190 must move through 12 degrees before teeth 190d1 engage teeth 186m so that there is an interval before door 186 is opened. This gives time for latch 192 to move to unlatched position, before door 186 starts to open. Shaft 190 has secured thereto at one end an arm 212. Said end of shaft 190 is reduced and threaded to receive a nut 214 for holding arm 212 in place. Arm 212 is pivotally connected to one end of a link 215 which is pivoted at its other end to a lug 216b on one end of a piston rod 216a connected to a piston 216. Piston 216 is movable in a cylinder 191a formed in one portion of a bracket casting 191 secured to the muzzle end of tube 100. Cylinder 191a has a reduced portion 191b in which rod 216a fits and slides. Portion 91b has an annular groove therein containing an O-ring 218 engaging piston rod 216a. Piston 216 has an annular groove therein containing an O-ring 220. Cylinder 191a is closed by a cover 221 having a portion fitting in cylinder 191a and secured to casting 191. Cover 221 has an annular slot in said portion containing an O-ring 222.

Shaft 190 at its right-hand end, as seen in FIG. 36, is journaled in bearings 191h and a closure cap 213 is secured to casing 191 by bolts 219.

Bracket 191 has three integrally cast passages 191d, 191e and 191f. Passages 191d and 191f have 600 pound pressure transmitted therein, as will be described, and passage 191f will receive 100 pound pressure from the ship's 100 pound pressure line, as shown in FIG. 37, where the 100 pound hose 209 of the ship is connected to the receptacle 214. The hundred pound hose 213 is connected to receptacle 214. Passages 191d and 191f have transfer sleeves 219 communicating therewith which project from the bottom of bracket 191, as shown in FIG. 35. Said sleeves communicate with some of the passages 110a in extrusions 110 in the manner shown in FIG. 69. The passage for opening door 186 passes from selector valve, through a groove in valve plate 424 and a transfer sleeve to one of the passages 110a in one of the extrusions 110, lengthwise of tube 100 to one of the sleeves 219. The return passage from cylinder 191a passes through the other sleeve 219, through a passage 110a, a transfer sleeve, a groove in valve plate 423 to the firing valve 475 and supply 600 lb. air pressure for opening door 186. Passage 191f passes to the rear edge of bracket 191, as shown in FIG. 35, and is connected to a conduit 213 arranged to be connected to the ship's 100 lb. air line. This air acts on piston 216 to close door 186.

*Stop Mechanism*

Figure 44:
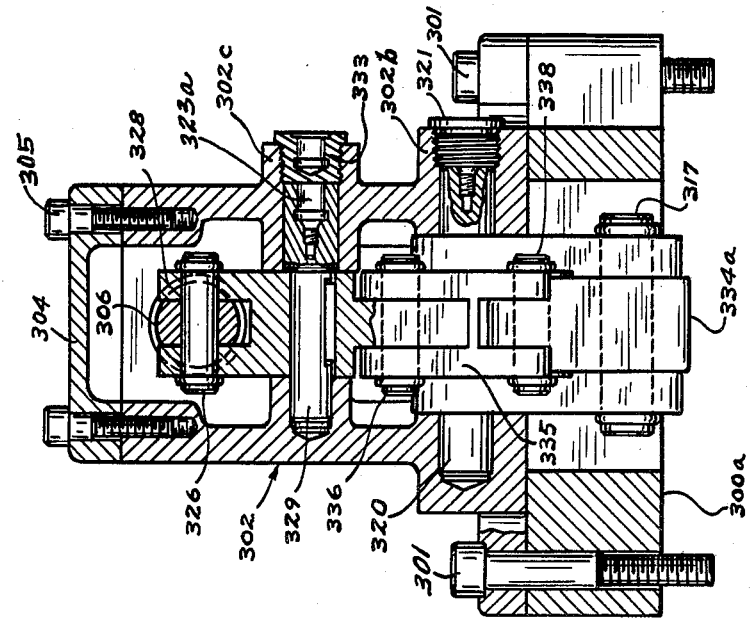
FIG. 44 is a vertical section taken substantially on line 44—44 of FIG. 41, as indicated by the arrows.
Figure 43:
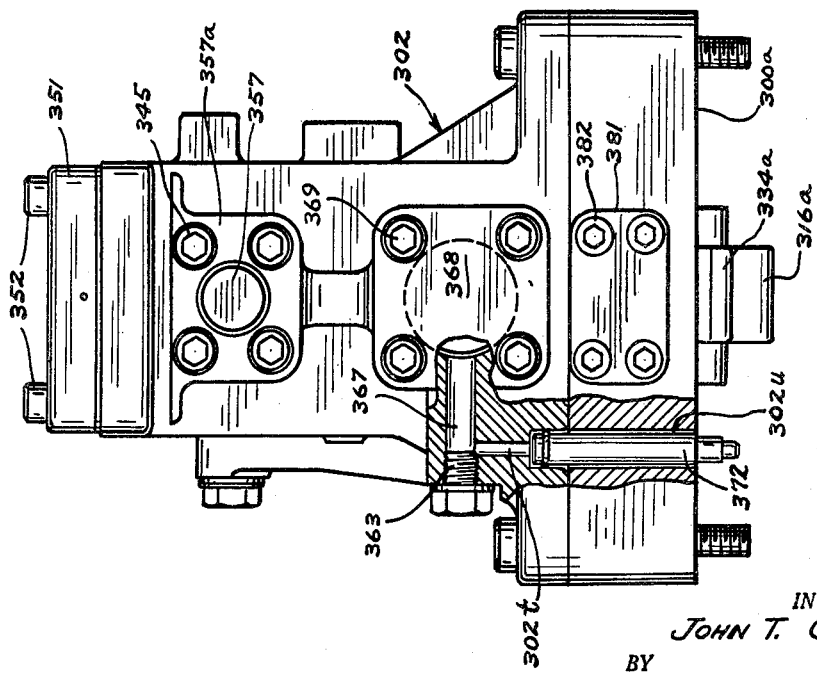
FIG. 43 is a view in elevation of the left-hand end of the stop mechanism shown in FIG. 41, some parts being broken away and others shown in vertical section.

After a torpedo has been loaded into the torpedo tube it is necessary to restrain the torpedo from longitudinal movement under all possible conditions of pitch and roll of the ship so that no damage will occur to the tube or torpedo. A stop mechanism is provided for this purpose located forwardly of the longitudinal center of the tube, as shown in FIGS. 1 and 3. While the structure might be variously made, in practice there have been two sub-assemblies to this unit, as shown in FIGS. 38 and 39. A lower assembly 300 comprises a plate 300a which is secured to a machined portion at the top of the tube 100. While this plate could be variously secured, in practice it has been secured in a recess machined in the top segment of the tube by expanding and shrinking said tube. An upper sub-assembly, as shown in FIGS. 38 and 44, is secured to the top of plate 300 by bolts 301 extending through a plurality of laterally projecting lugs 302a on the housing 302 of said upper assembly and into laterally projecting lugs 300c on said lower assembly. Said housing has an open portion at its top closed by a top plate 304 which is secured by a plurality of bolts 305. A shaft 306 is disposed in housing 302 having a flattened portion 306a adjacent one end supported between the sides of a fork formed at the upper end of a lever 307. A tubular pin 308 extends through said fork and said flattened portion 306a, which pin is held in place by rings 309 secured thereto at each side of said fork. Lever 307 is fulcrumed on a shaft 310 secured in housing 302. Adjacent its lower end lever 307 is bifurcated and is pivoted to a link 311 by a pin 312 held in place by rings 314 at each end thereof. Link 311 extends between the bifurcations of lever 307. Link 311 at its lower end is pivotally connected by a pin 315 to the angle portion of a bell crank-shaped front latch 316. Link 311 is disposed in a recess formed in the side of latch 316. Latch 316 has a latching end portion 316a adapted to extend into the groove 100a1 in the tube 100. The other portion of latch 316 is pivotally connected by a pin 317 to a link 318, said pin being held in place by rings 319 thereon at each end. Link 318 is secured to a shaft 320 journalled in housing 302. Latch 316 and a companion latch 334 have recesses 316b in their adjacent sides adjacent their ends and the lower end of link 318 is disposed in said recesses. Said recesses form shoulders at their inner ends and the oscillation of link 318 is limited by said shoulders. A boss 302b on the side of housing 302 is axially alined with shaft 320 and is threaded to receive a headed plug 321. (See FIG. 44.) Plug 321 has an opening therein polygonal in cross section adapted to receive a wrench. Plug 321 can be removed and shaft 320 can then be removed when desired.

A cylindrical member 322 surrounds shaft 306 and has an end flange 322a engaging a shoulder of shaft 306 which has the flattened portion 306a. A coiled compression spring 323 extends over member 322 and abuts flange 322a. The other end of spring 323 engages an annular flange 324a on a cylindrical member 324 fitting on shaft 306. Member 324 has portions at both sides of said flange surrounding shaft 306 for some distance. Shaft 306 has a flattened portion 306b provided with an arcuate slot 306c extending therethrough and a pin 326 extends through said slot and through the sides of a fork formed at the upper end of a lever 328 secured to a shaft 329 by any suitable means, such as the key 330. Pin 326 is held in place by rings 325 disposed in annular grooves at the ends of pin 326. Shaft 329 is journaled in housing 302 and has one end disposed coaxially with a boss 302c at one side of said housing. Said end of shaft 329 has therein an opening 329a of polygonal shape in cross section adapted to receive one end of a wrench so that shaft 329 can be rotated to lift the rear latch 334 to be described. (See FIG. 44.) Boss 302c is threaded to receive a headed plug 333 which is also provided at its outer end with an opening of polygonal shape in cross section so that it can be removed by the insertion of a suitable polygonal or Allen type wrench. Lever 328 has a reduced lower end disposed between the sides of a fork at the upper end of a link 335. A pin 336 extends through the sides of said forked end and link 335 and is held in place by rings 337 secured thereto at each end. Link 335 has its lower end disposed in a recess in the angle portion of the rear latch 334 which is of bell crank form and is pivoted to said latch by a pin 338 held in place by rings 340 disposed in annular grooves at each end of pin 338. Latch 334 has a lower latching portion 334a adapted to move into and out of slot 100a1 in the top of tube 100. The other arm of latch 334 is pivotally connected to the lower end of link 318 and one end of latch 316 by pin 317 held in place by rings 319 disposed in grooves at each end thereof.

Shaft 306 has fitting thereon a member 342 having an end flange abutted by one end of a coiled compression spring 343 which surrounds member 342. The other end of spring 343 engages one end wall of housing 302. The rear end of shaft 306 is coupled to a smaller shaft 344 coaxial therewith. Shaft 306 has a T-shaped slot extending transversely therethrough and shaft 344 has a T-shaped head at its end adapted to be disposed in said T-shaped slot. Some relative movement of said shafts 306 and 344 transversely of each other is thus permitted. Shaft 344 extends into a chamber 302d formed in housing 302. A member 347 fits in and has a portion disposed in chamber 302d. Member 347 has a flange 347a abutting the end of housing 302 and secured to said housing by bolts 345. Another member 349, cylindrical in form, fits in chamber 302d. The inner end of member 349 is bored to receive a coiled compression spring 348 having its rear end engaging the end of the bore in member 349 and its other end engaging the end of chamber 302d. Members 347 and 349 are bored to receive shaft 344 and member 349 has formed therein about said shaft an annular groove 349a. Housing 302 is provided with an annular groove 302e extending about the periphery of member 349. Diametrically opposite passages 349b extend through member 349 from groove 349a to groove 302e. Another passage 302f having a flaring outer end extends in housing 302 between groove 302e and a chamber 302g formed in housing 302. Chamber 302g forms an oil reservoir and is covered by an expansible sheet or plate 350 held in place by a cover 351 secured to housing 302 by spaced bolts 352. The chamber above sheet 351 forms an expansion chamber 302p. Housing 302 is provided with grooves spaced longitudinally of member 349 in which are disposed O-rings 353 and 354 engaging member 349. Member 349 is provided with spaced grooves in which are disposed O-rings 355 and 356 engaging shaft 344. Shaft 344 has one or more grooves 344a extending longitudinally in its periphery adjacent its rear end and extending to groove 349a. The bore for shaft 344 is continued in members 349 and 347 to form a chamber 347b and member 347 is provided with a groove 347c in the bottom of said chamber 347b. A groove 302i forms a small chamber in housing 302 at the lower side of member 349. A passage 302j located at the inner end of member 347 extends from chamber 347b and groove 347c to groove 302i. A cast-in conduit 302k extends from groove 302i to without housing 302 and connects with a conduit 550j in firing valve block 550. (See FIG. 77.) Conduit 302k is connected to one of the passages 110a in one of the bars 110. Said passage at its other end connects with a passage in firing ring housing 136 connecting with a passage in firing valve block 550 which in turn connects with passage 550j in valve block 550. Passage 550j supplies oil to chamber 550h, all to be later described.

The end of shaft 306 adjacent lever 307 is engaged by the end of a plunger 358a forming part of a piston 358 movable in a chamber 302m. A cover member 360 engages and is secured to the end of housing 302 by spaced bolts 361, the same having a portion extending into chamber 302m. Said latter portion is provided with a groove in which is disposed an O-ring 362. Housing 302 has an annular groove about chamber 302m and an O-ring 359 is disposed in said groove and engages portion 358. A conduit 364 extends from chamber 302m to a transfer sleeve 385 which extends to air control valve 428 and relief valve 452 to be later described. Housing 302 has a laterally projecting boss 302o adjacent the outer end of chamber 302m. Said boss is provided with a passage 302h leading to chamber 302m. Said boss is threaded to receive a headed and threaded plug 371.

Housing 302 has therein a chamber 302n in which is disposed a piston 365 having a plunger 365a adapted to engage the lower portion of lever 328. Chamber 302n is of larger diameter than piston 365 at one end and a passage 302s extends from said enlarged portion to the atmosphere. Housing 302 has a groove surrounding chamber 302n and an O-ring 366 is disposed in said groove and engages the periphery of piston 365. A passage 367 in housing 302 leads from chamber 302n and is closed by a headed plug 363. A passage 302t leads from passage 367 inwardly of plug 363 to a larger passage 302u in lower unit 300 in which is disposed a transfer sleeve 372 which extends into the top of tube 100 and communicates with one of the passages 110a. In effect, passage 302t extends to the selector valve, as shown in the schematic drawing in FIG. 91. A closure member 368 for chamber 302n engages the end of housing 302 and is secured to said housing by spaced bolts 369. Member 368 has a portion projecting into chamber 302n, the same having an annular groove therein in which is disposed an O-ring 370 engaging the cylindrical wall of chamber 302n.

Plate 300a has in the ends thereof chambers 300b extending to a central opening in said plate and being rectangular in cross section. Members 350 are respectively disposed in the outer end portions of chambers 300b. A plurality of cushioning pads 373, shown as three in number, are disposed in chambers 300b respectively. Said pads are substantially in the form of rectangular blocks and are provided with central openings 373a which are of frusto-conical form at one end. While pads 373 can be made of various materials, in practice they have been made of Fabreeka. Metal plates 374 are disposed between pads 373, the same having central openings 374a of cylindrical form. Plates 374 have openings 374b at each side of the central openings 373a, the same having semi-cylindrical end portions with flat central portions. Cylindrical rods 380 extend through said end portions of openings 374b. Buffer members 376 have outwardly tapering shank portions 376a circular in cross section which extend through the central openings 373a and 374a respectively into chambers 357a respectively formed in the ends of members 350. Shanks 376a are threaded at their outer ends to receive nuts 377 which overlie washers 378 respectively engaging the bottom of chambers 357a. Each member 376 has a head portion 376b at its inner end fitting in chamber 300d₁ and engaging the innermost pad 373. The outer ends of head portions 376b engage the outer ends of latch portion 334a and 316a respectively. Cover plates 381 are secured to the respective ends of plate 300a by spaced bolts 382.

Figure 92:
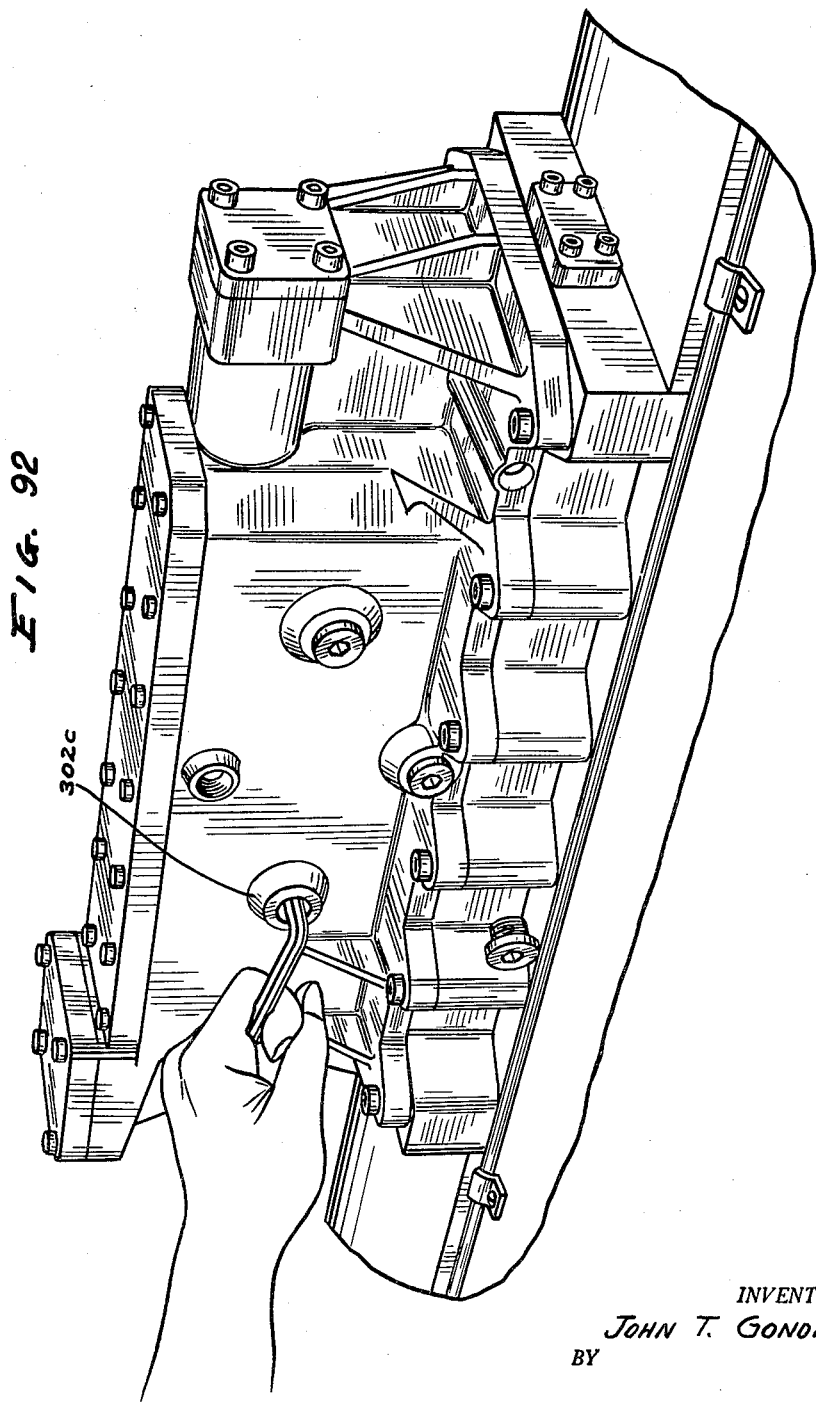
FIG. 92 is a perspective view illustrating the manual lifting of the rear stop in the stop mechanism.

In the above description of the stop mechanism it was set forth that piston 358 moves shaft 306 which in turn moves shaft 344 which acts as a plunger to force oil from the cylinder 357b and through conduit 302k to the pilot valve. In FIG. 92 a modification is shown in which air is forced to the pilot valve to open the same instead of a liquid, such as oil.

Figure 93:
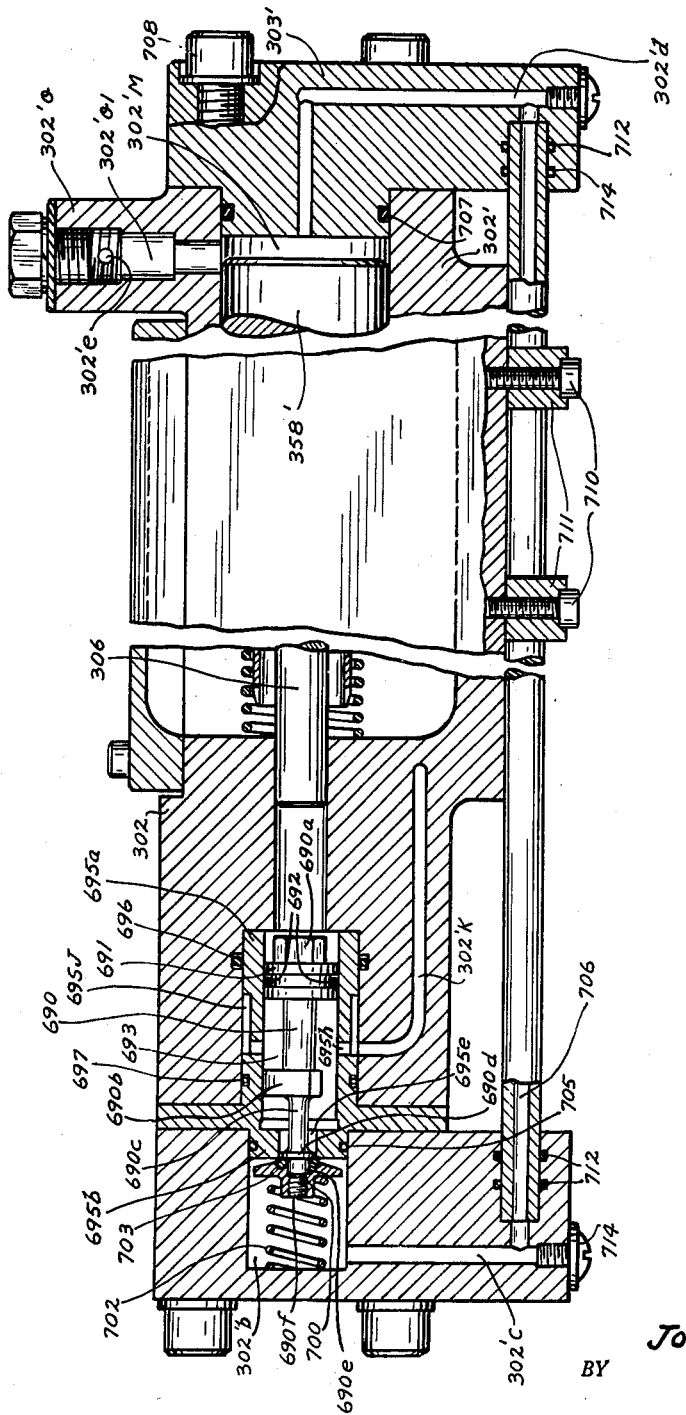
FIG. 93 is a view partly in side elevation and mostly in longitudinal vertical section through shaft 306.

In FIG. 93, which is a plan view, a piston 358' is shown which is the same as piston 358 in FIG. 41. A shaft 306' is moved by piston 358' and corresponds to shaft 306 in said figure. Shaft 306' is arranged to engage the head 690a of a rod 690 of a piston 691 movable in a cylinder 693 formed in a member 695 disposed in the block 302' corresponding to block 302 in FIG. 41. Piston 691 has an annular groove therein in which is disposed an O-ring 692 engaging the wall of cylinder 693. Block 302' has an annular groove surrounding member 695, and an O-ring 696 is disposed in said groove and engages the cylindrical portion 695a of member 695. Said cylindrical portion 695a has an annular groove therein and an O-ring 697 is disposed in said groove and engages the bore in block 302' in which the cylindrical portion 695a is disposed. Rod 690 has a guide portion 690b engaging the wall of cylinder 693 at three equally spaced portions thereof. Said rod also has a reduced portion 690c extending to a flange-like portion 690d. A further reduced portion 690e extends from portion 690d and terminates in a reduced and threaded portion 690f. Portion 690f receives the threaded hub of a valve member 700. A compression coiled spring 702 has one of its ends engaging member 700 and has its other end engaging the end of a cylindrical chamber 302"b in which member 700 moves. Chamber 302"b is formed in a member 302" secured to block 302' by headed bolts 704. As shown, member 695 has a flange portion 695b disposed between members 302' and 302". Member 700 has an annular groove surrounding portion 690e and an O-ring 703 is disposed in said groove and engages portions 690d and 690e and the annular corner of flange portion 695b at the outer end of passage 695e. Portion 695b extends into and fits into chamber 302"b. Portion 695b has a cylindrical passage 695e therethrough in which portion 690d of rod 690 moves. Portion 695b has an annular groove in its periphery in which an O-ring 705 is disposed which engages the wall of chamber 302"b. Member 695 has a plurality of openings 695h which extend from cylinder 693 to an annular groove or chamber 695j. A passage 302'k communicates with annular groove or chamber 695j. Passage or conduit 302'k corresponds to conduit 302k in FIG. 41. A passage 302"c extends from chamber 302"b and communicates with a conduit 706 which communicates with a passage 302'd which leads to the end of cylinder 302'm in which piston 358' moves, said cylinder being identical with cylinder 302m shown in FIG. 41. A member 302'o is disposed in one side of block 302', the same having a passage 302'o1 therein communicating with cylinder 302'm and with which passage another passage or conduit 302'e communicates and will be connected to a source of air under pressure. An end member 303' is provided having a portion fitting in the end of cylinder 302'm. Member 303' has an annular groove therein in which is disposed an O-ring 707 engaging block 302'. Member 303' is secured to block 302' by headed screws 708. Conduit 706 is secured to block 302' by screws 710 passing through blocks 711 extending around conduit 706. O-rings 712 are shown surrounding the end portions of conduit 706. Passages 302'c and 302'd are closed at one end by screws 714.

In operation, when air under pressure is supplied to cylinder 302'm, said air will pass from cylinder 302'm, through passage 302'd, conduit 706 and passage 302"c to chamber 302"b so that air under pressure will be contained in chamber 302"b. Member 700 and its O-ring 703 form a valve closing the passage 695e, which valve is held closed by spring 702. When member 690a is engaged by shaft 306', member 690a and piston 691 are moved and the valve formed by member 700 is opened against the pressure of spring 702. Air under pressure can now flow from chamber 302"b into cylinder 693 and the same will pass through openings 695h into annular chamber 695j and into conduit or passage 302'k which leads to the pilot valve. Said pilot valve will be moved as above described to exhaust air from one side of the firing ring so that the torpedo is fired. When air under pressure enters cylinders 693, piston 691 and rod 690 will be moved back to the position shown. The mechanism shown in FIG. 92 therefore shows the use of air under pressure for operating the pilot valve instead of oil under pressure as used in the structure shown in FIG. 41.

*Control Panel*

Figure 45:
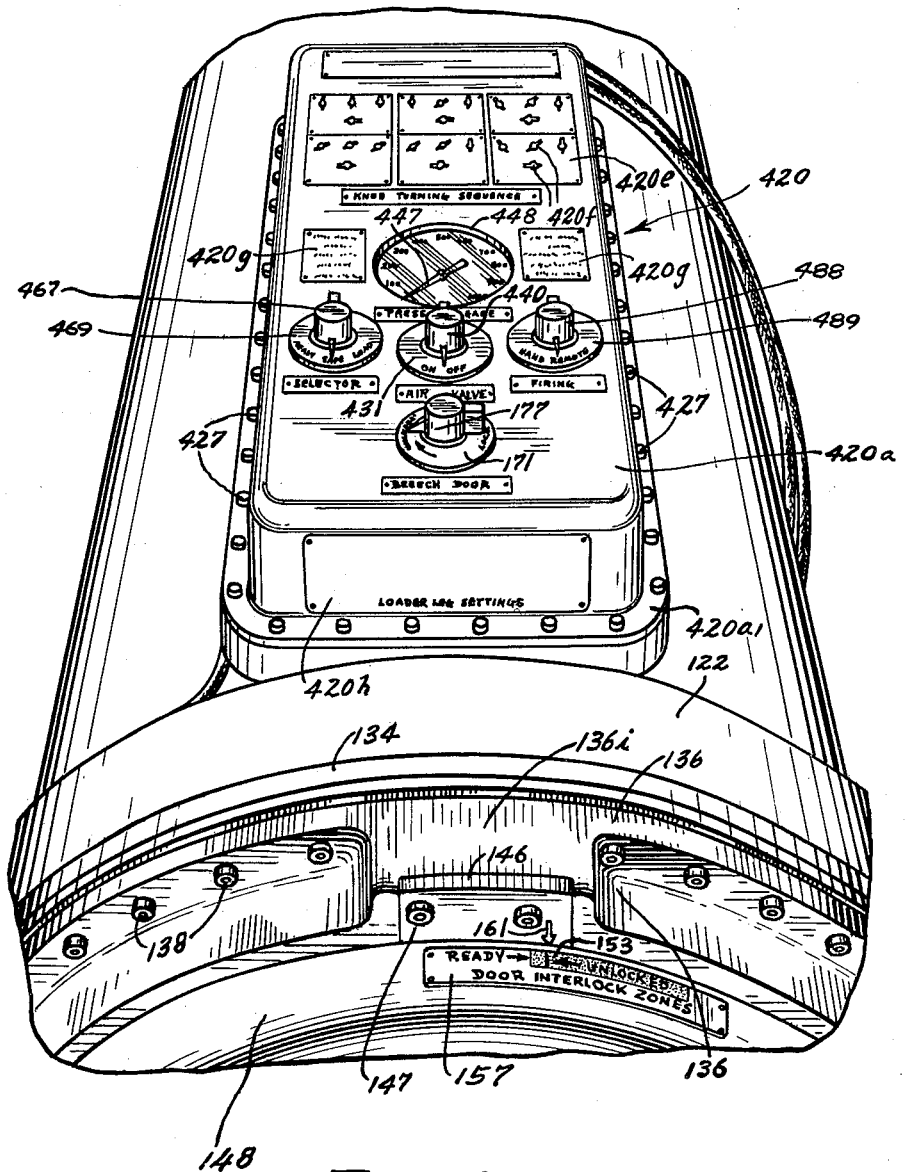
FIG. 45 is a perspective view looking at the top of the rear portion of the tube showing the control panel and part of the rear end of the tube.
Figure 50:
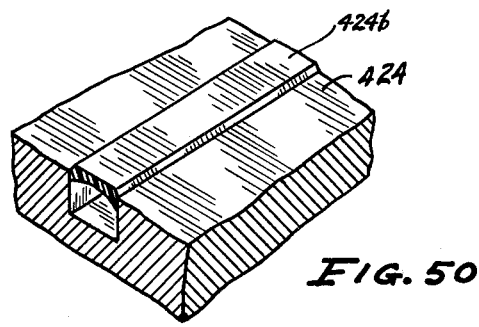
FIG. 50 is a partial perspective and sectional view taken on line 50—50 of FIG. 49.

A control panel 420 is provided which is located on top of the tube 100 closely adjacent the breech end thereof. This panel contains the various control components which are respectively operated to carry out the operations of opening the muzzle door, firing the torpedo, etc. This control panel includes a control panel plate 422 which is machined and carried on a machined portion of the barrel tube at the top thereof. In practice this control panel plate has been made of aluminum and has a thickness of one and three-eighths inches. Said plate is substantially rectangular with rounded corners and having an extension of reduced width at one end. From the bottom of said plate four small tubes 426 called "transfer sleeves" project. Passages in which said sleeves are located are machined in the top segment 100a of the tube which intersect with the channels 110a or 100c1 formed in the members 110 located respectively in the top segment 100a and the wall of tube 100. Such transfer sleeves 426 are provided with sealing O-rings at both ends which engage the sides of the bores receiving said sleeves. (See FIG. 69.) The openings or ports provided at the top of the panel plate by said sleeves 426 are aligned with holes in grooves of a valve plate 424 which forms part of the control panel. A conduit connector 422k for certain wiring conduits is disposed on the bottom of panel plate 422. Said valve plate comprises a multiplicity of grooves 424a which form conduits for the flow of fluids in the operation of the various components. Said grooves 424a are sealed at the top sides thereof by a plastic sealing material 424b, as shown in FIG. 50. By thus bonding the plastic sealing material 424b to the top side of the grooves, clear passages are provided under the said sealing material to transmit fluids to the various components in the control panel. Three conductor cables enter the control panel through their stuffing tubes 420k at the front end of the panel. (See FIG. 46.) The control panel also includes the cover 420a. Cover 420a constitutes a substantially rectangular casing of considerable height having an outwardly extending flange 420a1 at its bottom. Cover 420a is secured to the valve plate 424 and tube 100 by a multiplicity of bolts 427 extending through flange 420a1. The top of the valve plate is provided with a groove 424c in which is disposed an O-ring 421 engaging flange 420a1 and forming a seal for cover 420a. Cover plate 420a has panels 420e thereon, each of which has a set of rotatable buttons 420f which simulate the knobs and pointers of the selector, air and firing valves and breech door locking mechanism and show the successive positions said knobs should be in in firing the torpedo. Other panels 420g bear inscriptions constituting instructions concerning firing the torpedo. A panel 420h is provided for recording settings of supporting legs on a torpedo loading mechanism. The various components disposed in the control panel are mounted on the valve plate, as shown in FIG. 45. These components will now be described.

Air Valve

An air valve 428 is disposed in the control panel, the same being shown in FIGS. 51 and 52. Said air valve comprises a housing 428a and a lower portion 428b. Portion 428b is of cup-shape and has an annular groove formed in its inner portion at the top thereof in which is disposed an O-ring 429 engaging a reduced portion of housing 428a which extends into portion 428b. Portions 428a and 428b are secured to the valve plate by a plurality of bolts 430, shown as three in number. Portion 428b has a plurality of grooves in which are disposed O-rings 432 which respectively surround and engage bolts 430. Portion 428b has a central frusto-conical portion 428c forming the valve seat through which extends an opening or port 428d. Portion 428b has an annular groove surrounding port 428d in which is disposed an O-ring 433. Portion 428b is provided with another port 428e which extends through said portion 428b. Portion 428b is provided with an annular groove surrounding port 428e in which is disposed an O-ring 434. Housing 428a has a central bore in which is threaded a valve plunger 428f. Said plunger has a cylindrical recess disposed centrally in its bottom in which is disposed an insert 428g of rubber or other resilient material. Plunger 428f has a reduced portion forming the valve stem which projects upwardly through cover 420a and a circular plate 431 secured to said cover. Said stem is provided with a knob or handle 440 equipped with a pointer adapted to cooperate with designations "On" and "Off" on plate 431. When in the "On" position, portion 428g is moved away from seat 428c and air can flow through port 428d and out through port 428e to the various components to be operated. On the bottom of the panel plate 422 is a connector block 436 provided with a projecting sleeve 437 having an O-ring 435 disposed about its end. Said sleeve 437 fits into a hole in said panel plate. Sleeve 437 extends into a hole in the tube communicating with one of the grooves 110c1. Air pressure is thus delivered through the panel and certain grooves 424a in the valve plate to the entrance port 428d of valve 428.

Pressure Gauge

Near the center of the control panel, as shown in FIGS. 53 and 54, is a pressure gauge 443 that indicates the tube flask pressure which is the pressure in the various air channels in the tube. While the maximum air pressure used is about 600 lbs. per square inch, the gauge may register a considerably higher pressure. When the air valve is turned to "On" position, air pressure is transmitted through one of the grooves in the valve plate 424 to the inlet of the pressure gauge. Gauge 443 comprises a body portion 433a having a base-forming flange 443b having holes 443c. Bolts 445 extend through holes 443c to secure the gauge to the valve plate, said bolts having washers 449 under the heads thereof. Said gauge has a front portion 443e secured to the main or rear portion by screws 451. The gauge is of rather standard form and comprises a Bourdon tube 444 secured at one end to a shaft 446 to which is secured a hand or pointer 447. A dial plate 448 is disposed back of the hand 447 and secured to projections 443e1 by screws 441. Said dial plate will be graduated in pounds. (See FIG. 45.) The gauge has an inlet passage 443d through which air is delivered from a groove in the valve plate 424 to the tube 444. Body portion 443a has a groove at its bottom surrounding passage 443d in which is disposed an O-ring 450 which engages the valve plate. The dial plate 448 is plain and the tip of the needle 447 is painted with an autoluminescent material so that it may be seen at night. The graduations on dial 448 are also of an autoluminescent paint. The tube 100 is usually charged with air from the ship's air line to 600 lbs. per square inch.

Relief Valve

Figure 46:
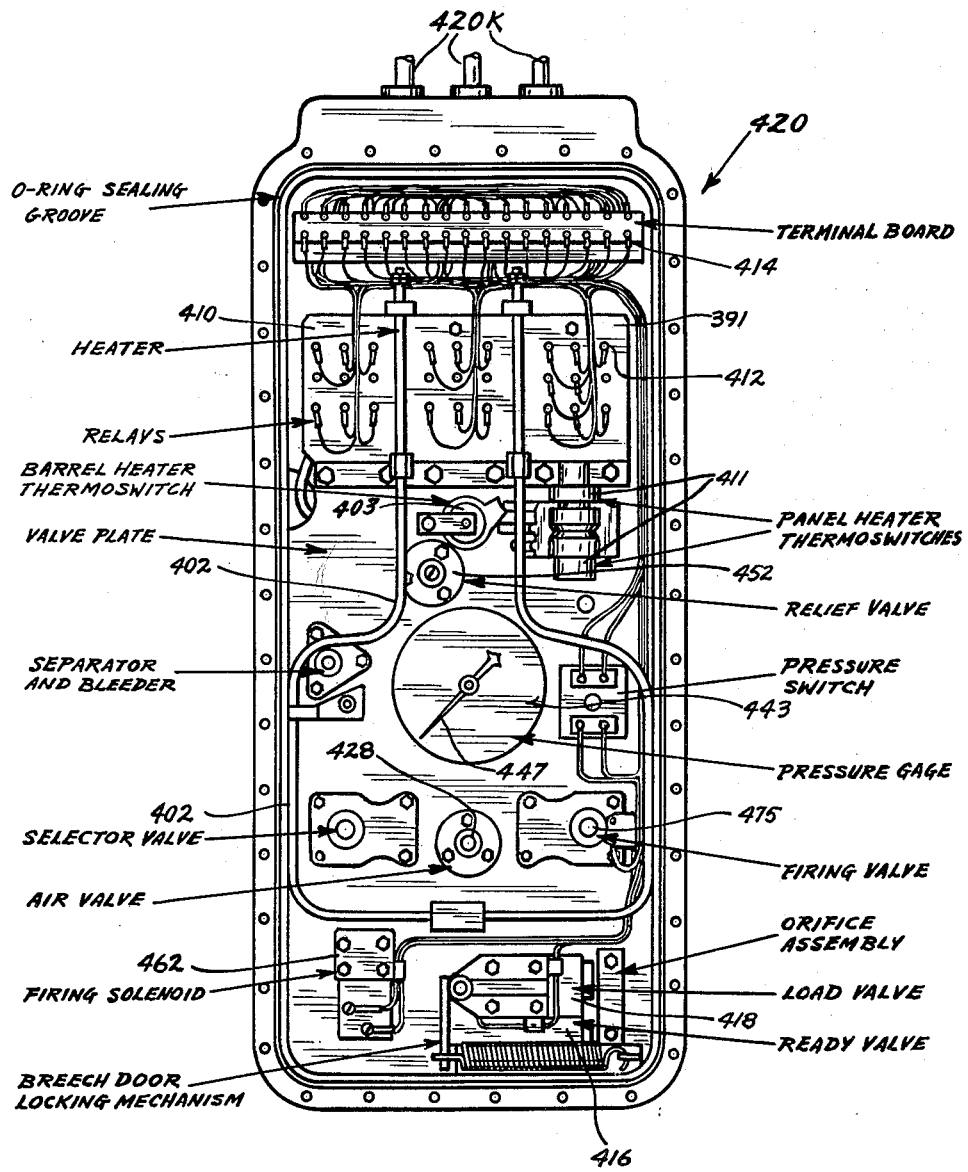
FIG. 46 is a top plan view of the valve plate in the control panel with parts thereon.

A relief valve 452 is provided and mounted on the valve plate and control panel, as shown in FIG. 46. Said relief valve is shown in FIGS. 55 and 56 and comprises a body portion 452a which is secured to the valve plate by a plurality of bolts 453 extending through holes in said valve body, said bolts being three in number. Bolts 453 have sealing washers underlying the heads thereof which engage the top of valve body 452a. Body 452a is bored to receive a plunger and spring housing 452b. A valve 452c is disposed in housing 452b and has a member 452d inserted in its lower end which will be made of rubber or other similar material. Valve body 452a has a lower portion 452a1 having a flange of small thickness at its upper end, and an O-ring 456 is disposed between the free end of said flange and a reduced portion of body 452a. Member 452d engages a valve seat 452h formed by a frusto-conical portion extending upwardly from lower portion 452a1. Valve member 452c has a valve plunger 452c1 extending upwardly which is disposed at its upper end in a reduced portion of a bore in member 452b. A compression coiled spring 452e is disposed in the bore in member 452b and engages the top of said bore at one end and the top of valve 452c at its other end. The bottom of portion 452a1 has annular grooves about bolts 453 and O-rings 457 are disposed respectively in said grooves and will engage the valve plate. An inlet passage 452f extends through lower portion 452a1. Portion 452a1 has an annular groove about inlet passage 452f and an O-ring 458 is disposed in said groove and will engage the valve plate. Portion 452a1 has an outlet passage 452g and also has an annular groove surrounding said passage. An O-ring 460 is disposed in said latter groove and will engage the valve plate. Spring 452e normally holds valve 452c in closed position. Inlet passage 452f communicates with the air storage channels in tube 100 and when this pressure exceeds approximately 750 lbs. per square inch, valve 452c is lifted and the air can then pass out through outlet passage 452g and to the atmosphere through a hole, not shown, in the bottom of the panel plate to the atmosphere.

Firing Control Solenoid

A firing control solenoid 462 is provided and mounted on the valve plate 424 in the control panel. (See FIG.

46.) This solenoid is provided to control the air line for firing and comprises a body portion 462a having an inlet passage 462b therein. (See FIGS. 57–59.) Body 462a is provided with a groove surrounding said inlet passage and an O-ring 463 is disposed in said groove and will engage the valve plate. A valve seat 462c is engaged by a member 462d to be made of rubber or other similar material. Member 462d is inserted in a core plunger 462e. A compression coiled spring 462f urges member 462d against valve seat 462c. Valve seat 462c has a passage extending therethrough communicating with a discharge passage 462g. Body portion 462a has an annular groove about passage 462g and an O-ring 464 is disposed in said groove and engages the valve plate. A coil 462h surrounds plunger 462e and has terminals respectively connected to the usual binding posts 462i. When the solenoid is energized by the closing of a switch usually disposed in the control room usually located at some distance from the tube 100, plunger 462e will be moved upward, as shown in FIG. 58, thus compressing spring 462f and opening the valve. The air can then pass from inlet passage 462b through outlet passage 462g to the desired point.

Selector Valve

A selector valve 468 is provided and mounted in the control panel. As shown in FIGS. 60–62, this valve comprises a valve body having an upper portion 468a and a lower portion 468b. An inlet port 468c is connected to the pressure line of the tube 100 and communicates with a chamber 468d in which is mounted a plunger 468e having a stem 648e1 extending upwardly and engaging at its upper end with one arm 648f1 of a bell crank lever 468f pivoted on a shaft 648g. Said lever is urged to swing in a counter-clockwise direction, as seen in FIG. 61, by a compression coiled spring 468h. Stem 468e1 is urged to position to move plunger 468e downwardly to close the inlet 468c by a coiled compression spring 468i. Spring 468i at its upper end engages a washer engaging the top of chamber 468d. At its lower end spring 468i engages a flange at the bottom of an upwardly tapering sleeve 468aa slidable on stem 468e1 and having a frustoconical recess at its lower end arranged to engage over a similarly formed portion at the lower end of stem 468e1. An alignment sleeve 468j extends between body portions 468a and 468b and plunger 468e moves in this sleeve. Upper body portion 468a has an annular groove therein about sleeve 468j and an O-ring 469a is disposed in said groove and engages lower body portion 468b. Valve body portion 468 has an annular groove about stem 468e1 and an O-ring 465 engaging said stem is disposed in said groove. The valve has another inlet port 468k disposed axially of the rotating valve proper 468m. Valve portion 468m has an axial passage 468m3 aligned with and communicating with passage 468k from which a radial passage 468m4 extends. Valve 468m has an annular groove about passage 468m3 in which is disposed an O-ring 474 which engages portion 468b. Valve 468m has valve stem 468m1 which is provided with a handle knob 467 for turning said valve. (See FIG. 45.) Said knob has a pointer which cooperates with a circular plate 469 on top of cover 420a having thereon designations of the different positions of the valve, namely "Ready," "Safe" and "Load." Plate 469 has an O-ring in its lower side. An outlet passage 468p is provided and communicates with an annular groove 468m2 formed in valve 468m. Groove 468m2 extends through substantially 315 degrees and connects ports 468p and 468w when the selector valve is in its safe position. Another outlet port 468q is provided and is adapted to come into alignment with a passage or chamber 468r formed in valve 468m. Passage 468r has therein at the bottom portion thereof a contact ring 468s which is urged against the lower portion 468b by a coiled compression spring 468t. Ring 468s has an annular groove therein in which is disposed an O-ring 470. The afore-mentioned port 468w is similar to port 468q and is disposed symmetrically with port 468q about the horizontal center of FIG. 62. Lower body portion 468b has annular grooves about inlet passages 468c, 468p, 468k and 468q as well as port 468w at the bottom thereof in which are disposed O-rings 473 which will engage the valve plate. Valve 468 is connected to the valve plate and tube 100 by a plurality of headed bolts 472, the same being shown as four in number and as having washers 468v under the heads thereof. Bolts 472 pass through body portions 468a and 468b and hold the same tightly together.

Arm 468f is normally disposed in groove 468x and valve member 468m and said arm cannot be rotated by stem 468m1 until arm 468f1 of bell crank 468f is lifted out of said groove. It will be seen that when plunger 468j is lifted by pressure through port 468c, that lever 468f1 will be released and the valve 468m can then be rotated to bring ports 468q and 468w into communication with inlet port 468k.

It follows from the foregoing description that by rotating valve 468m that the radial portion of passage 468m3 may be brought into communication with ports 468q and 468w. When in central normal or "Safe" position, groove 468m2 connects ports 468q and 468w to port 468p, which latter is an exhaust passage. If any air is trapped in the lines communicating with ports 468q and 468w, it will be drained out through port 468p. A thrust washer 468y is disposed between the top of valve 468m and upper body portion 468a, the same being made of Teflon which reduces friction in the turning of valve 468m. The selector valve is used to connect the air line to piston 365 to lift the rear latch 334a and to piston 196 to open the muzzle door.

Firing Valve

A firing valve 475 shown in FIGS. 63–65, is provided which is also located in the control panel. This valve is quite similar to the selector valve and has parts 475a, 475b, 475c, 475d, 475e, 475e1, 475f, 475f1, 475g, 475h, 475i, 475j, 475k, 475m, 475m1, 475m3, 475p, 475r, 475s and 475t which identical with the same parts shown in FIGS. 60–62, with the number 468 having the same respective letters. O-rings 476a, 477, 478, 480 and 487 are respectively identical with the O-rings 469a, 470, 473, 474 and 465. Valve 475 has an inlet port 475c extending through body portion 475b adapted to be connected with port 475k. The valve stem 475m1 is provided at its upper end with a knob handle 488 having a pointer thereon which cooperates wtih the designated positions of said valve on a plate 489 secured to the top of cover 420a and through which stem 475m1 passes. Plate 489 has an O-ring in its lower side engaging the top of cover 420. Valve stem 475m1 has a portion 475m4 which is formed as a cam and is adapted when rotated to engage the operating plungers of a pair of micro-switches or a double pole double throw micro-switch IZ2. Valve 475 is secured to the valve plate and by a plurality of headed bolts 485 passing through body portions 475a and 475b. Bolts 485 have washers 486 under the heads thereof.

As in the selector valve, arm 475f, 475f1 is normally disposed in a radial groove 475x which prevents rotation of bell crank lever 475f and valve 475m. It will be seen that when air pressure through ports 475c lifts plunger 475e, that lever 475f is moved clockwise and valve 475m is released for rotation. Valve 475m has only two positions, remote and hand. When said valve is turned to remote position, the pressure line from the tube is blocked or shut off. When valve 475 is in this remote position the tube will be fired from a remote position by a switch which will actuate the firing solenoid. When valve 475 is in remote position, switches IZ2 are closed.

Ready Valve and Load Valve

Two identical valves 416 and 418, FIG. 25, are provided mounted in the control panel, which are called the ready valve and load valve respectively. Only valve 416 is specifically shown in the drawings. Said valves each comprise a valve block or body 416a, FIGS. 66 to 68, which is bored to provide a chamber 416b having a reduced portion 416b1. A valve seat 416c is provided between chamber 416b and portion 416b1. Portion 416b1 has a further reduced portion in which fits and is slidable the valve stem 416d1 of a valve 416d. Said valve 416d has an insert 416d2 of the rubber or similar material therein which engages valve seat 416c. Valve 416d is urged to closed position by a compression coiled spring 416e disposed in a chamber 416f1 in a plug 416f threaded into chamber 416b. Valve stem 416d1 has a collar 416d3 thereon movable in chamber 416b1. An O-ring 417 is disposed in the end of chamber 416b1 and surrounds valve stem 416d. An inlet port 416g extends into chamber 416b and a discharge port 416h extends into chamber 416b1. Sleeves 416i and 416j are respectively disposed about inlet passage 416g and discharge passage 416h. Body 416a has grooves therein about sleeves 416i and 416j and O-rings 423 are disposed in said grooves and arranged to engage valve plate 424. Bolts pass through holes 416k for holding valves 416 and 418 respectively in position. As previously described, said ready and load valves are disposed to be engaged by arm 174, FIG. 25. When the breech door hand knob 177 is turned to locked position, spring 162 moves arm 174 into position to engage the valve stem 416d1 and move the same against the pressure of spring 416e in each valve to open both valves 416 and 418.

Pressure Switch

A pressure switch 496 is provided and located in the control panel. The switch is shown in FIGS. 69 and 70, together with a vertical section through the valve plate, panel plate, a portion of the tube 100 and a transfer sleeve 502. Said pressure switch has a valve block or body 496a bored to provide a chamber 496b. A compression coiled spring 496c is disposed in chamber 496b, the same engaging a retaining washer 496d at one end, which washer engages the top of chamber 496b. At its other end said spring engages a flanged washer 496e which in turn engages a ring 496f carried in a stem 496g. Stem 496g extends through the top of body portion 496a and has a cam 496h of inverted frusto-conical shape secured thereto above body 496a. Said cam is adapted to engage the spring pressed actuating plungers of a pair of microswitches IZ1 and IZ3 disposed at opposite sides of cam 496h. Switches IZ1 and IZ3 are disposed between plates 496j and 496k which are held in place by screws 496m. Lower plates 496k are secured to body 496a by screws 496n. Body portion 496a has an annular groove in its upper portion in which is disposed an O-ring 500 engaging stem 496g and washer 496d. A ring 496o is disposed in a groove in stem 496g and acts as a stop for upward movement of stem 496g. Said body portion has an annular groove in its lower side in which is disposed an O-ring 501 engaging the top of valve plate 424 and acting as a seal. The pressure switch is secured to the valve plate 424 by a plurality of bolts 505 extending through the lower flange on body portion 496a, said bolts being shown as four in number. Washers 506 underlie the heads of said bolts. Said FIG. 69 also shows the panel plate 422 having a recess in its lower side in which is disposed the upper portion of a transfer sleeve 502. A reduced portion of this sleeve also extends into the upper portion of the tube 100 and has a passage therethrough communicating with an air line 110a2 below one of the inserted extrusions 110 in a channel 110a disposed in upper segment 100a. Sleeve 502 has a peripheral groove adjacent its top in which is disposed an O-ring 504 engaging the sides of the bore in which said sleeve is disposed. Sleeve 502 has another peripheral groove in the portion thereof disposed in extrusion 110 and an O-ring 503 is disposed in said groove and engages the wall of the bore containing sleeve 502. FIG. 69 thus illustrates the manner of connecting the air storage chambers in tube 100 with the various components in the control panel.

It will be seen that when sufficient pressure from channel 424d is present, valve stem 496g will be lifted against the pressure of spring 496c. When stem 496g moves upward, the plungers of switches IZ1 and IZ3 can move toward each other and said switches will close. The switch IZ1 is in series with the firing solenoid so that switch IZ1 must therefore be closed before said solenoid may be energized when the firing key is operated in the control room.

Orifice Unit

An orifice unit 510 is provided which is located in the control panel. As shown in FIGS. 71–73, said unit has a body portion 510a with a flange at its bottom. Said unit and flange are substantially rectangular in plan. Said body portion has an inlet passage 510b which communicates with a chamber 510c in which is disposed a filter 510d. A plug 510e is threaded into one end of chamber 510c, the same having a head portion the inner side of which engages an O-ring 512 disposed in an annular groove in body portion 510a. An orifice 510f extends from filter 510d into a passage 510g extending through the bottom of body portion 510a and which constitutes the discharge passage. Body portion 510a has annular grooves in its bottom extending about passages 510b and 510g in which are respectively disposed O-rings 514. O-rings 514 surround sleeves 517. Said orifice unit is secured to the valve plate by a pair of headed bolts 515. Said bolts have washers 516 underlying the heads thereof. The pressure line in the valve plate that connects the firing solenoid and firing valve to the stop mechanism to cause firing also connects with the port or channel 510b. If air should leak past the firing solenoid or firing valve while the air valve 428 is in "On" position, the orifice 510f connects these air lines with the channel or port 510g which exhausts to atmosphere through the separator and bleeder unit to be later described, so that pressure may not build up and cause inadvertent firing of the tube. If for any reason the firing solenoid were not energized for a sufficiently long period to completely exhaust air from the firing lines, the orifice 510f in the orifice unit would permit bleedoff of the remaining air pressure so that the stop mechanism could return to its normal position.

Separator and Bleeding Unit

A separator and bleeder unit 520 is provided, the same being located in the control panel. As shown in FIGS. 74 and 75, said unit comprises a body portion 520a having a lower cylindrical portion 520b which fits in and is disposed in a bore in the valve plate and panel plate. Portion 520b has a lower part of less diameter than said bore, the same having therein a pair of peripheral grooves 520b2 in which are disposed O-rings 521. Grooves 520b2 are connected by passages 520b3 to a central passage 520g which extends from adjacent the bottom of panel plate 422 to a chamber 520f in the top of body portion 520a to be later described. Portion 520b also has a peripheral groove in which is disposed an O-ring 522 engaging the wall of said bore. Portion 520b has a pair of channels 520b1 extending therethrough at right angles to each other and communicating at their outer ends with a groove 520c in valve plate 424. Body portion 520a has a portion 520h of larger diameter than portion 520b disposed in a bore in valve plate 424. Said latter portion has an annular groove in its periphery in which is disposed an O-ring 524 engaging said bore in the valve plate. Body portion 520a has a flange engaging the top of valve plate 424 and extends upwardly in cylindrical form from said flange. A plurality of headed bolts 525, shown as three in number extend through holes in said flange and are threaded into the valve plate and panel plate. Chamber 520f has therein a screen or separator 520d. While member 520d might be made of various materials, in practice it has been made of aluminum foil. Portion 520c is threaded at its upper end to receive a breather cap 520e having a central portion engaging a disk 520i fitting in chamber 520f and overlying the filter material 520d. Openings 520e1 extend through the top of cap 520e to the atmosphere. When pressure within the control panel exceeds five pounds per square inch, there is sufficient force against O-rings 521 to expand them thereby permitting air to escape through the orifice between the lower end of portion 520b and the bore in the panel plate to the atmosphere.

*Firing Valve Block*

Figure 76:
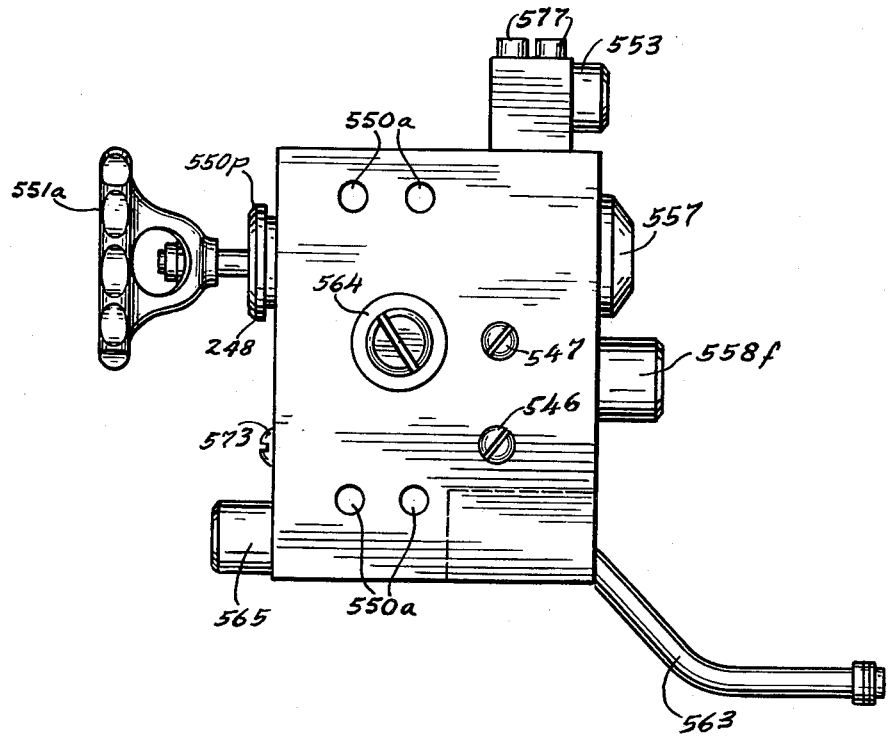
FIG. 76 is a view in side elevation of a firing valve block used.

A firing valve block 550 is provided which is mounted on the firing ring housing 136 adjacent the rear tube support 124. An exterior front view of block 550 appears in FIG. 76. Said block is secured to housing 136 by bolts 549 passing through holes 550a. An adapter block 553 is located on top of block 550. Block 553 has a right angle passage 553a extending therethrough and threaded at its outer end for connection of the ship's high pressure air line 554. (See FIG. 79.) Block 553 is secured to block 550 by bolts 577. Block 550 is provided with a charging valve 551 having a scalloped operating handle 551a. Handle 551a is secured to the stem 551c of a valve-holding member 551b by a nut 551j. Stem 551c is threaded in a member 551d having an inner enlarged portion fitted in block 550. The outer portion of member 551d extends through a member 548 threaded into block 550, engaging a shoulder on member 551d formed by said enlarged portion and having a flange 548a at its outer end which has a polygonal periphery. Member 551b extends into a chamber 551e formed in block 550, in which chamber is located a valve seat 551f engaged by the valve face 551g of a check valve 551h. Valve face 551g will be made of rubber or other suitable yielding material. Member 551g is carried in the inner end of valve 551h, the latter having a head portion disposed in a recess in the inner end of member 551b. Valve 551h has a stem 551h1 extending outwardly in a chamber 551h2 in member 551b and said stem extends through a coiled compression spring 552 one end of which engages the front side of valve 551h. The other end of spring 552 engages a shoulder formed by a reduced portion of chamber 551h2. It will be seen that valve 551h with stem 551h1 and spring 552 constitutes a check valve in the charging valve 551. The purpose of such check valve will be later explained.

A filter 556 is disposed in a chamber 557a in a shell-like member 557 threaded into block 550. A passage 550c extends from chamber 557a to passage 553a of adapter 553 and another passage 550d extends from chamber 557a through valve seat 551f. While various forms of filters could be used, in practice a filter having a metallic ribbon element with .0015 inch spacing has been used. Valve 551 has an annular groove therein and an O-ring 555 is disposed in said groove engaging member 551d. Another O-ring 526 is disposed in an annular groove in member 551d and engages block 550.

A pilot valve 558 also disposed in block 550. Valve 558 has a stem or plunger 558a and a front portion in which is carried the valve face 558b which will be made of rubber or some suitable yielding material. The face 558b engages the seat 550f for valve 558, which seat surrounds a passage 550g in block 550. Passage 550g extends to a passage 550p which extends to the bottom of block 550 and to atmosphere. Valve 558 and its face 558b are disposed in a chamber 550o. Stem 558a is threaded into a hexagonal nut 558d disposed in a chamber hexagonal in cross section formed in a member 558e, which latter has a shoulder engaged by one end of a coiled compression spring 559. Spring 559 is disposed in a chamber 558f1 in a cap member 558f and engages the end of said chamber at its other end. At its rear end, nut 558d has a central projection fitting in a bore in the front end of member 558e and the same carries an O-ring 547 fitting about stem 558a. Stem 558a has a small reduced end portion 558a1 square in cross section disposed in a passage square in cross section in the end of member 558e. Member 558d has a reduced front end portion abutting an O-ring 519 in a cylindrical recess in the rear end of a member 558i. Member 558e at its front end extends into a chamber 558g formed in member 558i and abuts a shoulder on nut 558d. Member 558i has a front face separated slightly from the rear face of a member 558c thus forming a chamber 550h in block 550. Stem 558a extends through members 558i, 558c and a member 558n, which latter has a recess in its front end surrounded by a flange which abuts block 550. Member 558c has a passage 558k extending diametrically therethrough and into a counterbore surrounding rod 558a. Passage 558k is provided to drain away any oil which might move along rod 558a into said counterboer from chamber 550h. Said counterbore is connected to atmosphere through a small passage 558p extending to the side of block 550. An outlet is thus provided for any oil which might leak along rod 558a and into said counterbore. Member 558i has a reduced cylindrical front end disposed in a recess in the rear side of member 558c and engages an O-ring 580. Member 558n has a reduced cylindrical projection at its rear end disposed in a recess in the front end of member 558c and engaging an O-ring 581 disposed in said recess. Passages 550w, 550u and 550y1 lead from chamber 550h to a conduit 302k which leads to chamber or cylinder 347b in the stop mechanism. Oil is forced from cylinder 347b to chamber 550h to move members 558i, 558d, and 558e against the pressure of spring 559 and open pilot valve 558, as will be later described. Block 550 has annular grooves therein about member 558c and O-rings 582 are disposed in said grooves and engage block 550.

A check valve 560 is disposed in and slidable in a chamber 564a in a member 564 threaded into block 550. The face 560a of valve 560 engages a seat 550r which surrounds a passage 550k controlled by said valve. Valve 560 is engaged at one side by one end of a compression coiled spring 561 which at its other end engages one end of chamber 564a in which spring 561 is located. Valve 560 has a passage 560b of small transverse dimension extending axially therein and similar radial passages extend from one end of passage 560b to the outer side of said valve into chamber 564a. Passage 550k connects with passage 550a6 (see FIG. 78) which at one end connects to charging valve chamber 551e. Passage 550a6 also connects with passage 550a2 and (see FIGS. 78 and 80) the latter connects with passage 136p, which latter leads to firing ring chamber 136a. Passage 550a extends to passage 136n leading to annular passage 134a in manifold plate 134 and to air flask chamber 100c1 in tube 100. Air can thus pass from chambers 100c1 and 134a through passages 136n and 550aa to chamber 564a, and through passages 560b, 550k, and 136m to the rear of firing ring 142 in chamber 136a. A bushing 550k1 surrounds the end of passage 550aa and an O-ring 548 surrounds bushing 550k1 and engages the firing ring housing 136. The reduced end of passage 550k extends through a bushing 550k2 surrounded by an O-ring 550k3. A resilient backing member 562 is disposed in the rear of valve 560 to prevent chattering.

A member 565 is threaded into block 550, the same having a chamber 565a therein of substantially conical form at its inner end and converging to a passage 565b of small size which connects with another small passage 565d extending transversely of the reduced end portion of member 565 and communicating with an annular groove in the periphery of said portion. An O-ring 566 is disposed in said groove. A ring 567 surrounds the inner end portion of member 565 and has its inner side engaging O-ring 566. Member 565 has a second annular groove in its periphery and an O-ring 550v is disposed in said groove and engages block 550. The reduced portion of member 565 also has an annular groove thereon in which is disposed a plastic ring 568 engaging ring 566 to retain the latter in position. Member 565 has a slot 565c in its end formed to receive a turning tool. A cover member 570 is threaded on member 565 and engages the side of block 550, the same having a slot 570a therein formed to receive a turning tool. Cover member 570 can be removed and a pressure nozzle placed in chamber 565a through which oil can be forced past O-ring 566 and into a passage 550t and into passage 550j to replenish oil in the system comprising chamber 550h and conduit 302k and cylinder 347b. Passage 550t extends from a chamber 550s in which the inner end of member 565 is disposed to a passage 550j, to a cross passage 550y to a passage 550u, to chamber 550h, to a cross passage 550j1 which extends perpendicular to the plane of the paper (see FIG. 79), to exterior of the side of block 550 and is plugged by screw plug 546. (See FIG. 78.) Passage 550j1 extends to exterior of the side of block 550 and is plugged by a screw 547. Passage 550j1 being the highest oil passage in block 550 is used as the main bleeding line. A passage 550u extends from passage 550w to a passage 550y, and for cenvenience of machining, passage 550u continues to the outside of block 550 and is closed by a screw 573. Passage 550y1 which is at right angles to passage 550u extends through a bushing 550y3 and an O-ring 550y2 to a passage (not shown) in the firing ring housing and then to conduit 302k in the stop mechanism. Passage 550w extends to the bottom of block 550 and is plugged by a screw 544. See FIGS. 79–80. Passage 550w extends to a passage 550j1. For machining purposes, passage 550y is continued to the side of block 550 and is plugged by a screw plug 546. Also for machining purposes, passage 550j is continued to the bottom of block 550 and is plugged by a screw 545. Passage 550k extends to passage 550a6 which extends from chamber 551e (see FIGS. 78 and 80) to a conduit 563 which extends from chamber 551e (see FIGS. 78 and 80) to a conduit 563 which extends to cylinder 465b of switch 479. Passage 550a6 also communicates with chamber 550o as well as with passage 550a2.

Passage 550a2 extends from chamber 550o through a bushing 550a3 extending to the face of block 550 which engages firing ring housing 136. Passage 550a2 communicates with a passage 136n in housing 136 which extends to chamber 136a containing firing ring 142. O-rings 548 extend about bushing 550a3 and 550y3, the same engaging the housing 136 when block 550 is secured to said housing. Block 550 has a recess in its bottom portion at one corner thereof as indicated in dotted lines in FIGS. 76 and 78.

Referring to FIGS. 82 and 82a, a modified form of the firing valve block 550 is shown. The check valve opposing entry of air into the charging passage in said modification is placed in the adapter block. In FIG. 82 the adapter block used is designated 640. The 600 p.s.i. air hose will be connected to this block. A member 641 extends into a bore in block 640 and has a bore 641a which is interiorly threaded to receive the hose connection. Said bore is closed by a removable plug 642. A valve member 643 is slidable in the inner end of bore 641a, said valve member having a flange 643a extending thereabout which engages an O-ring 644 when the valve is in closed position. O-ring 644 also engages a beveled surface on the inner end of member 641. An O-ring 647 is disposed in an annular groove in member 641 and engages the bore in adapter 640. A compression coiled spring 648 engages the flange 643a of valve member 643 and holds said valve in closed position with flange 643a engaging the O-ring 644. The other end of spring 648 is disposed in a sleeve 649 and engages a shoulder in said sleeve. Sleeve 649 is secured in adapter 640. A passage 640b extends from the bore in adapter 640 through the top of a valve block 652 and into a chamber 652a in which is disposed a filter member 657 similar to filter member 556 in block 550. Valve block 652 corresponds to valve block 550. A member 651 is threaded into block 652, the same having an enlarged portion engaging the outer side of block 652. A sealing member 653 is disposed in block 652 and is engaged by the enlarged outer portion of member 651. The inner end of member 651 also engages an O-ring 654 disposed in block 652. A passage 652c extends from chamber 652a and to a chamber 659a in a member 659 disposed in a bore in block 652. A sleeve 656 is disposed in chamber 655a and is moved away from passage 652c by a coiled compression spring 658 which at one end engages a washer 659 threaded into member 655 and at its other end engages the end of a bore in sleeve 656. Sleeve 656 has a bore of reduced diameter at its outer end, which bore is beveled at its outer end and forms a valve seat for a valve member 660 having a threaded portion 660a threaded into block 655 disposed in a bore in block 652. O-rings 662 extend around block 655 and engage block 652. Valve member 660 has an annular groove therein in which is disposed an O-ring 661 engaging the bore in block 655. The outer end of block member 655 fits in a bore in a closing member 665 which is threaded into block 652. An annular chamber 655c is formed in member 655 into which air passes when valve 660 is opened. Another annular chamber 655d is formed in member 655 radially alined with chamber 655c and spaced passages connect chambers 655c and 655d. An annular groove 655e in member 655 connects at one side with chamber 655d and is connected to a passage 612g. The inner end of member 665 engages a shoulder on member 655. Member 665 has a peripheral flange 665a at its outer end which will preferably be hexagonal in shape. A scalloped hand wheel 666 is secured on the outer end of valve member 660 by a nut 666a threaded onto said valve member.

A member 670 is disposed in a bore in block 652, the same having an inner reduced portion forming a shoulder fitting against a shoulder in block 652. Member 670 has an annular groove in its periphery adjacent its outer end in which is disposed an O-ring 673 engaging block 652. Member 670 has spaced annular grooves in its inner reduced portion in which are disposed O-rings 672 engaging block 652. A member 674 is disposed in and fits in member 670 adjacent the outer end of the latter, the same having an annular groove therein in which is disposed an O-ring 676 engaging the inner side of member 670. Another member 678 is disposed in and fits in member 670 and spaced some distance from member 674. Member 678 has an annular groove in its periphery in which is disposed an O-ring 680. Member 678 has an inwardly extending stem portion 678a having a reduced and threaded inner end on which is threaded a member 681 having a flange engaging the inner end of member 670 and fitting in and movable in a chamber 652d in block 652. Member 678 is urged to the position shown by a compression coiled spring 683, one end of which engages the enlarged outer end portion of member 678 and the inner end of which engages the end of the bore in member 670. A chamber 678d is thus formed between members 674 and 678 and a plurality of openings 670b1 extend into an annular chamber 652e. A passage 652f communicates with chamber 652e, which passage is analogous to passage 550j in FIG. 77. This passage will be connected to a conduit which extends to conduit 392k, which in turn communicates with cylinder 347b in the stop mechanism. An O-ring 686 is carried at the outer side of member 681 adjacent member 670 and engages the inner end or corner of member 670 about the passage 670b at the inner end of member 670. O-ring 686 also engages a flange on stem 678a, which flange fits in passage 670b. Member 681 thus forms a valve which is held in closed position by spring 683. Fluid pressure is delivered through passage 652f into chamber 652e, through openings 670b1 and into chamber 678d, and this forces member 678 inwardly against the pressure of spring 673 and opens valve 681 so that air in chamber 652d can pass through the opening at 670b in the inner end of member 670 into member 678. Said air will pass out through a passage 670a into a passage 652h which extends to the outside of block 652 and to atmosphere.

A member 565 is threaded into block 652 at the lower left-hand corner of FIG. 82 which is identical with member 565 in FIG. 77. All of the parts associated with member 570 in FIG. 77 are identical with the parts shown in said figure. It is believed it will not be necessary to again describe member 570. At its other end, conduit 690 extends to a cylinder 465b of switch 479. (See FIGS. 84 and 89.)

Passages 652aa and 652k are shown which correspond to passages 550aa and 550k in the structure shown in FIG. 79. In FIG. 82a the firing valve block is numbered 550 and said character is used in other parts. This was done for convenience as very few parts shown in FIG. 82a were changed.

When the tube is to be charged with air under pressure, the 600 pound air hose will be connected to adapter 640. Considerable pressure will have to be exerted to force the air past check valve 643. Air will then pass through filter 657 into passsage 652c. Valve 660 will have been opened by turning hand wheel 666. Air will then pass into passage 652c and into passage 659a shown in FIG. 82. When the torpedo is to be fired, the stops 316 and 334, FIG. 41, are moved to inoperative position by movement of shaft 306 which is moved by piston 358 by air delivered through conduit 364 into cylinder 302m. Oil is now forced from chamber 347b, through conduit 302k and into passage 652f. This as above described moves member 670 and opens valve 681 which is called the pilot valve. Air under pressure is present in chamber 652d and this can now pass out to the opening at the inner end of member 670, through passage 670a and into passage 652h which extends to the atmosphere. As will be later described, this relieves the air pressure at the rear side of the firing ring which fires the torpedo.

In FIG. 77 a modification is shown for the check valve 560. This valve comprises a member 675 which is disposed in and threaded into a bore in valve block 550. A chamber 675a1 is left at the inner end of said bore. Member 675 has a bore 675a therein. Member 675 has an annular groove thereabout in which is disposed an O-ring 676 engaging block 550. A plug 680 fits into the outer end of member 675, the same having an annular groove thereabout in which is disposed an O-ring 684 engaging member 675. Block 550 has an annular groove therein at the end of member 675 in which is disposed an O-ring 682 engaging member 675. The bore in member 675 has a reduced portion 675a2 which communicates with a channel 550k in block 550. A valve member 684 is movable in bore portion 675a, the same having a peripheral flange 684a which engages an O-ring 685 which in turn engages an outwardly beveled surface on member 675. A compression coiled spring 686 engages valve 684 and at its other end engages the bottom of a recess formed in plug 680. Member 675 has a pair of quite small passages 675b extending from the bore in block 550 to the outer end of said bore beyond valve 684. Another passage 675c of small diameter extends from reduced bore 675a2 to the bore in member 550.

It will be seen that the structure shown in FIG. 79 forms a check valve as does the equivalent structure in FIG. 78. Said structure could be substituted for the structure of valve 560 and cooperating parts shown in FIG. 78. The structure of valve shown in FIG. 77 is also shown in FIG. 82a. In said latter figure a passage 612f extends from chamber 675a1 to a passage through a bushing 550a4 surrounded by an O-ring 675a5. Said latter passage will communicate with a passage 136m' similar to passage 136m (see FIG. 81) which will lead to chamber 136a and to the rear of firing ring 142. Valve 684 can be opened by pressure of air in passage 550k.

Switch Box

A switch box 465 is mounted on the rear end of the tube, an exterior view of which is shown in FIG. 83. Said box has a concave surface 465g fitting against tube 100 and is connected to said tube by bolts passing through holes 465a. Box 465 has therein a rotary two position multiple switch 479 which is moved to "Ready" and "Fire" positions. Said switch is moved by a pneumatic mechanism comprising a cylinder 465b in which is movable a piston 466 having a piston rod 461 connected to a crank arm 481 in turn connected to shaft 459 of switch 479. Shaft 459 at its other end has a radial mark 459a thereon adapted to aline respectively with the indications "Ready" and "Fire." A transfer sleeve 471 extends into one of the flask channels 100c1 to supply air to the inner end of cylinder 465b. See schematic view in FIG. 89 and passage 511a. A passage and conduit 563 extends from passage 550a6 to the outer end of cylinder 465b. Switch 479 is adapted to open or close torpedo control circuitry. As above stated, a cable is connected to the torpedo. This cable passes through a slot 136j in the firing ring housing. This cable is severed when the torpedo starts to move out of the tube. It is one function of switch 479 when moving to "Fire" position to open all circuits except the firing circuit, which starts the torpedo motors, so that said circuits will not be short-circuited when the cable is severed. The said firing circuit is protected by a fuse. Four switch relays 465c are shown, as are cable connectors 465d and 465e for switch 479 and a cable connector 465f for surveillance and power connectors.

It will be seen that switch 479 functions with the circuits controlling the torpedo and is not really part of the invention of the tube. The surveillance and power connectors and the cable connectors 465e and 465f are part of the torpedo circuitry and form no part of the tube invention. They are shown and briefly described because they are attached to tube 100.

Heaters

As above stated, there is a muzzle door heater and a tube or barrel heater. There is also a control panel heater. The latter is shown in FIG. 46, and includes a tube 402 extending about part of said panel.

Figures 47, 48:
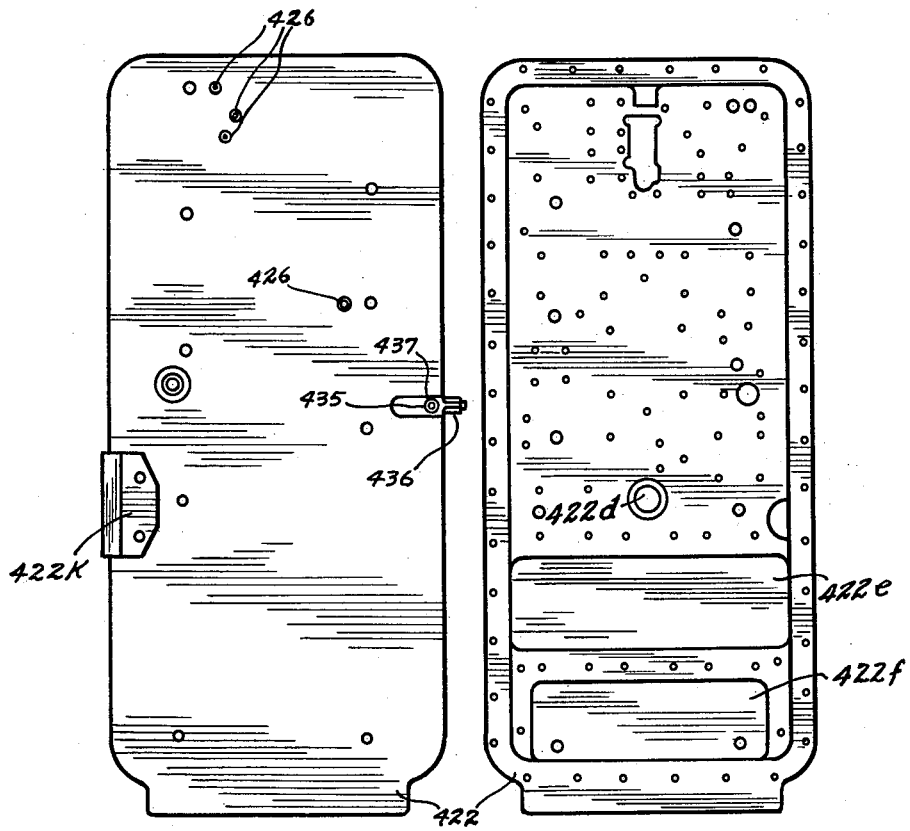
FIG. 47 is a bottom plan view of the panel plate.
FIG. 48 is a top plan view of the panel plate.
Figure 49:
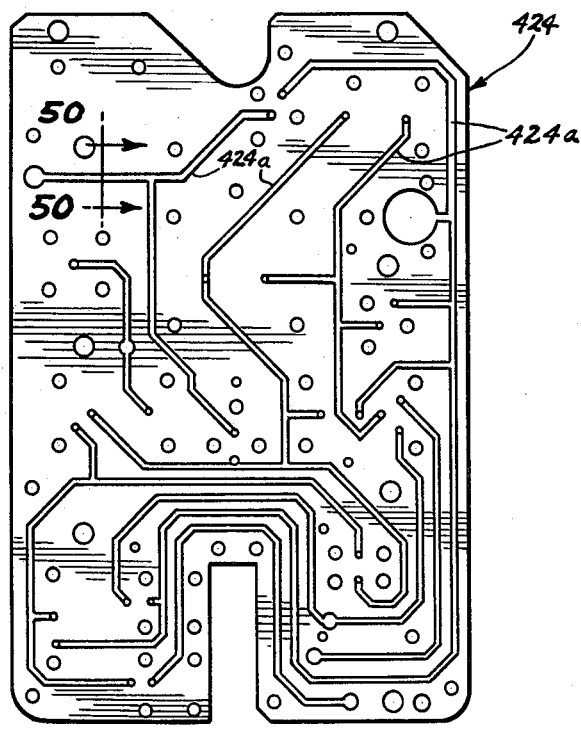
FIG. 49 is a top plan view of the valve plate.
Figure 85:
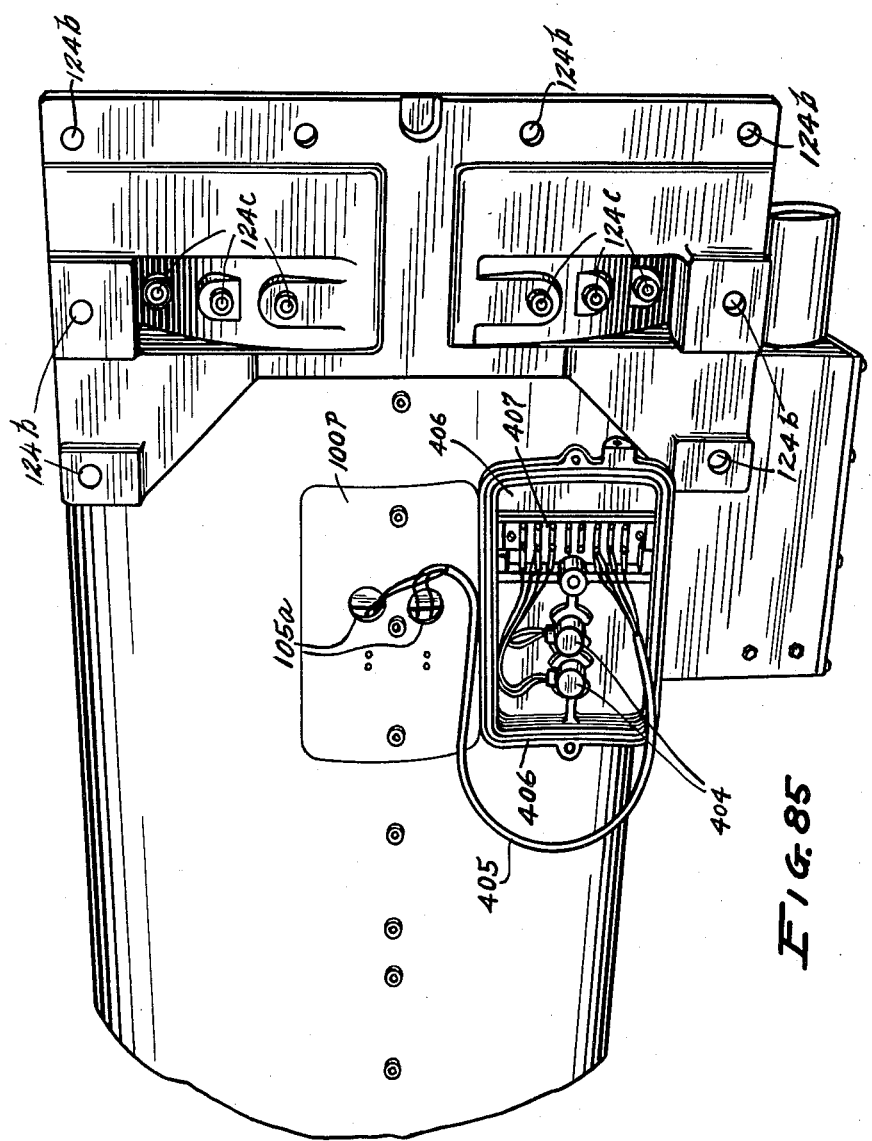
FIG. 85 is a perspective view of a terminal box containing parts of the heating mechanism for the tube, said view looking at the bottom side of tube 100.

The barrel heaters each comprise two Calrod heaters 105 disposed in channels 100b1 in the bottom tube segment 100b. (See FIG. 10.) In practice these have been of 500 watt capacity. At the muzzle end said heaters in channels 100b1 are in practice connected in series so that the two 100 watt loads are connected to 440 volts 60 cycle three phase power. Said power is controlled through a relay, carried on one of three boards 391, in the control panel (see FIG. 46), two thermoswitches 404, FIG. 85, disposed in a terminal box 406 located just forward of the rear tube support 124, a third thermoswitch 403 in the control panel disposed in a well 422d, FIG. 48, in the panel plate 422 so as to be adjacent the top of tube 100. Box 406 is hinged along one side to the tube 100 and fits over a pad 100p on tube 100. Box 406 contains a terminal board 407 to which the conductors used with heaters 105 and switches 404 are connected. (See FIG. 85.) A conduit 405 extends from adjacent board 407 to the terminal members 105a of heaters 105. Said conduit extends up around the outside of tube 100 to the flat surface on tube 100 and along the side of said surface to the conduit connector 422k on the panel plate in the control panel. (See FIGS.

1 and 3.) The temperature of tube 100 and of a torpedo therein is thus controlled from two points. In practice temperature settings on said thermoswitches assure that the heaters will function during cold weather, even with outside temperatures of —20 degrees Fahrenheit with a 40 knot wind blowing, to keep the temperature in tube 100 and the temperature of a torpedo therein above 34 degrees Fahrenheit. If the temperature drops below 34 degrees F. said thermoswitches will be actuated and said heaters will be operated.

The muzzle door heater 188 has already been described.

The control panel heater is controlled through one of the relays 412 carried on one of the boards 391 in the control panel, by two snap action thermoswitches 411 connected in series and located in the control panel. Said last mentioned relay 412 in the control panel is actuated by one or both of switches 411. Two switches are provided as a safety feature so that if one should not operate the other one would. In practice, heater 402 has been of 600 watt capacity. The wiring connections for the relays and switches are made on terminal boards 414 which are mounted adjacent the boards 391 in the control panel. The boards 391 and 414 are respectively disposed in recesses 422e and 422f, FIG. 48, in the panel plate 422 and thus in the control panel.

Tripping Latch

Some of the torpedoes to be fired from the torpedo tube of this invention require mechanical starting. On such torpedoes there is a starting lever 530 indicated in dotted lines in FIG. 88. Lever 530 projects from the tapered tail section of the torpedo and must be tripped to start the torpedo driving mechanism. Just forward of the control panel on top of the tube 100 is mounted the tripping latch mechanism for tripping said lever 530.

Figure 86:
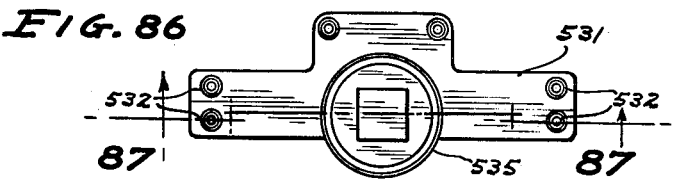
FIG. 86 is a top plan view of a tripping latch mechanism.
Figure 87:
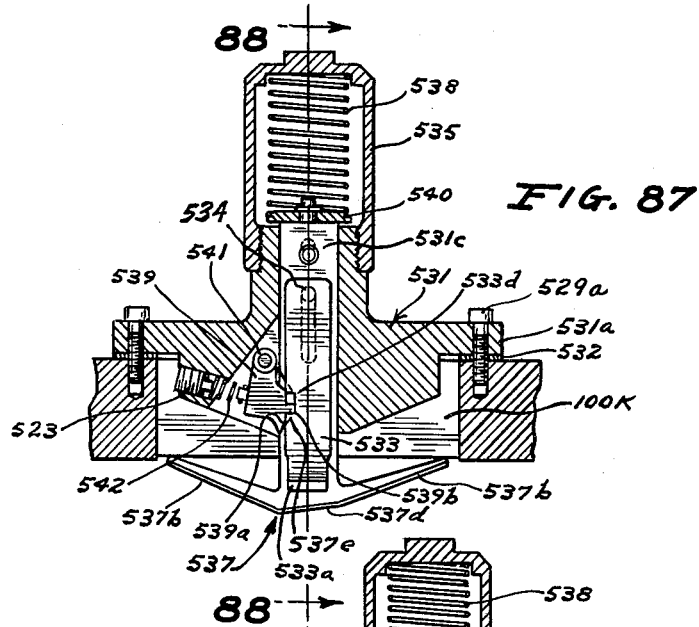
FIG. 87 is a vertical section taken on line 87—87 of FIG. 86.
Figure 88:
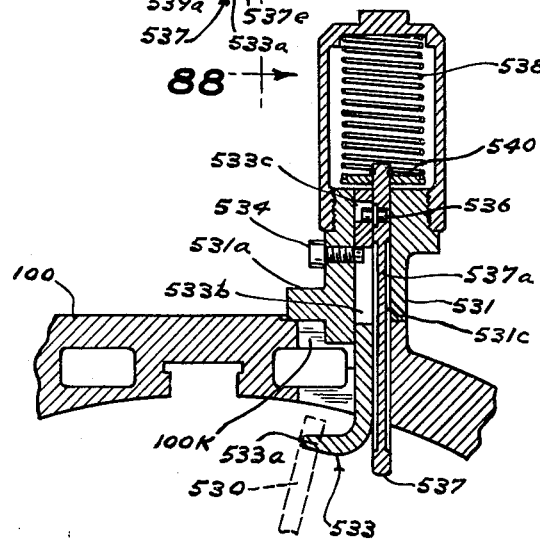
FIG. 88 is a vertical section taken on line 88—88 of FIG. 87, as indicated by the arrows.

As shown in FIGS. 86–88, said mechanism comprises a body member or block 531 having a flange 531a engaging a shim 532 resting on a flat surface on the top of tube 100. Screws 529a pass through holes in flange 531a and shim 532 into tube 100 and secure said block and shim in place. Shim 532 is used to accurately locate the parts. Block 531 has a portion 531b extending into an opening 100k in tube 100. A tripping latch 533 is provided disposed in a passage 531c in block 531, in opening 100k and the inside of tube 100. Latch 533 has a laterally extending terminal portion 533a disposed in the path of lever 530 as the latter moves through tube 100 with the torpedo. Latch 533 has therein a slot 533b into which extends the end of a stud 534 secured in block 531. Latch 533 also has thereon a shorter slot 533c. A pin 536 is disposed in slot 533c, which pin is carried in a lifting latching 537. Latch 537 has a shank portion 537a disposed alongside of tripping latch 533. Latch 537 has oppositely extending arms 537b having rectilinear bottom surfaces converging downwardly and joined by a third rectilinear surface 537d disposed at a slight angle to said arm surfaces. A cylindrical cover 535 is threaded on the top of block 531 and a compression coiled spring 538 is disposed in said cover, the same having one end engaging the top of said cover and having its other end engaging a plate 540 secured to the upper end of shank 537a. Shank 537a has a notch 537e in one side thereof adapted to receive the projection 539a of a latch 539 pivoted on a pin 541 and urged to swing toward shank 537a by a coiled compression spring 542 having one end encircling a projection on latch 539 and having its other end encircling the end of a stud 523 secured in block 531. Notch 537e has upwardly inclined sides and projection 539a is beveled to have similarly inclined sides. Latch 539 has a right-angled portion 539b arranged to enter a slot 533d in tripping latch 533 and prevent upward movement of the latter.

In operation, the lifting latch is normally held in the position shown by latch 539. Tripping latch 533 is also held in the position shown by latch 539. As lever 530 moves in tube 100 it engages portion 533a of tripping latch 533 and is swung downwardly through a substantial arc until it can pass said portion. This movement of lever 530 starts the driving mechanism of the torpedo. When a torpedo is being loaded into tube 100 and when a shroud ring on some torpedoes is to pass the tripping mechanism, latches 533 and 537 must be moved out of the way. When the torpedo or said shroud contacts latch 537 the latter is forced upwardly and the lower side of notch 533e in shank 537a cams latch portion 539a out of notch 537e. This movement of latch 539 also moves portion 539b from slot 533d and releases tripping latch 533. In the upward movement of latch 537, pin 536 then lifts latch 533 and both latches 533 and 537 move upward against the pressure of spring 538. Said latches 533 and 537 are thus moved upward into opening 100k and out of the way of said torpedo and out of the way of its shroud ring. When said torpedo or shroud is past the tripping latch mechanism, latches 533 and 537 will again be moved to the position shown by spring 538. Stud 534 limits the downward movement of latches 533 and 537.

In operation, the first thing done as a rule is to charge the tube with air. The control panel should be inspected to see that the control elements are properly positioned. The air valve 428 should be turned to its "On" position, the selector valve 468 should be turned to its "Safe" position, the firing 475 should be turned to its "Remote" position and the breech door knob 177 should be turned to its "Unlocked" position. The hose from the ship's high pressure line will be connected to the adapter block 553. (See FIG. 37.) The control valve 551 may now be opened and air from the ship's high pressure line will flow through said adapter block 553. The normal firing pressure for the torpedo tube is 600 p.s.i. The pressure gauge 443 should be watched to see that excessive pressure is not attained which might injure said gauge which in practice has had a 1200 lbs. per square inch limit. The rear latch or stop 334 must be raised so that the torpedo can be pushed into the tube 100 past said stop and into engagement with the front stop 316. The selector valve 468 in practice has been releasable for rotation at 500 lbs. pressure per square inch, so that such degree pressure is necessary to lift the rear latch. When the selector valve 468 is turned to its "Load" position, air pressure will be transmitted from the flask channels in tube 100 through the passages in the valve plate indicated by conduit 511, in FIG. 90, to air valve 428, through conduit 569 to the selector valve 468 and through conduit 543 to the end of cylinder 302n of the stop mechanism. Piston 365 will be moved to the right, as seen in FIGS. 91 and 41, and lever 328 will be oscillated and will pull upward on link 335 and lift rear latch 334. Latch 334 can be lifted manually by inserting a wrench in boss 302c (see FIGS. 44 and 92) and into the end of shaft 329 and turning shaft 329 counterclockwise. This will swing lever 328 and raise link 335 and latch 334. Conduit 543 leads to load valve 418 but this valve is closed as the breech door is in unlocked position and arm 174 is swung away from the load and ready valves permitting them to close. If the breech door valve is in locked position, spring 162 causes arm 174 to force back the plungers of the load and ready valves. Air would then be exhausted from conduit 543 through load valve 418 into a conduit 542 and through a conduit 570 and the bleeder and separator unit 520. This exhaust arrangement is provided so that the rear latch 334 may not be raised unless the breech door is unlocked, in which case the breech door would normally have been removed for loading the torpedo. If the breech door were on the tube and it were possible to raise the rear latch, the ship's motion might cause the torpedo to slide back against the door and damage the door and torpedo. When the tube has been charged and the rear latch raised, the tube is ready to be loaded. After the torpedo is loaded with its guide stud against the front latch, the selector valve may be returned to "Safe" position. This connects the rear latch pressure line, conduit 543, to an exhaust line through conduits 578 and 569, through the selector valve 468 and conduit 570 to unit 520. Spring 343 (see FIG. 41) then acts to move lever 328 and link 335 to move rear latch 334 down into keyway 100a1 behind the torpedo guide stud so that the torpedo is now held from longitudinal movement.

Figure 89:
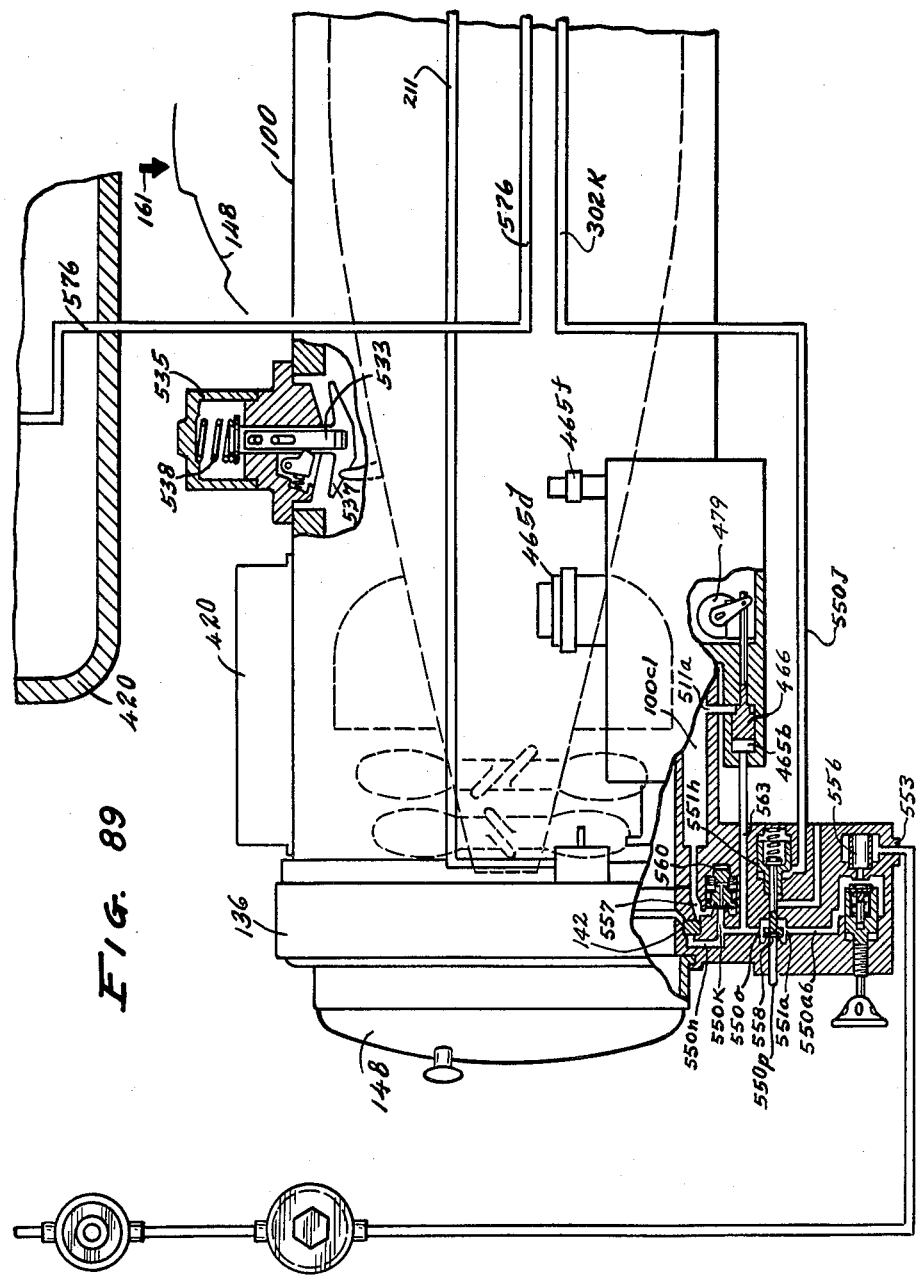
FIGS. 89, 90 and 91 show portions of a continuous schematic drawing used in connection with the description of the operation of the torpedo tube.

Referring to the schematic diagram in FIG. 89, it will be seen that the air passes from the adapter block 553 to and through filter 556 and into passage 550a6, into chamber 550o, around pilot valve 558, into a passage 550k and to the rear of the firing ring 142. Referring to FIGS. 78, 79 and 81, the air actually passes from block 553, through filter 556, through a passage 550d to chamber 551e, through passages 550a6, and 550k, through check valve 560, and passages 550aa and 136n to manifold chamber 134a and thence into the flask chambers 100c1 and consequently a thrust is exerted against the front side of the firing ring 142. Flask pressure is also delivered to the back side of the firing ring 142 directly through conduits 550a6, 550a2, and 136p to chamber 136a in which firing ring 142 is disposed. The area of the rear side of said ring is much greater than that of its front side so that the ring is pressed forwardly to seal the orifice 136c. Said orifice is sealed between sealing element 146 and the upper O-ring 143. (See FIG. 24.) Passage 550aa and passage 550a6 and thus flask pressure also extend to check valve 551h. The check valve 551h is provided to prevent inadvertent firing of the torpedo should there be no pressure or low pressure in the hose connected to adapter 553 when there is pressure on both sides of firing ring 142 and the charging valve 551 is opened. In such case with a torpedo in the tube, the air at the rear of the firing ring 142 would exhaust through conduit 550a6, and through filter 556 and into said hose line. This would permit the firing ring 142 to move rearwardly which would cause firing of the tube. Check valve 551h prevents air from passing to the filter until high pressure is present in the charging hose.

Flask air under pressure also passes through conduit 563 to cylinder 465b and moves piston 466 and rotates switch 479. There is a passage 511a from one end of cylinder 465b to a flask channel 100c1 which in practice is formed by the transfer sleeve 471.

Relief valve 452 which is located in the control panel is set at 750 plus or minus 50 lbs. per square inch. A connection between the flask and the control panel is shown as conduit 511 in FIG. 90. This is formed by the connector sleeve 437 shown in FIG. 47. In its flow through the valve plate passages the air under pressure acts on said relief valve 452 and if this pressure exceeds the relief valve setting, the relief valve plunger 452c1 and valve 452c (see FIG. 55) will be lifted and air escapes to atmosphere through a hole (not shown) in the side of the panel.

Figure 90:
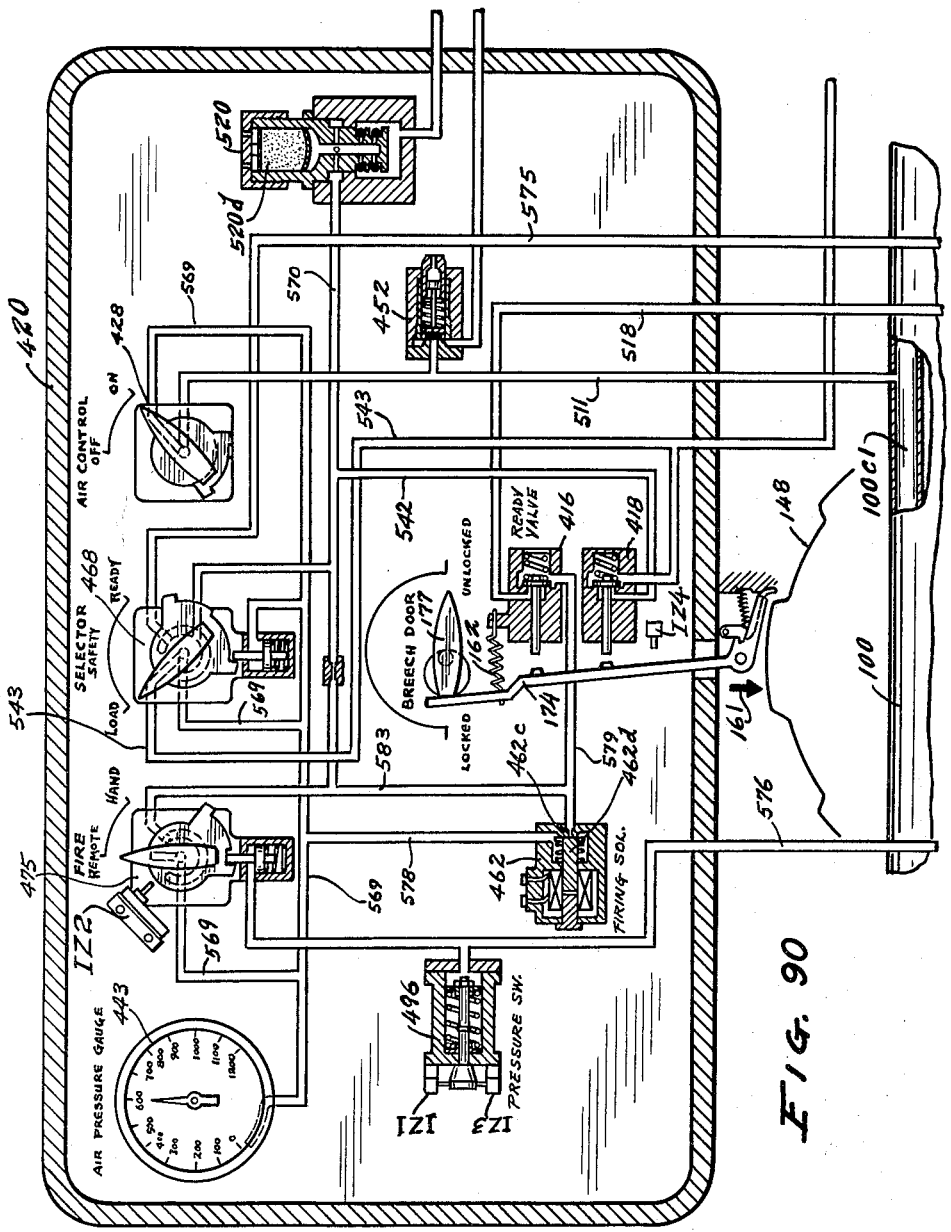
Figure 91:
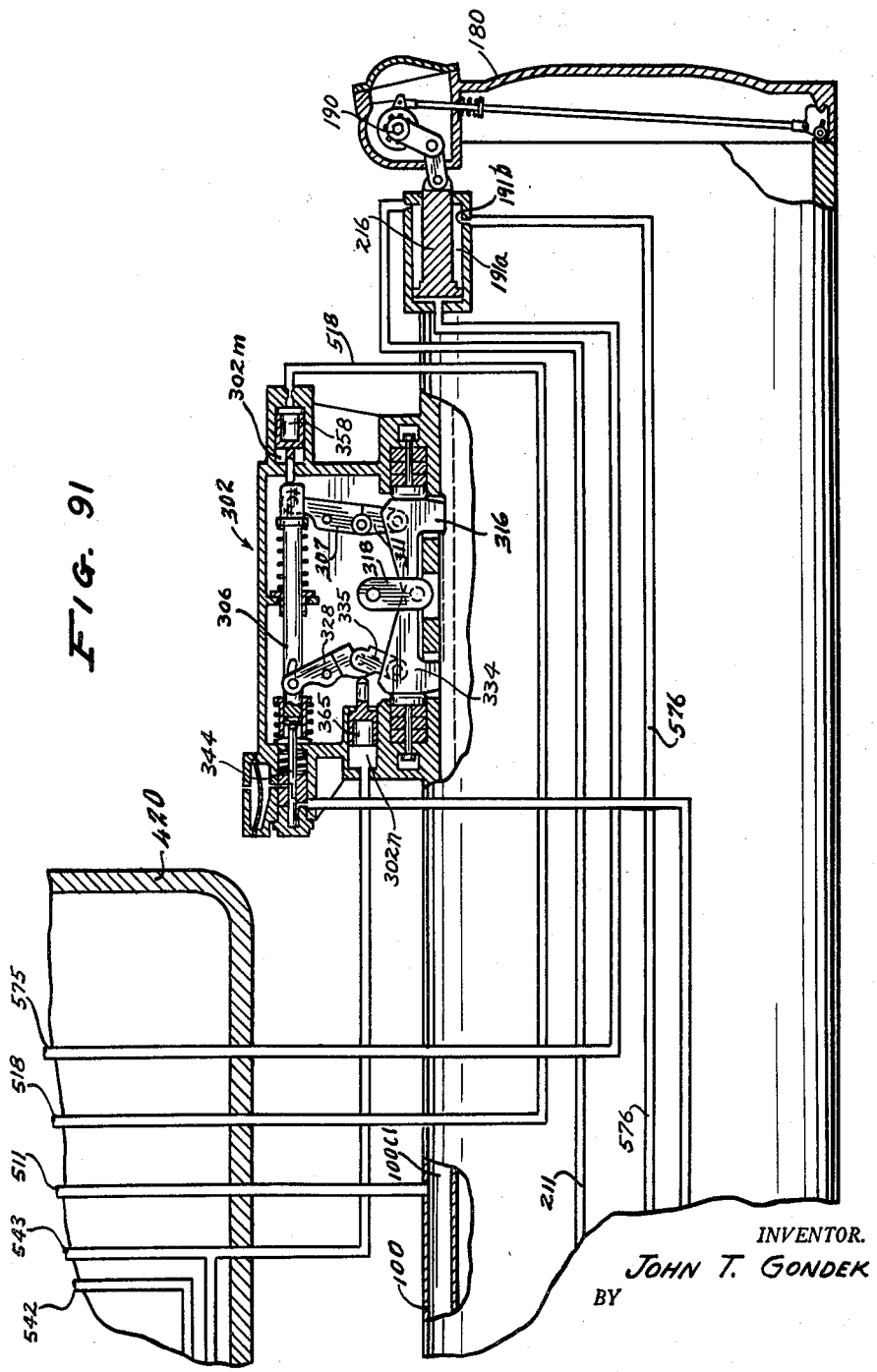

When the air valve is in its "On" position, as shown in FIG. 90, air pressure is transmitted to the firing solenoid 462, the pressure gauge 443, the firing valve 475 and the selector valve 468. Gauge 443 indicates the flask pressure. The air reaching the firing solenoid is stopped as valve member 462d is held against seat 462c by spring 462f. (See FIG. 58.) Air reaching the firing valve is likewise stopped and cannot flow through said valve until its position is changed.

The tube is now loaded. It may be put in "Ready" condition for firing by turning the breech door control knob 177 to its "Locked" position and the selector valve knob 467 to its "Ready" position. (See FIG. 45.)

With the breech door 148 on the tube 100 and rotated clockwise so that the indicating arrow on the locking mechanism cover points to the "Ready" position zone, the breech door knob 177 may be turned to the "Locked" position. As previously explained and shown in FIG. 22, turning of this hand knob may be accomplished at any time but it is only possible to unlatch pawl 155 when the door is on the tube and rotated against its stop 149 since the lever 156 must be raised by the edge of the door to unlatch the pawl 155 so that said pawl may be lowered. Turning of the knob 177 to "Locked" under the above conditions therefore lowers the pawl 155 behind the edge of the door lip 148b2 so that the door may not be rotated or removed until the control knob 177 is turned to "Unlocked" position. The indicator plate 153 on the door shown in FIG. 45 has been provided to assure that the installer will turn the door against the stop 149 so that the pawl 155 may drop down into the proper position. If the door were not turned far enough to allow said pawl to drop down, the knob 177 could still be turned to "Locked" because of relieving instead of increasing pressure against the operating arm 174 by the eccentric cam 168a; the arm 174, however, would remain in the "Unlocked" position. If it were not for an electrical interlock in the ready light circuit provided by the microswitch IZ4, which is closed when the arm 174 is actually in the "Locked" position, the remote control room personnel would observe that the ready light was on after only the muzzle door had been opened and would proceed to fire the torpedo tube without success because the ready valve supposedly operated by the breech door operating arm 174 would still be closed. As seen in FIG. 90, the air lines from the solenoid and the firing valve merge and pass through the ready valve, when it is open, to perform the function of firing the tube, as will be explained later. It is necessary, therefore, that the breech door actually be locked with the pawl arm 155a in place behind the door surface 148b2 or the ready valve 416 will not be open to permit firing. To prevent such a mishap, the interlock switch IZ4 and the indicator plate 153 and arrow are provided to assure proper locking of the breech door so that the firing of the tube may be properly executed. As above stated, air pressure is on both sides of firing ring 142. The small passage 560b is provided in check valve 560 so that if there is any leakage from pilot valve 558, check valve 551h, valve 466, or from the rear of firing ring 142, air can pass from chamber 134a, through passages 136n and 550aa, chamber 564a, and passages 560b, 550k and 136m to the rear of ring 142 to compensate for said leakage. The small size of passage 560b does not interfere with firing of the tube in the normal manner.

With the selector valve in its "Ready" position, flask pressure is delivered through conduit 511 (see schematic diagram in FIG. 90) to the air control valve. Said conduit comprises a transfer sleeve and a passage formed by a groove in the valve plate 424. Air pressure is transmitted from said air control through conduit 569 to the selector valve. Conduit 569 comprises a passage formed by a groove in valve plate 424. Air pressure is transmitted from selector valve 468 through a conduit 575 to one end of cylinder 191a of the muzzle door mechanism. Conduit 575 comprises a groove in valve plate 424, a transfer sleeve to one of the passages 110a in one of the extrusions 110 which extends to a passage in the muzzle door bracket casting 191, and to cylinder 191a. Piston 216 is moved to the right, as seen in FIGS. 34 and 91, which as described rotates shaft 190 and opens the muzzle door 186. When piston 216 completes its stroke a small port 191b is opened and air pressure is transmitted through conduit 576 to one side of plunger 475e of the firing valve 475 (see FIG. 64) and said plunger is moved to release member 475m of said valve. (See FIG. 65.) Firing valve 475 can then be turned to firing position and will operate switch IZ2.

Conduit 576 in the actual structure comprises a passage 191d in bracket casting 191, a transfer sleeve, a passage 110a in one extrusion 110, and a passage in a groove of the valve plate 424 to valve 475 and to pressure switch 496. Switch IZ1 is in series with the firing solenoid 462. With switch IZ4 closed, which switch is closed when the breech door is in locked position and arm 174 is in the position shown in FIG. 25, and switch IZ3 closed by pressure switch 476, the ready light is turned on indicating ready for firing. Arm 174 is then engaging load valve 416 and ready valve 418 and holding said valves open. The tube is now ready for firing.

The tube can be fired by either hand or remote firing, or in other words by an operator adjacent the tube or by one remote from the tube. In remote firing the firing valve is left in its Remote position. The firing switch in the control room (not shown) is now closed and in practice 115 volt 60 cycle current is applied to the above mentioned circuit including the firing solenoid 462. (See FIG. 90.) Said solenoid is energized thus connecting conduit 578 leading from conduit 569 and a conduit 579 extending from solenoid 462 to the ready valve 416 now open. The air pressure is transmitted from the ready valve through a conduit 518 to one end of cylinder 302m and latch-raising piston 358 is moved to the left, as seen in FIGS. 41 and 91, thus moving shaft 306 to the left. As above described, this will raise stops or latches 316 and 334 so that they are out of the path of the torpedo. When shaft 306 is moved to the left, plunger 344 is also moved and oil is forced from cylinder 347b through conduit 302k to the chamber 550h adjacent pilot valve 558. (See FIG. 79.) Member 558i is moved to the right, as seen in FIG. 79, and moves valve plunger 558a to the right, thus opening the pilot valve. It will be seen that oil can be forced from chamber 347b through groove 347c, passage 302j and conduit 302k even after the end of shaft 344 has passed passage 302i.

As shown in FIGS. 79 and 89, opening of the pilot valve 558 connects passages 550g to passage 550p and to the atmosphere. As shown in FIG. 79, when member 558i is forced to the right by oil pressure in conduits 302k and 550j against the pressure of spring 559, pilot valve 558 is opened and air is exhausted to atmosphere through passage 550g. This exhausts air from passage 550a6 and from passage 550k and from passages 136m and chamber 136a. Pressure at the rear of firing ring 142 is thus relieved and said ring snaps rearwardly due to the flask pressure on its front side and the air pressure from all of the flask channels 100c1 is put in communication with the circumferential discharge orifice 136c so said pressure is transmitted into tube 100 behind the torpedo. The torpedo which constitutes a free moving piston, is thus moved out of the tube. While the sequence of operations appears long in its description, the time elapsing between the closing of the firing switch in the control room and the opening of pilot valve 558 in practice is .08 of a second.

If the torpedo being fired requires mechanical starting, the tripping lever of the torpedo will contact the tripping latch 533 extending downwardly into tube 100 after 0.75 of an inch travel of the torpedo. Since the latch 533 is held stationary, said lever is moved and the torpedo motor starting mechanism actuated. If said torpedo has a shroud ring, said ring will engage the lifting latch 537 and the two latches will be raised as above explained to be clear of the torpedo.

As later explained, the firing circuit is closed to start the torpedo motors when the pilot valve opens. After approximately 1.4 feet of travel of the torpedo the control cable 185 is severed.

As previously set forth, the ship's 100 lb. air line is connected to passage 191f which opens into the end of cylinder 191a adjacent the muzzle door. There is thus always 100 lbs. of pressure tending to move piston 216 to the left, as seen in FIG. 34 and thus close door 186. The muzzle door would probably always close by gravity after the opening pressure was exhausted after firing. However to assure closing under any condition of wind, waves or ship's motion, the 100 p.s.i. pressure line is provided to positively close said door. The opening 600 p.s.i. pressure of course readily overcomes the 100 p.s.i. pressure when the door is opened.

Firing the torpedo from a remote station was described above. If it is desired or becomes necessary the torpedo may be fired locally. With the tube ready for firing, the firing valve 475 will then be turned to its "Hand" position. As shown in FIGS. 64 and 90, air pressure can then be transmitted from said valve through a conduit 583 to conduit 579, through the ready valve and through conduit 518 to the stop mechanism latch cylinder 302m to move the latch-raising piston 358. The remainder of the cycle is the same as described for remote firing. No electrical operation is involved in hand firing except that the firing valve 475 operates switches IZ2A and IZ2B by cam 475m4, as shown in FIG. 64.

As stated, when the tube 100 was charged, switch 479 was moved to ready position. Piston 466 has flask pressure on each side thereof until the pilot valve 558 opens. The rear side is of greater area than the front side and the valve remains in its ready position until the pressure on its rear side is exhausted to atmosphere through conduits 563 and 550p. (See FIGS. 79 and 89. It then moves to fire position. When switch 479 moves to fire position, as above stated, it disconnects all circuits except the firing circuit which is used to start the torpedo's motors through switch IZ2. By opening said circuits, short-circuiting of the same is prevented when the cable 185 is cut.

It may be stated that with a 4000 lb. torpedo and 600 p.s.i. flask pressure, the average maximum tube pressure is 75 p.s.i. resulting in an average muzzle velocity of the torpedo of 55 feet per second.

Referring to the separator and bleeder unit 520, all of the exhaust lines from the various components in the control panel mounted on the valve plate feed into the inlet ports of the separator and bleeder unit, shown in FIG. 75. The entering exhaust air will flow upward through an aluminum foil separator (to remove possible foreign matter) and thence into the inside of the sealed control panel. The lower portion of this unit extends through the panel plate 422 and is far enough to the side of the panel to clear the edge of the flat on the top barrel extrusion. The deicing and insulating casing installed on the torpedo tube will provide exhaust to atmosphere through the laced connection at its bottom.

Referring again to pressure switch 496, when the piston 216 of the muzzle door completes its stroke, a small air port is uncovered in front of the piston face and the activating pressure is transmitted through another integrally cast tube, transfer sleeve, and air line in an insert extrusion 110 back to the control panel. This return pressure line is connected to pressure switch 496 in the panel as shown in FIG. 89. When pressure develops under the Teflon plunger 496g (low friction material) and causes it to rise, the tapered end 496h of the plunger allows the two microswitches IZ1 and IZ3 to be closed. The switch IZ1 is in series with the firing solenoid located in the panel so that when the muzzle door is open and IZ1 is therefore closed, the firing solenoid 462 may be actuated when the firing key is operated in the control room. The location of IZ1 and the other microswitch IZ2 in the panel is shown on the diagram included as FIGURE 90. The switch IZ3 and the switch IZ4, which is operated by the breech door locking mechanism, are connected in the ready light circuit which is located in a remote control room. When the muzzle door is fully open permitting operation of the pressure switch which closes IZ3, and when the breech door is actually locked in place so that IZ4 is closed, the ready light in the control room will turn on to indicate readiness for firing of the tube.

The return pressure line from the muzzle door mechanism also unlocks the rotary valve member 475m of the firing valve 475 by raising a Teflon plunger 468e1 that unlatches the trigger shown in FIGURE 64. When the firing valve is unlocked, it may be turned to the Hand position manually if it is desired to fire the tube in this manner. The return or indicator pressure line from the muzzle door unit then performs the above two functions, which permit firing of the tube either remotely or locally only when the conditions are safe; that is, the breech door is locked and the muzzle door is fully open.

Referring to the stop mechanism, FIGS. 41 and 91, in addition to raising both latches out of the tube keyway through its motion, the transfer shaft 306 also forces the plunger 344 to move into a hydraulic cylinder 347b. This plunger has a shallow slot 344a milled in its top left end, as shown in FIG. 41, which permits displacement of oil through the orifice 302f and into the expansion chamber 302g during the first part of the plunger's stroke. After the slot in the plunger 344 has passed the point of connection with the orifice 302f so that oil may not be transferred to the expansion chamber, enough pressure is built up in the cylinder to force the sleeve 349 back against pressure of spring 348 until sleeve 349 seats against the end of the housing 302. During the first part of the motion of 344, therefore, oil is displaced and then member 349 is displaced which prevents any appreciable pressure from developing within the chamber 347b. This arrangement prevents the O-ring 353 from being extruded from its groove and provides a slight time delay to assure that both latches 316 and 334 will be fully raised out of the barrel keyway before the torpedo starts its motion. After the above has occurred, the plunger 344 continues its stroke displacing the oil in 347b, which is one end of a long oil column, the other end of which is connected to passage 550j and chamber 550h as above described, to open the pilot valve 558 in the firing valve block.

From the above description it will be seen that I have produced a very novel structure of tube and a novel method of making the same. The tube has space within its body or walls for the storage of air under pressure which is used to operate the various components. The necessity for outside tanks and connections to the tube therefrom is thus eliminated. The tube is provided with a breech door with novel means for manipulating and locking the same. The tube is also provided with a muzzle door with novel means for controlling the opening and closing thereof. The tube is provided with a control panel secured thereto in a convenient way for operation, said panel containing controls for the various components. Said control panel also includes a panel plate and a valve plate of novel construction and arranged in a novel way for transmitting fluid under pressure from the storage space in the tube to the various components. Another novel feature is that the various components, valves, etc. are in casings secured directly to the tube so that no separate casings are necessary spaced from the tube. The structure comprises the above and other novel features.

It will of course be understood that various changes may be made in the form, details, arrangement and proportions of the device and in the steps and sequence of steps of the method without departing from the scope of applicant's invention, which, generally stated, consists in a method and device capable of carrying out the objects above set forth, such as disclosed and defined in the appended claims.

What is claimed is:

1. A torpedo tube having in combination, an elongated tube adapted to receive a torpedo, said tube having an open breech end, a door for closing said end movable to a closed locking position, a pawl for locking said door in closed position, a shaft secured to said pawl for moving the same, a control shaft, an arm secured to said control shaft, means connected to said control shaft for moving said control shaft, said first mentioned shaft and said arm in one direction to move said pawl, and a spring for moving said arm and first mentioned shaft in the opposite direction for moving said pawl.

2. The structure set forth in claim 1, and means connecting said shafts affording some transverse movement of one of said shafts relative to the other.

3. The structure set forth in claim 1, a pair of valves for controlling air under pressure in the operation of said tube disposed to be opened by said arm when moved to position with said pawl in door locking position and having closing means adapted to operate when said arm is moved to position with said pawl in unlocking position.

4. A torpedo tube having in combination, an elongated tube adapted to receive a torpedo, a door for closing the muzzle end of said tube, said door being of substantially flat cup-shape, an electrical heating device in said door comprising cast-in conduits extending about the periphery of said door at the inner side of said door, and a microswitch for operating said heater.

5. A torpedo tube having in combination, an elongated tube adapted to receive a torpedo, a door for closing the muzzle end of said tube, said door being of substantially flat cup-shape, an electrical heating device in said door comprising cast-in conduits extending some distance on the inner side of said door, a flange on the inner side of said door forming a chamber, said conduits connecting with said chamber, a terminal board in said chamber, a plurality of microswitches in said chamber for controlling said heating device, and electrical conductors for said switches in said conduits connected to said board.

6. The structure set forth in claim 5, a hollow shaft for operating said door, a control panel, wiring for said heater passing from said terminal board, through one of said conduits, to the inside of said shaft, out of end of said shaft and to said control panel.

7. A torpedo tube having in combination, a tube having an interior substantially cylindrical surface, said surface having a slot extending longitudinally therein adapted to receive a member carried by a torpedo, a stop member movable into said slot to prevent longitudinal movement of said torpedo in said tube, and means for moving said stop into and out of said slot.

8. A torpedo tube having in combination, a tube having an interior substantially cylindrical surface, said surface having a slot extending longitudinally therein adapted to receive a member carried by a torpedo, a pair of stops spaced longitudinally of said tube, and respectively movable into said slot so as to be engaged by said member to prevent longitudinal movement of said torpedo in both directions, and means for moving said stops in and out of said slot.

9. The structure set forth in claim 8, and buffer means engaged by said stops respectively.

10. A torpedo tube having in combination, an elongated tube adapted to receive a torpedo, said torpedo having a projection extending from its periphery, said tube having a slot extending longitudinally thereof in its interior wall, a stop member pivoted on said tube and disposed to have a portion thereof move into said slot so as to be engaged by said projection and form a stop for said torpedo, a link pivoted to said member, a lever pivoted to said link and forming therewith a toggle, and means engaging one of said last two mentioned elements to swing said link and lever to straighten said toggle and move said portion of said stop member into said slot.

11. A torpedo tube having in combination, an elongated tube adapted to receive a torpedo, said torpedo having a projection extending from its periphery, said tube having a slot extending longitudinally thereof in its interior wall in which said projection is movable, a stop member pivoted on said tube and disposed to have a portion thereof move into said slot so as to be engaged by said projection and form a stop for said torpedo, a link pivoted to said member, a lever pivoted to said link and forming therewith a toggle, and means engaging one of said last two mentioned elements to swing said link and lever to break said toggle and move said stop out of said slot.

12. The structure set forth in claim 11, said last mentioned means comprising a cylinder, a piston in said cylinder, and means for supplying fluid under pressure to said cylinder to move said piston and a member moved by said piston for engaging one of said last two mentioned elements.

13. A torpedo tube having in combination, an elongated tube adapted to receive a torpedo, said torpedo having a projection extending from its periphery, said tube having a slot extending longitudinally thereof in its interior wall into which said projection extends, a pivoted stop member mounted on said tube and having a portion disposed to swing into said slot, a second pivoted stop member mounted on said tube in spaced relation from said first mentioned member and having a portion arranged to swing into said slot, and means for simultaneously swinging said pivoted members to cause said portions to move into and out of said slot.

14. A torpedo tube having in combination, an elongated tube adapted to receive a torpedo, said torpedo having a projection extending from its periphery, said tube having a slot extending longitudinally thereof in its interior wall into which said projection extends, a stop member having a portion adapted to enter said slot and form a stop for said projection and torpedo, said member being pivotally mounted on said tube and movable to move said portion into and out of said slot, means for moving said member comprising a lever pivoted at one end, a second stop member mounted on said tube and spaced from said first mentioned stop member longitudinally of said tube, and having a portion adapted to enter said slot and form a stop for said projection and torpedo, means for moving said second member comprising a lever pivoted at one end, a shaft movable longitudinally of said tube and to which said levers are pivoted for moving said members, said shaft having an opening therein for the pivot connecting one of said levers thereto whereby said pivot and the one of said members connected therewith may have movement independently of said other member so as to move said portion thereof into said slot independently of said other portion.

15. A torpedo tube having in combination, an elongated tube adapted to receive a torpedo, said torpedo having a projection extending from its periphery, said tube having a slot extending longitudinally thereof in its interior wall in which said projection is movable, a stop member pivotally connected to said tube and having a portion arranged to move into said slot, a link pivoted to another portion of said member, a lever pivoted to said link and forming therewith a toggle, a second member pivotally connected to said tube and having a portion adapted to enter said slot, a second link pivoted to said second member, a second lever pivoted to said second link and forming therewith a second toggle, and means for moving one of said levers to straighten the toggle formed thereby and to move said second lever to straighten the toggle formed thereby and then move said first mentioned member so that portions of both said second and first members are moved into said slot.

16. A torpedo tube having in combination, an elongated tube adapted to receive a torpedo, said torpedo having a projection extending from its periphery, said tube having a slot extending longitudinally thereof in its interior wall adapted to receive said projection, a stop member mounted on said tube and having a portion adapted to be disposed in said slot and form a stop for said projection and torpedo and a buffer means arranged to be engaged by said stop member when the latter is engaged by said projection on said torpedo.

17. A torpedo tube having in combination, an elongated tube adapted to receive a torpedo, said torpedo having a projection extending from its periphery, said tube having a slot extending longitudinally thereof in its interior wall into which said projection extends, a stop member mounted on said tube and having a portion adapted to be disposed in said slot and form a stop for said projection and torpedo, and a buffer means arranged to be engaged by said stop member including a plurality of pads spaced longitudinally of said tube and rigid members between said pads.

18. A torpedo tube having in combination, an elongated tube adapted to receive a torpedo, said tube having therein a space for storing air under pressure for operating various components of said tube, a valve plate for transmitting said air having a plurality of grooves on one side thereof, and openings from said grooves to the other side of said plate, said openings and grooves forming passages for said air, and means connecting said space to said grooves.

19. The structure set forth in claim 18, said grooves having a covering for their open sides whereby clear passages are formed by said grooves under said covering constituting a printed circuit.

20. The structure set forth in claim 18, said means comprising a panel plate overlaid by said valve plate and having openings therethrough connected to said space and alining with and communicating with said openings in said valve plate.

21. A torpedo tube having in combination, an elongated tube adapted to receive a torpedo, said tube having a chamber in the wall thereof adapted to contain fluid under pressure, a panel plate having openings therethrough, means connecting said chamber to certain of said openings, a valve plate having a plurality of grooves therein at one side forming channels and holes extending from said grooves to the opposite side of said valve plate, said valve plate overlying said panel plate, said grooves having portions alined with said openings and said holes communicating respectively with components to be operated by said fluid under pressure.

22. A torpedo tube having in combination, an elongated tube adapted to receive a torpedo, said tube having a chamber in the wall thereof adapted to contain fluid under pressure, an air valve, a valve plate having grooves in one side and holes extending from said grooves respectively to the other side of said plate, means connecting said chamber to one of said grooves, one of said holes communicating with a port of said air valve for connecting it to said groove, another port of said valve communicating with said groove and with a component operated by said fluid under pressure.

23. A torpedo tube having in combination, an elongated tube having a bore adapted to receive a torpedo, a plate abutting the breech end of said tube and having a similar bore axially alined with said bore, said plate having an annular chamber therein opening at the breech end thereof, a housing abutting said plate and having a similar bore axially aligned with said aforementioned bores, said housing having a second annular chamber therein open at its forward end communicating with said annular chamber in said plate, said plate and housing having an orifice therebetween communicating with said bore in said tube, a firing ring in said chamber in said housing and movable forwardly and rearwardly therein, a sealing means between said plate and housing disposed radially outward of said chambers therein, a sealing means between said ring and plate at the forward side of said ring, a sealing means between the top of said ring and housing, and a sealing means between the radially outward side of said ring and housing whereby when said ring is moved rearwardly, air under pressure can move from said chamber in said plate into said orifice and into said tube.

24. The structure set forth in claim 23, said tube having a tubular chamber therein for containing air under pressure, a passage in said plate from said tubular chamber to said chamber in said plate whereby when said ring is moved rearwardly said air can pass from said tubular chamber to said chamber in said plate and through said orifice and into said tube.

25. A torpedo tube having in combination, an elongated tube adapted to receive a torpedo, members forming an orifice communicating with said tube at the breech end thereof for supplying air under pressure thereto, a member for controlling said passage movable from a position preventing said air entering said passage to a position admitting said air thereto, said member having one side of greater area than the other, means for supplying air under pressure to both sides of said member whereby it will be held in said first mentioned position by the air at said one side thereof, and means for exhausting said air at said one side to the atmosphere whereby said air at said other side will move said member to said last mentioned position whereby air under pressure will be delivered to said passage and tube.

26. The structure set forth in claim 25, said tube having a chamber in the wall thereof for receiving and storing air under pressure and a passage leading from said chamber to said first mentioned passage.

27. A torpedo tube having in combination, an elongated tube adapted to receive a torpedo, said tube having spaced chambers extending longitudinally thereof in its wall for the storage of air under pressure, a manifold plate disposed against one end of said tube and having a similar bore therein alined with said bore, spaced passages in said plate alined respectively with said chambers and an annular chamber communicating with said passages and opening at the side of said plate opposite said tube.

28. The structure set forth in claim 27, and a housing having a flat side engaging the outer side of said plate and having a bore similar to said bores and alined therewith, an annular chamber therein arranged to communicate with said annular chamber, and a firing ring disposed in said last mentioned annular chamber.

29. The structure set forth in claim 27, said plate and housing having an annular orifice therebetween communicating with the bores of said housing, plate and tube, and means for sealing said orifice.

30. The structure set forth in claim 27, said plate and housing having an annular orifice therebetween communicating with the bores of said housing, plate and tube, said firing ring having means thereon for sealing said orifice.

31. A torepdo tube having in combination, an elongated tube having a bore adapted to receive a torpedo, said tube having a chamber in the wall thereof for the storage of air under pressure, a member adapted to be moved for admitting air from said chamber to said bore to fire a torpedo, means connected to a source of air under pressure for charging said chamber, a check valve, a passage communicating with said valve to which air under pressure is delivered by said means, a passage extending from said last mentioned passage to said chamber and to one side of said member, said valve being opened by air in said first mentioned passage and a passage leading from the other side of said valve to the other side of said member.

32. A torpedo tube having in combination, an elongated tube adapted to receive a torpedo, said tube having a chamber in its wall for the storage of air under pressure, said tube comprising a plurality of operative components, an air control valve having a position in which it supplies air to certain of said components and a selector valve and a second position in which said air is shut off, and a conduit connecting said chamber to said valve.

33. The structure set forth in claim 32, a selector valve, a conduit connecting said valves, said selector valve having three positions, a position in which the supply of air is shut off, a second position in which said selector valve receives air from said air valve and distributes air to certain of said components to place the same in positions for firing said tube, and a third position in which it distributes air to certain of said components to place said tube in condition for loading.

34. A torpedo tube having in combination, an elongated tube adapted to receive a torpedo, said tube having a chamber in its wall for the storage of air under pressure, a valve having a ready position, a muzzle door for said tube, a door opening mechanism for said door, means for supplying air under pressure from said valve when in ready position to said mechanism, and means for supplying air under pressure to said valve.

35. A torpedo tube having in combination, an elongated tube adapted to receive a torpedo, a valve, a rear stop for said torpedo, means for moving said stop to inoperative position, a conduit extending to said means for conducting fluid under pressure thereto for actuating the same, a second conduit extending from said first mentioned conduit to said valve, a third conduit extending from an exhaust means to said valve, said valve acting to connect said second and third conduits when in open position, means for opening said valve when said breech door is in locked position, whereby said second conduit will be connected to said exhaust means when said breech door is in locked position and cannot supply air to said means for moving said stop to inoperative position.

References Cited in the file of this patent

UNITED STATES PATENTS

| | | |
|---|---|---|
| 470,286 | Canet | Mar. 8, 1892 |
| 1,327,614 | Grieshaber | Jan. 13, 1920 |
| 1,525,359 | Bjorklund | Feb. 3, 1925 |
| 1,656,249 | Techel | Jan. 17, 1928 |
| 1,658,004 | Methlin | Jan. 31, 1928 |
| 1,698,646 | Methlin | Jan. 8, 1929 |
| 1,985,184 | Methlin | Dec. 18, 1934 |
| 2,403,415 | Daam | July 2, 1946 |
| 2,546,961 | Amero | Apr. 3, 1951 |
| 2,569,571 | Newell et al. | Oct. 2, 1951 |
| 2,591,800 | Gardiner | Apr. 8, 1952 |